(12) United States Patent
Suzuki et al.

(10) Patent No.: US 12,307,810 B2
(45) Date of Patent: May 20, 2025

(54) INFORMATION PROCESSING APPARATUS, INFORMATION PROCESSING METHOD, AND INFORMATION PROCESSING SYSTEM

(71) Applicant: SONY SEMICONDUCTOR SOLUTIONS CORPORATION, Kanagawa (JP)

(72) Inventors: Yuichi Suzuki, Kanagawa (JP); Satoshi Toriiwa, Kanagawa (JP); Kento Yamamoto, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 415 days.

(21) Appl. No.: 17/437,213

(22) PCT Filed: Mar. 4, 2020

(86) PCT No.: PCT/JP2020/009028
§ 371 (c)(1),
(2) Date: Sep. 8, 2021

(87) PCT Pub. No.: WO2020/189266
PCT Pub. Date: Sep. 24, 2020

(65) Prior Publication Data
US 2022/0172508 A1  Jun. 2, 2022

(30) Foreign Application Priority Data

Mar. 18, 2019  (JP) .................................. 2019-049855

(51) Int. Cl.
*G06V 40/16*  (2022.01)
*G06T 7/30*  (2017.01)
(Continued)

(52) U.S. Cl.
CPC .............. *G06V 40/161* (2022.01); *G06T 7/30* (2017.01); *G06T 7/60* (2013.01); *G06T 7/70* (2017.01);
(Continued)

(58) Field of Classification Search
CPC ...... G06V 40/16; G06V 40/167; G06V 40/40; G06V 40/45; G06V 40/161–179;
(Continued)

(56) References Cited

U.S. PATENT DOCUMENTS

2015/0371098 A1* 12/2015 Ishii ....................... G06V 40/70
382/115
2017/0255818 A1  9/2017 Saito et al.
(Continued)

FOREIGN PATENT DOCUMENTS

CN  107748869 A  *  3/2018  ......... G06K 9/00208
CN  108805047 A  *  11/2018  ......... G06K 9/00221
(Continued)

OTHER PUBLICATIONS

International Search Report and Written Opinion of PCT Application No. PCT/JP2020/009028, issued on Jun. 2, 2020, 11 pages of ISRWO.

*Primary Examiner* — Utpal D Shah
*Assistant Examiner* — Jack Peter Kraynak
(74) *Attorney, Agent, or Firm* — CHIP LAW GROUP

(57) ABSTRACT

Provided is an information processing apparatus, an information processing method, and an information processing system that can more accurately recognize a subject. The information processing apparatus includes a processing unit that specifies a distortion of a subject on the basis of position information indicating a position of the subject included in a captured image and direction information indicating a
(Continued)

direction of the subject, and identifies a shape of the subject on the basis of the specified distortion of the subject.

18 Claims, 33 Drawing Sheets

(51) Int. Cl.
  *G06T 7/60* (2017.01)
  *G06T 7/70* (2017.01)
(52) U.S. Cl.
  CPC ............ *G06T 2207/20084* (2013.01); *G06T 2207/30201* (2013.01)
(58) Field of Classification Search
  CPC .... G06T 7/30; G06T 7/70; G06T 7/60; G06T 2207/22084; G06T 2207/30201; G06T 7/80; G06T 40/167; G06T 2207/20084
  See application file for complete search history.

(56) References Cited

U.S. PATENT DOCUMENTS

| | | | |
|---|---|---|---|
| 2019/0080155 A1* | 3/2019 | Ganong | G06V 40/167 |
| 2019/0102608 A1* | 4/2019 | Wang | H04N 23/611 |
| 2019/0130171 A1* | 5/2019 | Alameh | G06V 20/64 |
| 2019/0340418 A1* | 11/2019 | Zecchini | G01S 17/88 |

FOREIGN PATENT DOCUMENTS

| | | | | |
|---|---|---|---|---|
| GB | 2560340 A | * | 9/2018 | ......... G06K 9/00221 |
| JP | 2006085289 A | * | 3/2006 | |
| JP | 2007011456 A | * | 1/2007 | |
| JP | 2008015979 A | * | 1/2008 | |
| JP | 2016127419 A | * | 7/2016 | |
| JP | 2017-162010 A | | 9/2017 | |
| JP | 2018185749 A | * | 11/2018 | ............ G06F 21/32 |
| JP | 2018197980 A | * | 12/2018 | |
| WO | 2014/132570 A1 | | 9/2014 | |

* cited by examiner

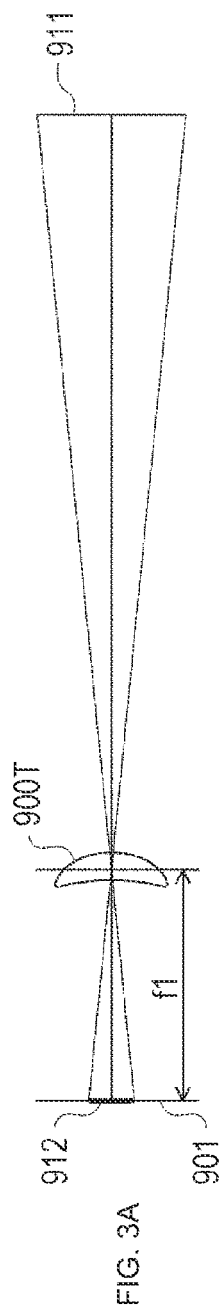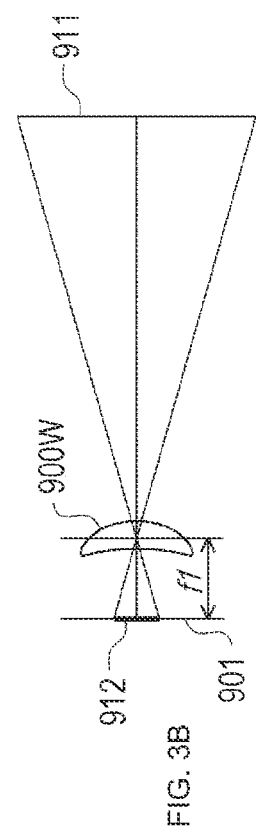

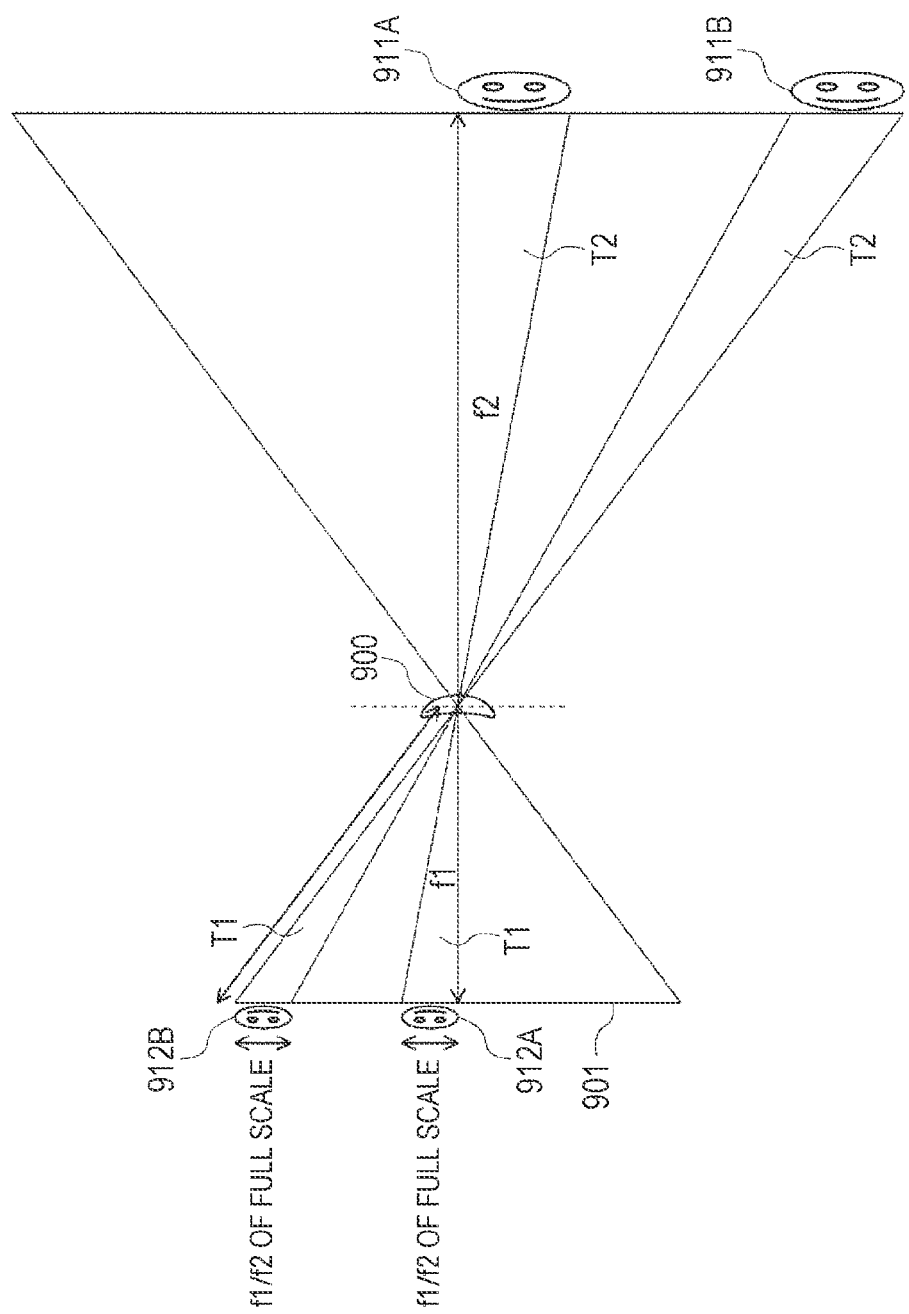

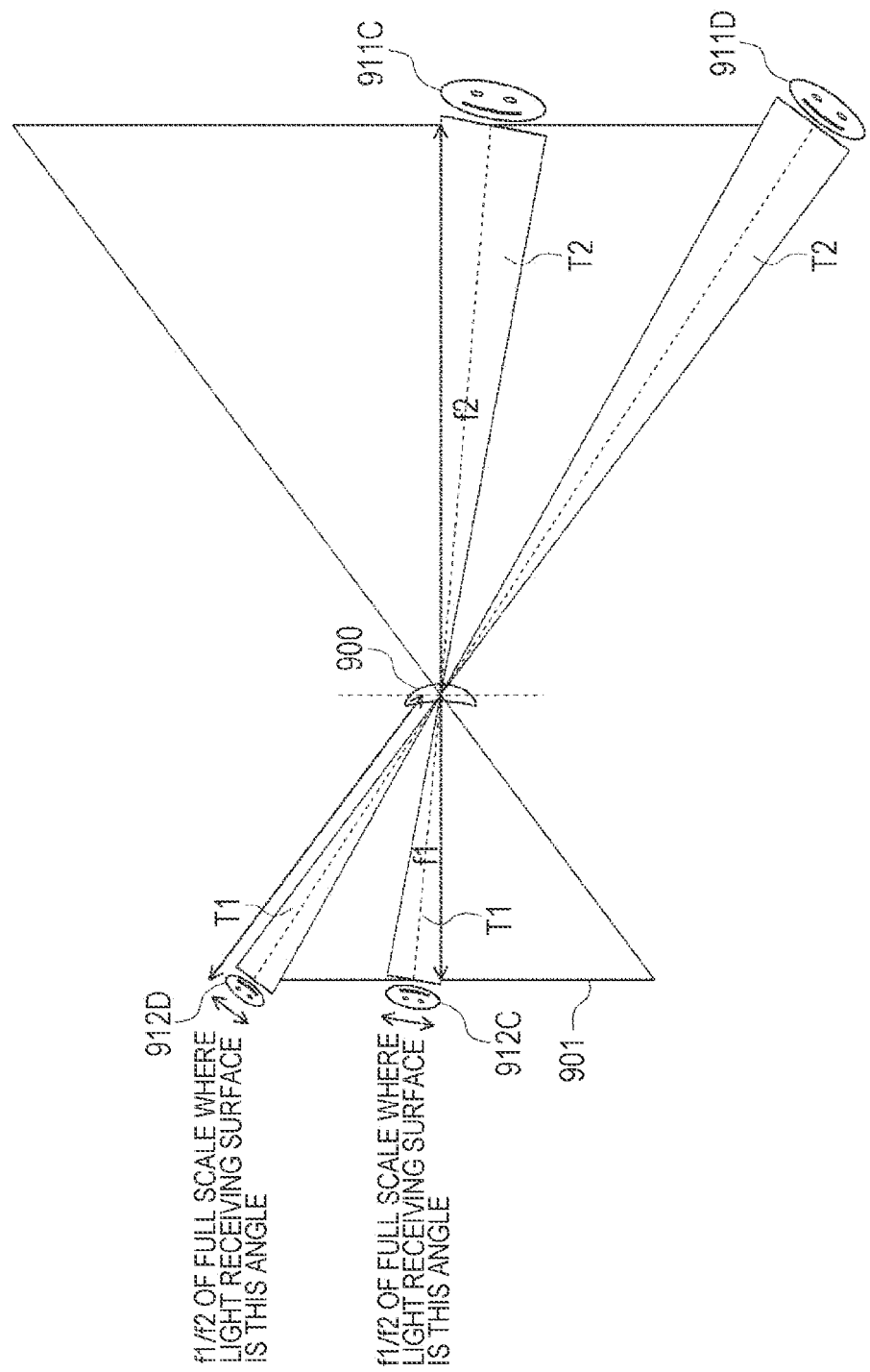

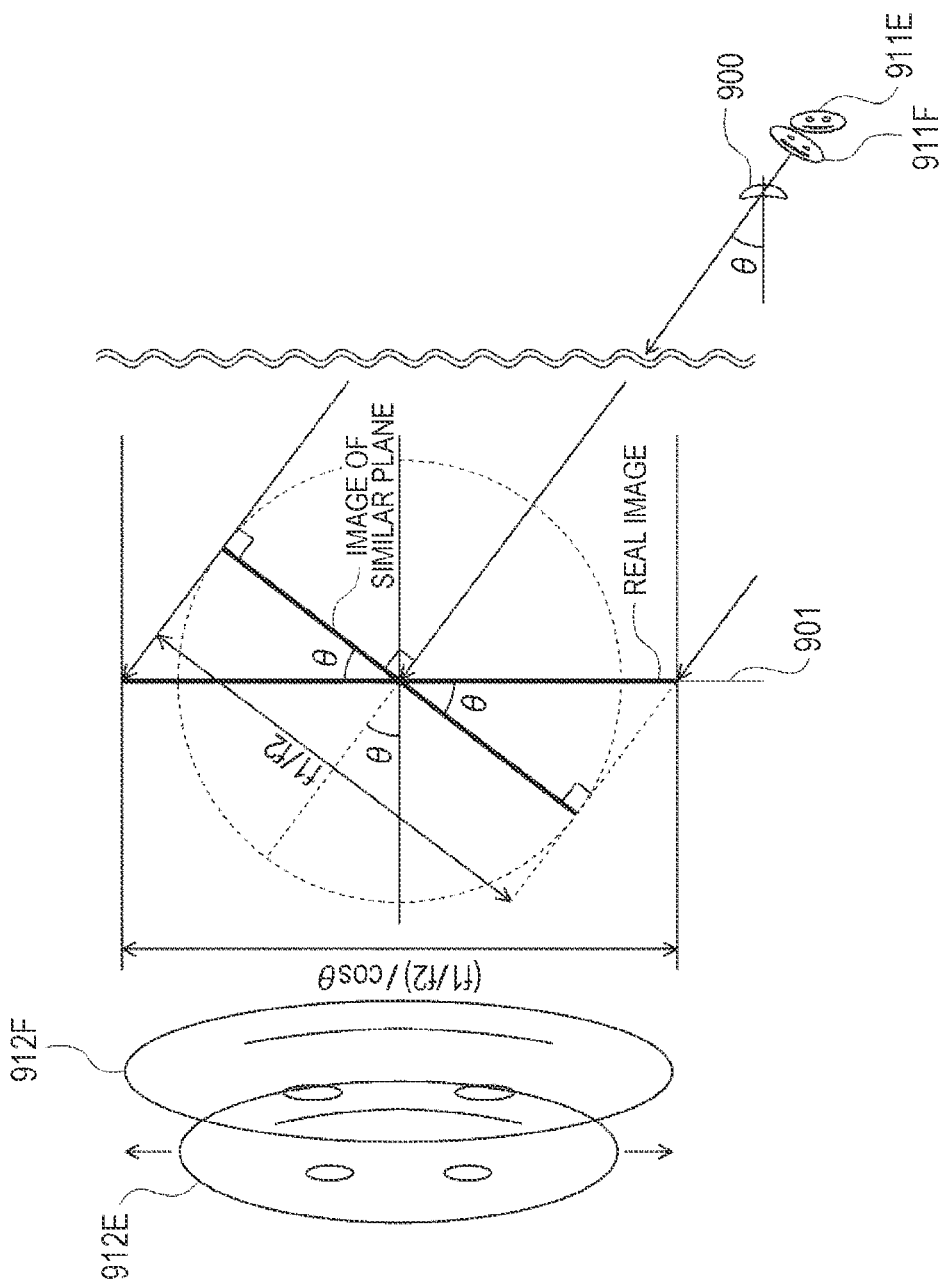

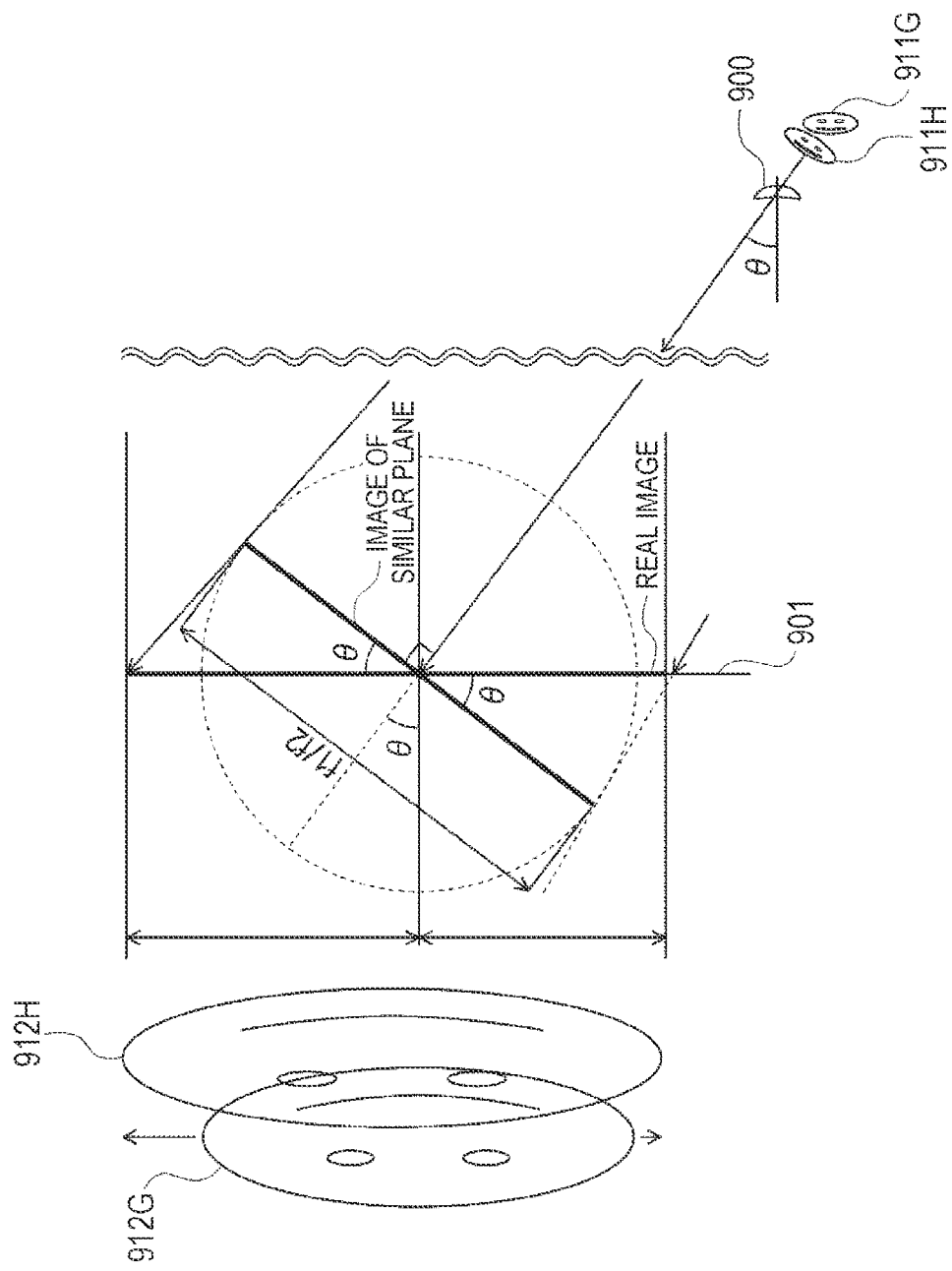

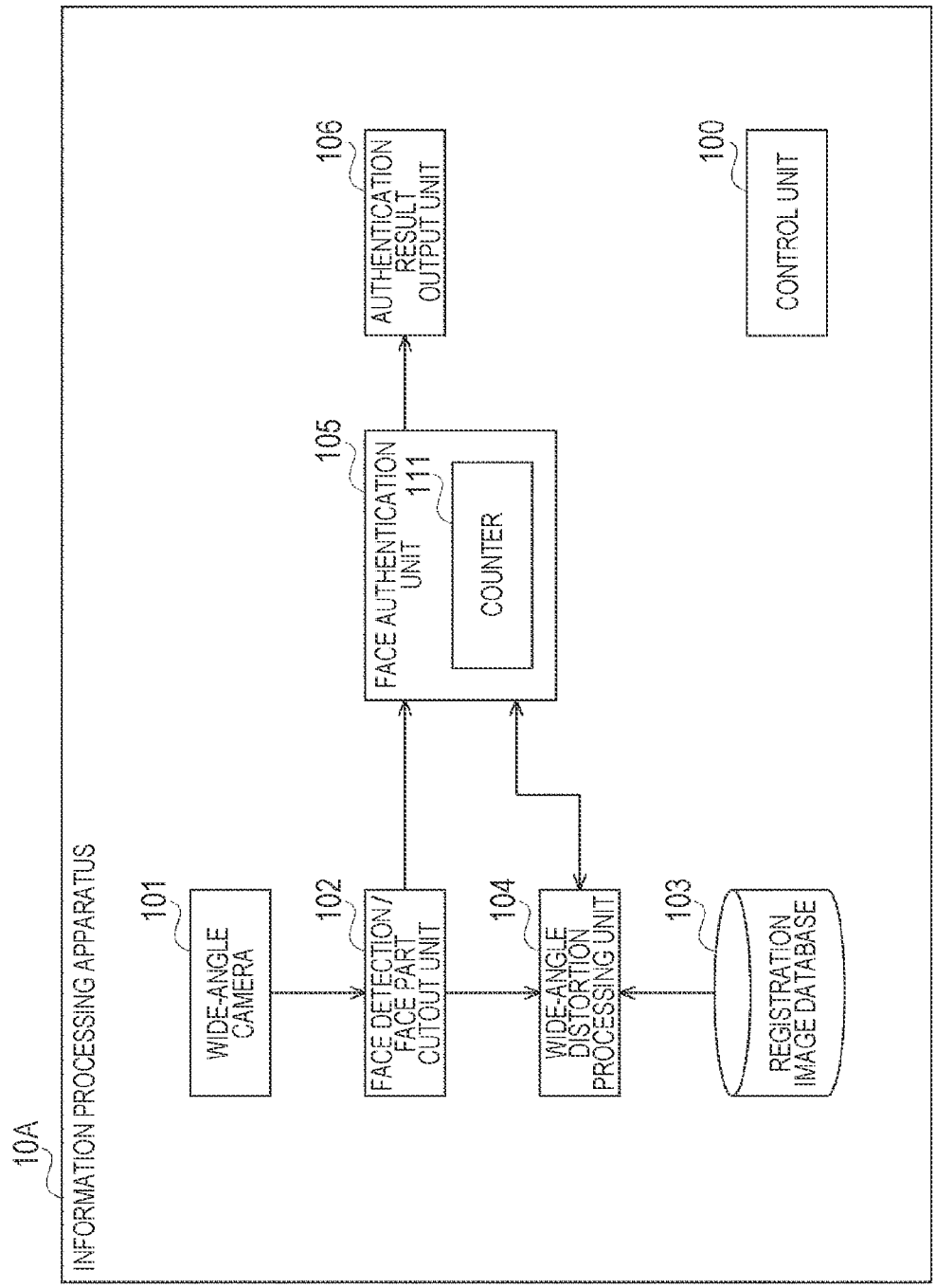

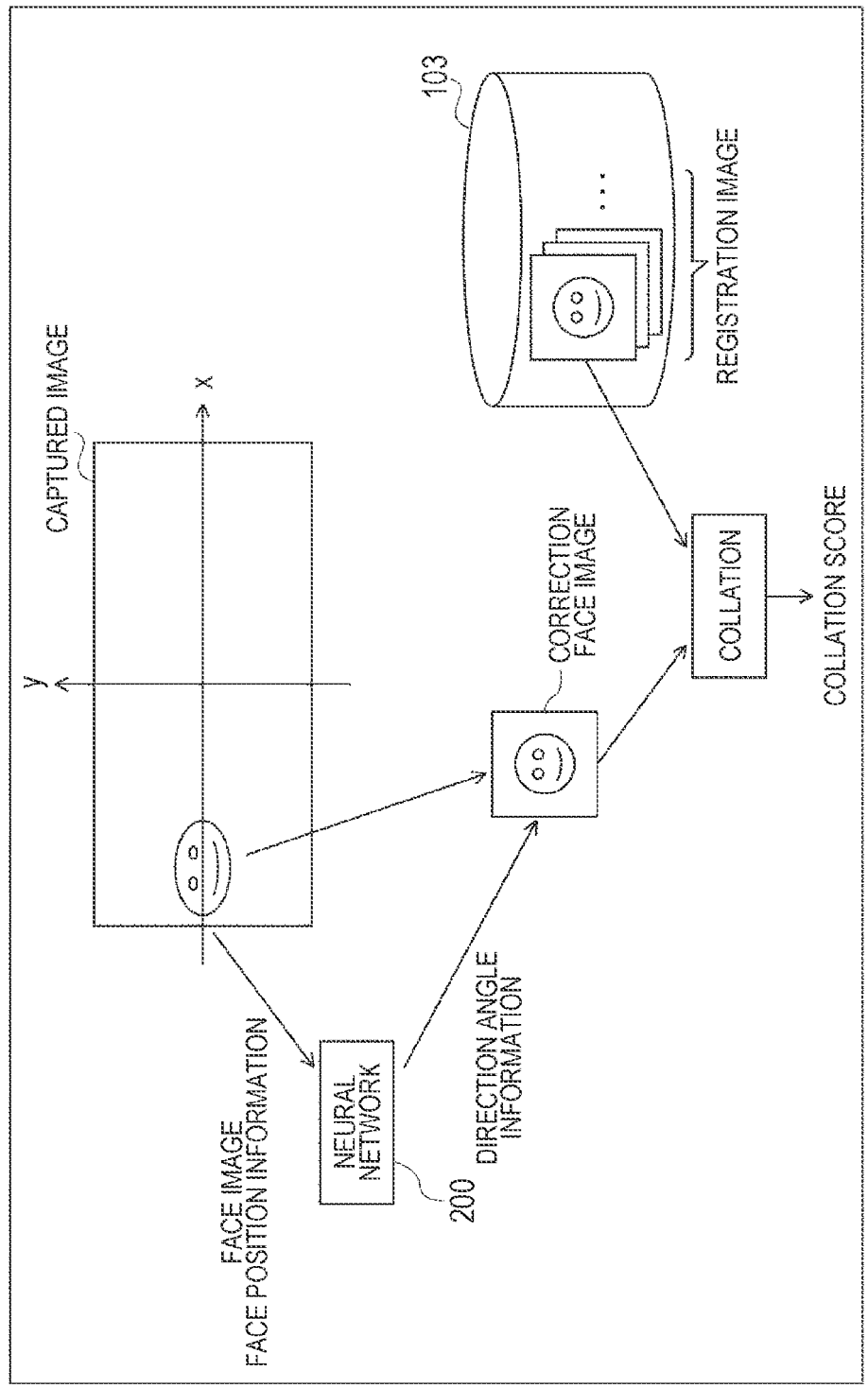

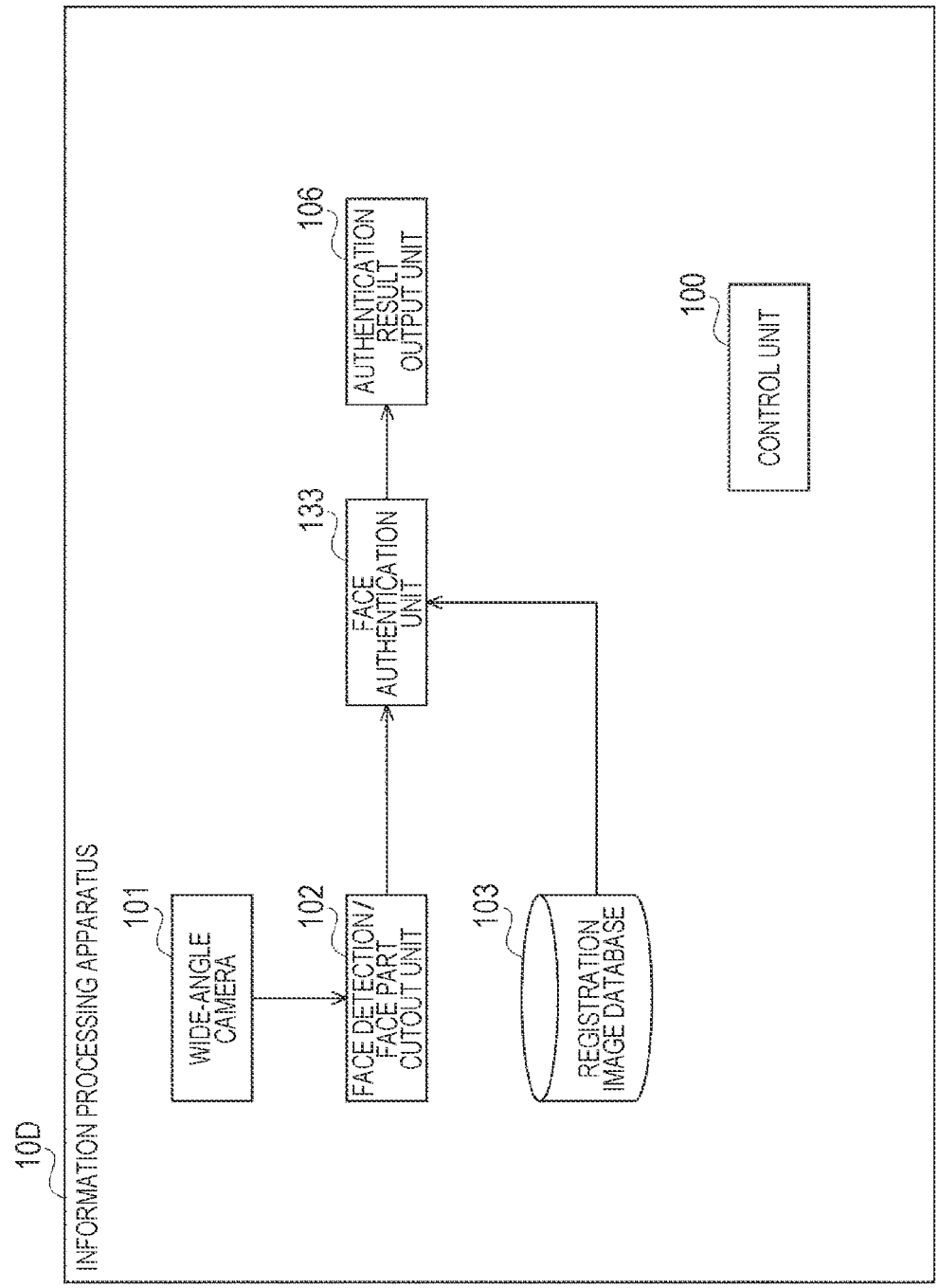

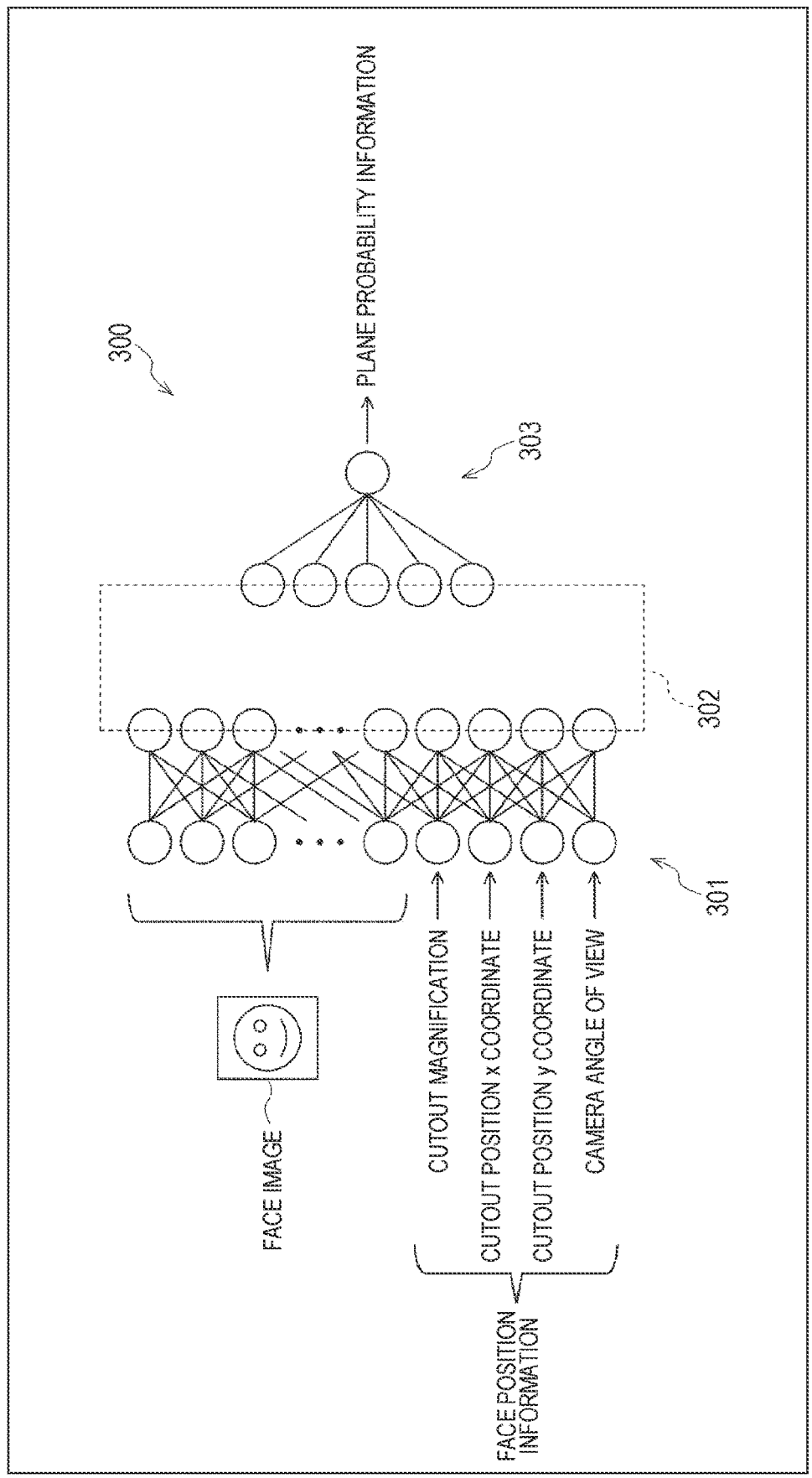

INFORMATION PROCESSING APPARATUS, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2020/009028 filed on Mar. 4, 2020, which claims priority benefit of Japanese Patent Application No. JP 2019-049855 filed in the Japan Patent Office on Mar. 18, 2019. Each of the above-referenced applications is hereby incorporated herein by reference in its entirety.

TECHNICAL FIELD

The present disclosure relates to an information processing apparatus, an information processing method, and an information processing system, and more particularly, to an information processing apparatus, an information processing method, and an information processing system capable of more accurately recognizing a subject.

BACKGROUND ART

Research and development of face recognition technology has been conducted from the past, and in recent years, the face recognition technology has been put into practical use, such as being installed in information terminals such as smartphones (see, for example, Patent Documents 1 and 2).

CITATION LIST

Patent Document

Patent Document 1: Japanese Patent Application Laid-Open No. 2008-015979
Patent Document 2: Japanese Patent Application Laid-Open No. 2007-011456

SUMMARY OF THE INVENTION

Problems to be Solved by the Invention

However, in this kind of face recognition, it is difficult to prevent spoofing by using a face image displayed on a plane instead of a real face, and it is required to recognize a subject more accurately.

This disclosure has been made in view of such a situation, and is intended to recognize a subject more accurately.

Solutions to Problems

An information processing apparatus according to one aspect of the present disclosure is an information processing apparatus including a processing unit that specifies a distortion of a subject on the basis of position information indicating a position of the subject included in a captured image and direction information indicating a direction of the subject, and identifies a shape of the subject on the basis of the specified distortion of the subject.

An information processing method according to one aspect of the present disclosure is an information processing method in which an information processing apparatus specifies a distortion of a subject on the basis of position information indicating a position of the subject included in a captured image and direction information indicating a direction of the subject, and identifies a shape of the subject on the basis of the specified distortion of the subject.

An information processing system according to one aspect of the present disclosure is an information processing system including an information processing apparatus that specifies a distortion of a subject on the basis of position information indicating a position of the subject included in a captured image and direction information indicating a direction of the subject, and identifies a shape of the subject on the basis of the specified distortion of the subject.

In the information processing apparatus, the information processing method, and the information processing system according to one aspect of the present disclosure, the distortion of the subject is specified on the basis of the position information indicating the position of the subject included in the captured image and the direction information indicating the direction of the subjection, and the shape of the subject is identified on the basis of the specified distortion of the subject.

Note that the information processing apparatus according to one aspect of the present disclosure may be an independent device or an internal block constituting one apparatus.

BRIEF DESCRIPTION OF THE DRAWINGS

FIGS. 3A and 3B are diagrams illustrating an example of focal lengths of a telephoto lens and a wide-angle lens.
FIG. 4 is a top view illustrating a first example of a generation principle and characteristics of a wide-angle distortion.
FIG. 5 is a top view illustrating a second example of a generation principle and characteristics of a wide-angle distortion.
FIG. 6 is a top view illustrating a first example of details of the image formation unit.
FIG. 7 is a top view illustrating a second example of details of the image formation unit.
FIG. 8 is a block diagram illustrating a first example of a configuration of an information processing apparatus to which the present technology is applied.

FIG. 18 is a diagram schematically illustrating an example of a collation between a correction face image and a registration image.

FIG. 20 is a block diagram illustrating an example of another configuration using the neural network.

FIG. 21 is a diagram illustrating a second example of the configuration of the neural network to which the present technology is applied.

MODE FOR CARRYING OUT THE INVENTION

Hereinafter, embodiments of the present technology will be described with reference to the accompanying drawings. Note that the description will be given in the following order.

1. First Embodiment
2. Second Embodiment
3. Third Embodiment
4. Fourth Embodiment
5. Fifth Embodiment
6. Modified Example
7. Configuration of Computer
8. Application Example of Moving Object 1. First Embodiment (Concept of Focal Length)

Figure 1:
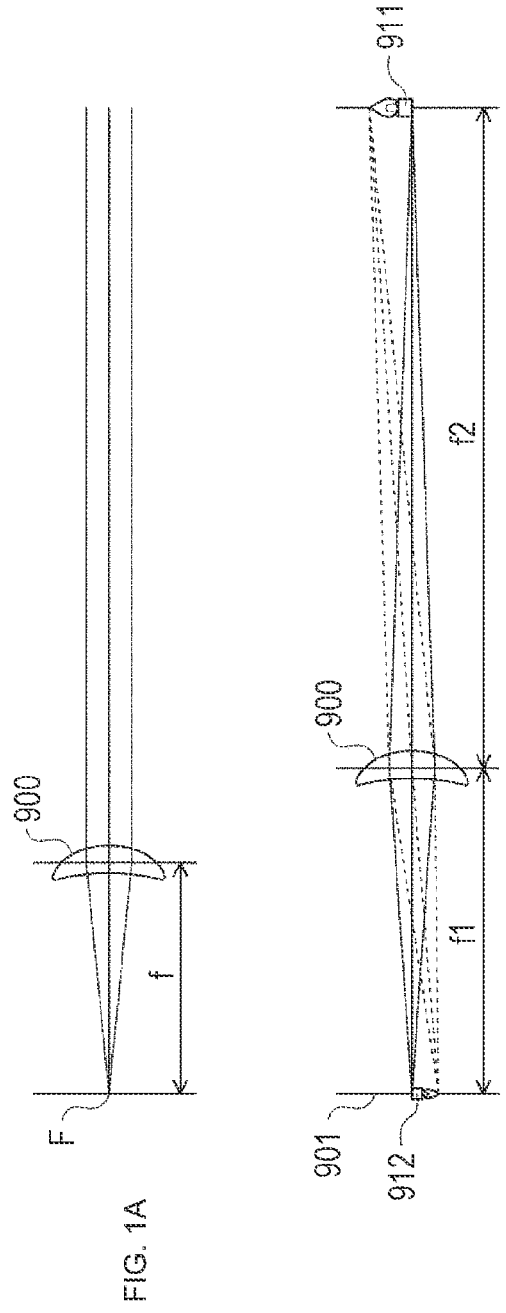
FIGS. 1A and 1B are diagrams describing a concept of a focal length of a lens.

As illustrated in FIGS. 1A and 1B, a "focal length of a lens" has two meanings. First, the focal length is a focal length f of a single lens based on geometric optics, and as illustrated in FIG. 1A, means a distance between a focal point F, which is formed when parallel light is incident, and a center of a lens 900.

Second, the focal length is a focal length f1 shown in specifications of a camera lens, and is a main parameter that determines an image capturing angle of view or magnification. Specifically, as illustrated in FIG. 1B, when capturing an image of a subject 911 at a finite distance, the distance f1 from the lens 900 to an image 912 (image formation point) and a distance f2 from the lens 900 to the subject 911 has the following Equation (1).

$$1/f1 + 1/f2 = 1/f \qquad (1)$$

Here, in a human eye, a crystalline lens acts as a lens and projects an image onto a retina, but a focus is controlled by changing the focal length f of the crystalline lens by an action of a ciliary muscle, not by freely changing the distance f1 between the crystalline lens and the retina.

Meanwhile, when a focus is near or far away with the camera lens, the focal length f of the lens is changed as a whole by changing a relative position of a built-in lens driven by a rotation of a focus ring, so the focus is adjusted.

The camera lens incorporates a plurality of lenses, such as 7 elements in 5 groups, but it can be virtually regarded as a single lens with a variable focal length, similarly to a crystalline lens. At that time, it is ideal that f1 illustrated in FIG. 1B, that is, a distance from the center of the virtual lens 900 to an image sensor 901 (or film) is designed to be changed as little as possible. This f1 is the focal length shown in the specifications of the camera lens.

Note that in FIGS. 1A and 1B, in order to describe the focal length of the camera lens 900, three optical paths gathered at one point by the lens 900 are drawn. Such an expression is necessary for the problem of whether the image formation unit is blurred (whether it is not blurred), but it is not necessary in the explanation of the wide-angle distortion used by the present technology described later, and it can be represented by only one optical path passing through the center of the lens.

Figure 2:
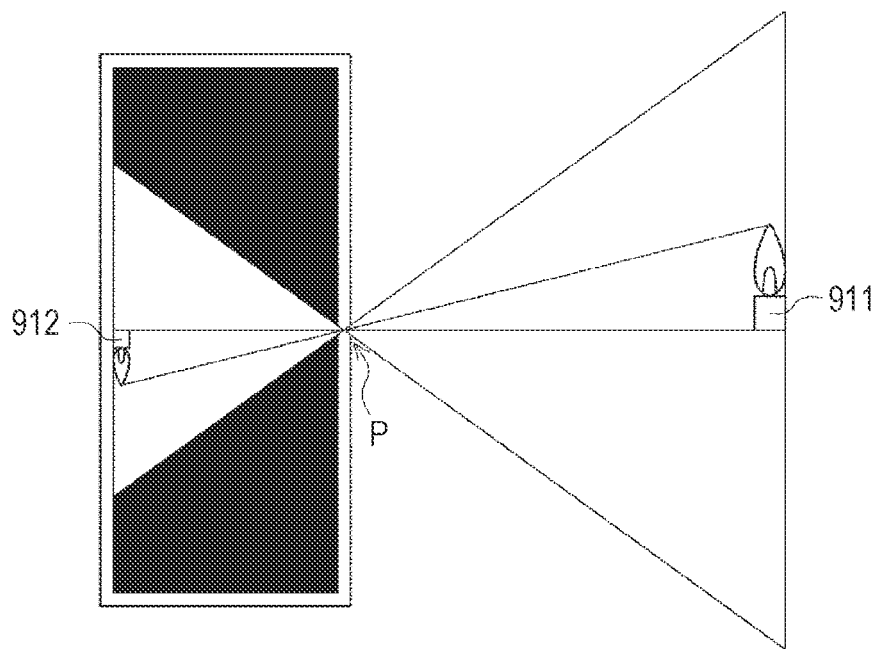
FIG. 2 is a diagram illustrating an example of a wide-angle distortion in a pinhole camera.

FIG. 2 illustrates an example of a pinhole camera. In the pinhole camera, as illustrated in FIG. 2, the image 912 of subject 911 is obtained on an image plane using the pinhole P without using a lens, but even in this type of camera, the wide-angle distortion is occurring.

FIGS. 3A and 3B illustrate an example of the focal lengths of the telephoto lens and the wide-angle lens.

The telephoto lens is a lens having a narrower angle of view than a standard lens, and has a focal length of, for example, 100 mm or the like. As shown in FIG. 3A, when a telephoto lens 900T is used, the focal length f1 is larger than that of the standard lens or the wide-angle lens, and an angle of view captured on a light receiving surface of the image sensor 901 is narrow, so the image 912 of the distant subject 911 can be captured in a large size.

The wide-angle lens is a lens having a wider angle of view than the standard lens, and has a focal length of, for example, 20 mm or the like. As illustrated in FIG. 3B, when a wide-angle lens 900W is used, the focal length f1 is smaller than that of the standard lens or the telephoto lens, and the angle of view captured on the light receiving surface of the image sensor 901 is wide, so the image 912 of the nearby subject 911 can be captured in a small size.

Example of Generation Principle and Characteristics of Wide-angle Distortion

Next, the generation principle and characteristics of the distortion (hereinafter referred to as the wide-angle distortion) of the captured image that occurs when the wide-angle lens is used will be described.

Here, a case where a face image (hereinafter referred to as a face photograph) displayed on a plane is used as the subject 911 will be described as an example. The face photograph includes, for example, a still image or a moving image displayed on a display of an information terminal such as a smartphone or a tablet terminal, as well as an image including a printed human face.

In FIG. 4, when a subject 911A as a face photograph is placed parallel to the light receiving surface of the image sensor 901, a triangle T1 formed by an image 912A and the center of the lens 900 is similar to a triangle T2 formed by a subject 911A and the center of the lens 900.

At this time, when a relationship of the f1 and f2 illustrated in FIG. 1B is used, the size of the image 912A becomes a size of f1/f2 due to a similarity ratio as compared with the subject 911A.

Further, not only the image 912A of the subject 911A captured around the center of the captured image but also the image 912B of the subject 911B captured around the periphery has the same f1/f2 size. That is, the image 912A of the central portion and the image 912B of the peripheral portion have substantially the same size on the light receiving surface of the image sensor 901.

Meanwhile, in FIG. 5, when subjects 911C and 911D as the face photograph are placed toward the center of the lens 900, in order to make the triangle T1 and the triangle T2 similar to each other, the subjects 911C and 911D are projected as images 912C and 912D having an angle with respect to the image sensor 901.

At this time, the image 912D of the subject 911D in the peripheral portion is projected as an image having a larger angle with respect to the image sensor 901 than the image 912C of the subject 911C in the central portion of the captured image. However, since an image is actually formed on the light receiving surface of the image sensor 901, the images 912C and 912D are obliquely projected on the image sensor 901, and the distortion occurs.

FIGS. 6 and 7 illustrate detailed examples of the image formation unit. Here, FIG. 6 illustrates the case where the subject 911 (face photograph) is located far away from (light receiving surface of) the image sensor 901 as the position of the subject 911 (face photograph), and FIG. 7 illustrates the case where the subject 911 (face photograph) is located close to the image sensor 901 as the position of the subject 911 (face photograph).

In FIG. 6, it is assumed that subject 911 exists in the distance and light incident on the periphery of the image 912 can be approximated to parallel light. In addition, an angle θ in FIG. 6 represents the direction of the subject 911, that is, an incidence angle on the light receiving surface of the image sensor 901.

Here, when projected on a surface forming a similarity triangle, the width of the image 912 is f1/f2 of a full scale, but the subject 911 is projected with an incidence angle θ with respect to the light receiving surface of the image sensor 901, so the actual width of the image 912 is (f1/f2)/cos θ times.

Specifically, in FIG. 6, a subject 911E is placed parallel to the light receiving surface of the image sensor 901, and a subject 911F is placed in a direction having the incidence angle θ. At this time, the image 912E of the subject 911E has the size of f1/f2 of the full scale, while an image 912F of the subject 911F has the size of (f1/f2)/cos θ of the full scale.

In addition, in FIG. 7, the subject 911 exists nearby, and the actual position of the subject 911 is not at infinity but at a certain distance f2, so the incident light from the subject 911 has angles on the left and right sides of the face of the face photograph. In this case, the image 912 projected on the light receiving surface of the image sensor 901 has a small magnification on the central side and a large magnification on the peripheral side in the captured image.

Specifically, in FIG. 7, a subject 911G is placed parallel to the light receiving surface of the image sensor 901, and a subject 911H is placed in a direction having the incidence angle θ. At this time, for a size of an image 912H of the subject 911H, the magnification ratio on the peripheral side is large while the magnification ratio on the central side is small as indicated by a vertical arrow with respect to the image 912G of the subject 911G.

As described above, the wide-angle distortion largely depends not only on the characteristics of the camera but also on the direction of the subject 911. Since a human face is a three-dimensional object, the angles of each part surface of the real face with respect to the camera are not uniform. Meanwhile, the angle of the face photograph (face image displayed on a plane) with respect to the camera is uniform. Therefore, there is a difference in the wide-angle distortion between the real face and the face photograph.

Specifically, the inventor of the present application has found by detailed simulation that when each of the real face and face photograph is imaged at the peripheral portion of the angle of view for the same person, the face photograph is uniformly and diagonally distorted when being imaged, while the distortion is different for each part (for example, eyes, nose, mouth, or the like) when the real face is imaged.

However, the technology related to the face authentication has been developed from the past, and in recent years, has been put into practical use such as being installed in information terminals such as smartphones and tablet terminals.

However, in this kind of face authentication, instead of a real face, the spoofing using the face photograph has become a problem. For example, when the face authentication is performed by capturing a still image using a camera function of an information terminal, it is difficult to distinguish between the face of the real face and the face of the face photograph, and there is a risk of the spoofing using the face photograph instead of the real face.

In addition, when the face authentication is performed by capturing a moving image, it is possible to distinguish the moving image from a still image by the movement of the face. However, in recent years, in the information terminals such as the tablet terminal, means for easily displaying a full-scale moving image of a face has become widespread, and it has become easy to spoof the moving image.

In this way, it is becoming difficult to prevent the spoofing by the face authentication using a two-dimensional image.

Meanwhile, two (or more) cameras can be used to identify a three-dimensional shape of an object using trigonometric parallax. However, since the principle depends on an apex angle of a triangle formed by two cameras with an object as an apex, it is necessary to increase a distance between the cameras as a distance from the object increases, and the device becomes large. In addition, since two or more cameras are required, the cost is higher than that of one camera.

Further, in the field of electronic cameras, with the development of semiconductor technology and digital processing technology, not only miniaturization but also price reduction and high image quality have made remarkable progress. Then, at present, even if an electronic camera uses a wide-angle lens that captures a small image to image a subject at a distance of several meters, for example, a face image having a sufficient number of pixels for the face authentication can be obtained.

Therefore, in the present technology, the subject 911 is imaged by a camera capable of imaging a wide-angle, and a shape (three-dimensional or two-dimensional shape) of the subject 911 (face of a person to be authenticated) included in the captured image is identified, and thus, the face authentication is performed.

That is, the present technology focuses on the fact that the distortion is different between a three-dimensional object and a plane object (there is a difference in the wide-angle distortion between the real face and the face of the face photograph) in the distortion of the peripheral portion of the wide-angle lens, and the wide-angle distortion largely depends not only on the characteristics of the camera but also on the direction of the subject 911, thereby identifying whether the subject 911 is a three-dimensional face (real face) or a face projected onto a plane (face of the face photograph) by adding the direction information regarding the direction of the subject 911 at that position in addition to the position information regarding the position of the subject 911 included in the captured image.

This makes it possible to recognize the subject 911 more accurately, and for example, when the face photograph (fake face image) is presented instead of the real face, when it recognizes that the subject 911 is a face projected on a plane, the subject can be prevented from passing through the face authentication system, thereby surely preventing the spoofing using the face photograph (fake face image).

Note that the wide-angle lens has the advantage that it can be miniaturized because it has a shorter focal length than the telephoto lens, and that it can image a wide range because it has a wide angle of view. That is, the present technology has an advantage that it is not necessary to use a special device, especially by using such a wide-angle lens. Further, in the present technology, the face authentication can be realized with only one camera, so the cost can be suppressed as compared with the case of using a plurality of cameras.

Hereinafter, the details of the present technology will be described with reference to the drawings.

(Configuration of Information Processing Apparatus)

FIG. 8 illustrates a first example of a configuration of an information processing apparatus to which the present technology is applied.

In FIG. 8, an information processing apparatus 10A includes a control unit 100, a wide-angle camera 101, a face detection/face part cutout unit 102, a registration image database 103, a wide-angle distortion processing unit 104, a face authentication unit 105, and an authentication result output unit 106.

The control unit 100 is constituted by, for example, a processor such as a central processing unit (CPU) or a field programmable gate array (FPGA). The control unit 100 is a central processing device that controls operations of each unit in the information processing apparatus 10A and performs various arithmetic processes.

The wide-angle camera 101 includes an optical system including a wide-angle lens, an image sensor converting light focused by the optical system into an electric signal, and a signal processing unit such as a camera image signal processor (ISP). In the wide-angle camera 101, the signal processing unit performs various signal processes on an image capturing signal obtained by capture the image of the subject 911 with the image sensor to generate a captured image and supplies the captured image to the face detection/face part cutout unit 102.

However, the wide-angle camera 101 is installed so that (the image 912 of) the subject 911 can be imaged at an angle at which the wide-angle distortion can be used. For example, here, by performing image capturing so that the image 912 of the subject 911 is focused on the peripheral portion of the light receiving surface of the image sensor, and the subject 911 is included in the peripheral portion of the captured image, the wide-angle distortion of the subject 911 included in the captured image becomes available.

The face detection/face part cutout unit 102 performs face area detection processing on the captured image supplied from the wide-angle camera 101 to detect a face area, and supplies face position information (position information) indicating a position (coordinates) of the face area to the wide-angle distortion processing unit 104. As the face area detection processing, a known technique such as template matching can be used.

Further, the face detection/face part cutout unit 102 cuts out the face area included in the captured image, and generates a face image by performing a cutting-out process for standardizing a size and brightness of a cutout face area. The face detection/face part cutout unit 102 supplies the generated face image to the face authentication unit 105. Note that since this face image is an image of the subject 911, it can be said that the face image is a subject image.

The registration image database 103 is stored in, for example, a storage device such as a semiconductor memory or a hard disk drive (HDD), and is managed by middleware or the like executed by the CPU.

The registration image database 103 stores a plurality of registration images used for collation and information (hereinafter referred to as three-dimensional information) on their three-dimensional shapes, and supplies registration image and three-dimensional information in response to a request from the wide-angle distortion processing unit 104.

The wide-angle distortion processing unit 104 reads out the registration image to be collated and the three-dimensional information from the registration image database 103. Further, the wide-angle distortion processing unit 104 is supplied with face position information from the face detection/face part cutout unit 102 and direction angle information from the face authentication unit 105.

The wide-angle distortion processing unit 104 processes the registration image read from the registration image database 103 on the basis of the face position information and the direction angle information to generate a collation image simulating the wide-angle distortion, and supply the generated collation image to the face authentication unit 105.

The face authentication unit 105 is supplied with the face image from the face detection/face part cutout unit 102 and the collation image from the wide-angle distortion processing unit 104. The face authentication unit 105 calculates an authentication score by collating the face image and the collation image.

Then, the face authentication unit 105 performs the face authentication to determine whether or not the subject 911 is a legitimate authenticated person on the basis of the calculated authentication score. The face authentication unit 105 supplies the calculated authentication score and the authentication result to the authentication result output unit 106.

Note that the face authentication unit 105 supplies the wide-angle distortion processing unit 104 with direction angle information (direction information) indicating a direction angle of the registration image, for example, by a programmed sequence. Further, the face authentication unit 105 includes a counter 111 that counts the number of collations. The counter 111 counts according to the control from the control unit 100.

The authentication result output unit 106 is constituted by, for example, an output device such as a display or a speaker. The authentication score and the authentication result from the face authentication unit 105 are supplied to the authentication result output unit 106. The authentication result output unit 106 outputs the authentication score and the information according to the authentication result.

(Flow of Face Authentication Process)

Next, the flow of the face authentication process executed by the information processing apparatus 10A in FIG. 8 will be described with reference to the flowchart in FIG. 9.

In step S11, the registration image database 103 stores (data of) the registration image according to the control from the control unit 100.

The data of the registration image includes, for example, a face image of a person to be authenticated and data of three-dimensional information thereof. Here, note that when the data of the three-dimensional information does not exist, alternative data may be used, for example, by mapping a front image to a similar three-dimensional model.

When the registration image data is stored in the registration image database 103 in the process of step S11, the process proceeds to step S12.

In step S12, the wide-angle camera 101 is installed so that the subject 911 (face of the authenticated person) can be imaged at an angle at which the wide-angle distortion can be used, and images the subject 911. By this image capturing, the captured image that includes the subject 911 is obtained.

Figure 10:
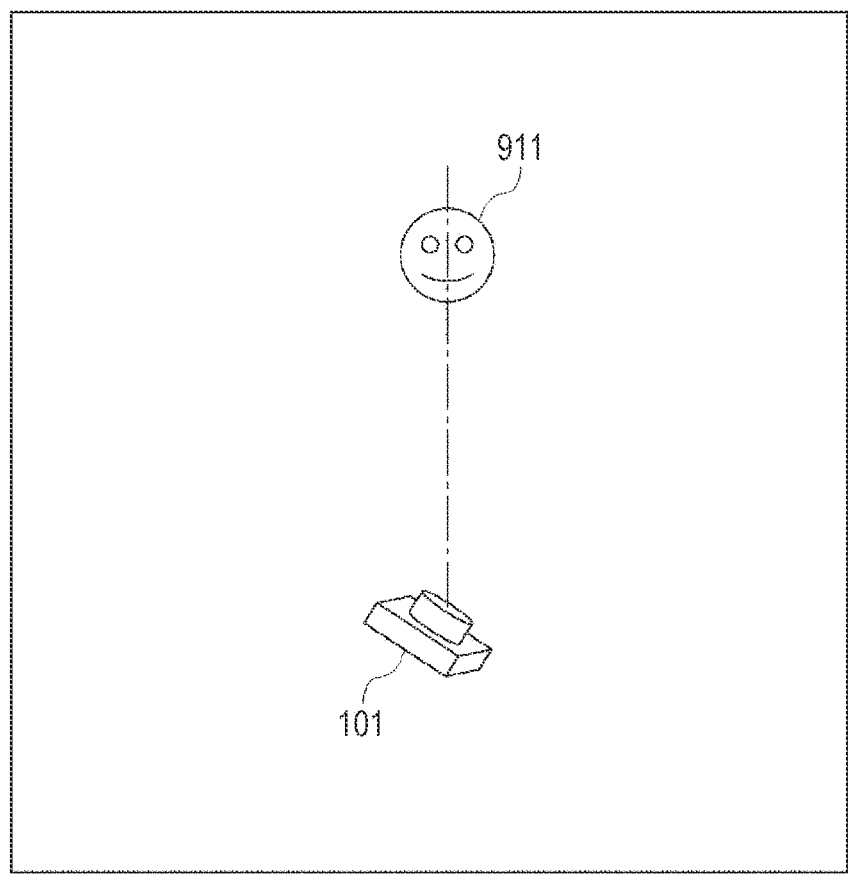
FIG. 10 is a diagram schematically illustrating an example of installing a wide-angle camera.

Here, FIG. 10 illustrates an example of the installation of the wide-angle camera 101. In FIG. 10, the wide-angle camera 101 is installed at a predetermined angle with respect to the subject 911, but the front of the subject 911 (face of the authenticated person) faces the direction of the tilted wide-angle camera 101. That is, in FIG. 10, the wide-angle camera 101 images the subject 911 facing the front, not the subject 911 facing diagonally.

By installing the wide-angle camera 101 in this way, the subject 911 (face of the authenticated person) is imaged at a peripheral portion outside the central portion of the angle of view. Note that when installing the wide-angle camera 101, it is preferable that the installation angle cannot be determined from the outside.

Returning to FIG. 9, in step S13, the face detection/face part cutout unit 102 detects the face area from the captured image captured by the wide-angle camera 101 and specifies the position (face position) according to the area. This face position is represented by coordinates (x, y), for example, with an arbitrary position on the captured image (for example, a center of gravity or an upper left vertex) as an origin (0,0).

In step S14, the face detection/face part cutout unit 102 cuts out the face area from the captured image and performs a cutting-out process to standardize the size and brightness of the cutout face area, thereby generating the face image.

In step S15, the wide-angle distortion processing unit 104 reads out the registration image to be collated and the three-dimensional information from the registration image database 103. At this time, in the face authentication unit 105, the counter 111 is initialized and a counter value is reset to N=0 (S16).

In step S17, the face authentication unit 105 instructs the wide-angle distortion processing unit 104 to indicate the direction angle of the registration image in a programmed sequence. As a method of indicating the direction angle, for example, for a horizontal swing angle (yaw angle) and a vertical swing angle (pitch angle) of a face included in the registration image, for example, the direction angle for scanning at regular intervals such as one step is specified. Note that as the direction angle, in addition to the yaw angle and the pitch angle, another direction angle such as a roll angle may be specified.

In step S18, the wide-angle distortion processing unit 104 processes the registration image read from the registration image database 103 to generate the collation image simulating the wide-angle distortion on the basis of the face position specified by the ace detection/face part cutout unit 102 and the direction angle designated by the face authentication unit 105.

In step S19, the face authentication unit 105 collates the face image generated by the face detection/face part cutout unit 102 and the collation image generated by the wide-angle distortion processing unit 104, thereby calculating the authentication score.

In step S20, the face authentication unit 105 determines whether or not the calculated authentication score is greater than or equal to a predetermined threshold value.

When it is determined in the determination process of step S20 that the authentication score is greater than or equal to a threshold value, the process proceeds to step S21. In step S21, the face authentication unit 105 sets the authentication result to be "successful".

Meanwhile, when it is determined in the determination process of step S20 that the authentication score is less than the threshold value, the process proceeds to step S22. In step S22, the face authentication unit 105 increments a counter value N of the counter 111, and determines whether or not the counter value N has reached a maximum value (Nmax).

When it is determined in the determination process of step S22 that the incremented counter value N has not reached the maximum value, the process returns to step S17, and the processes of steps S17 to S20 are repeated.

That is, by repeating the processes of steps S17 to S20, the collation image corresponding to the changed direction angle is sequentially generated, and the authentication score with the face image is sequentially calculated. Then, when the recalculated authentication score is sequentially compared with the threshold value and it is determined that the score is greater than or equal to the threshold value ("Yes" in S20), the authentication result is regarded to be "successful".

Specifically, when the subject 911 (face of the authenticated person) is a real face, since the face image is collated using the collation image that assumes the wide-angle distortion of the real face, the degree of matching (authentication score) in the collation becomes high. Meanwhile, when the subject 911 is the face of the face photograph, the distortion method is different from that of the real face, when the wide-angle distortion of the real face is collated, the degree of matching (authentication score) in the collation is low.

Here, by determining the degree of matching in such collation, it is determined whether the face of the authenticated person is the real face (or the face of the face photograph), that is, the authentication result is "successful" (or "failed").

Here, note that each time the collation score calculated by collating the face image and the collation image is obtained, the collation score is compared with the threshold value and the direction angle at which the authentication score is greater than or equal to the threshold value is scanned, the direction angle information is obtained to determine whether the authentication result is "successful" (or "failed"), but other methods may be used.

For example, the direction angle that maximizes the collation score may be obtained and the maximum value may be compared with the threshold value to obtain the direction angle information, or a map of the direction angle whose authentication score is greater than or equal to the threshold value may be generated, and the direction angle information may be obtained by removing a singular point, calculating the center of gravity, or the like. Of course, as described above, when the direction angle at which the authentication score is greater than or equal to the threshold value is first found, the direction angle information may be specified and the scanning may be completed. Note that these processes differ in the accuracy and weight of the process, they can be appropriately selected according to the purpose.

Figure 11:
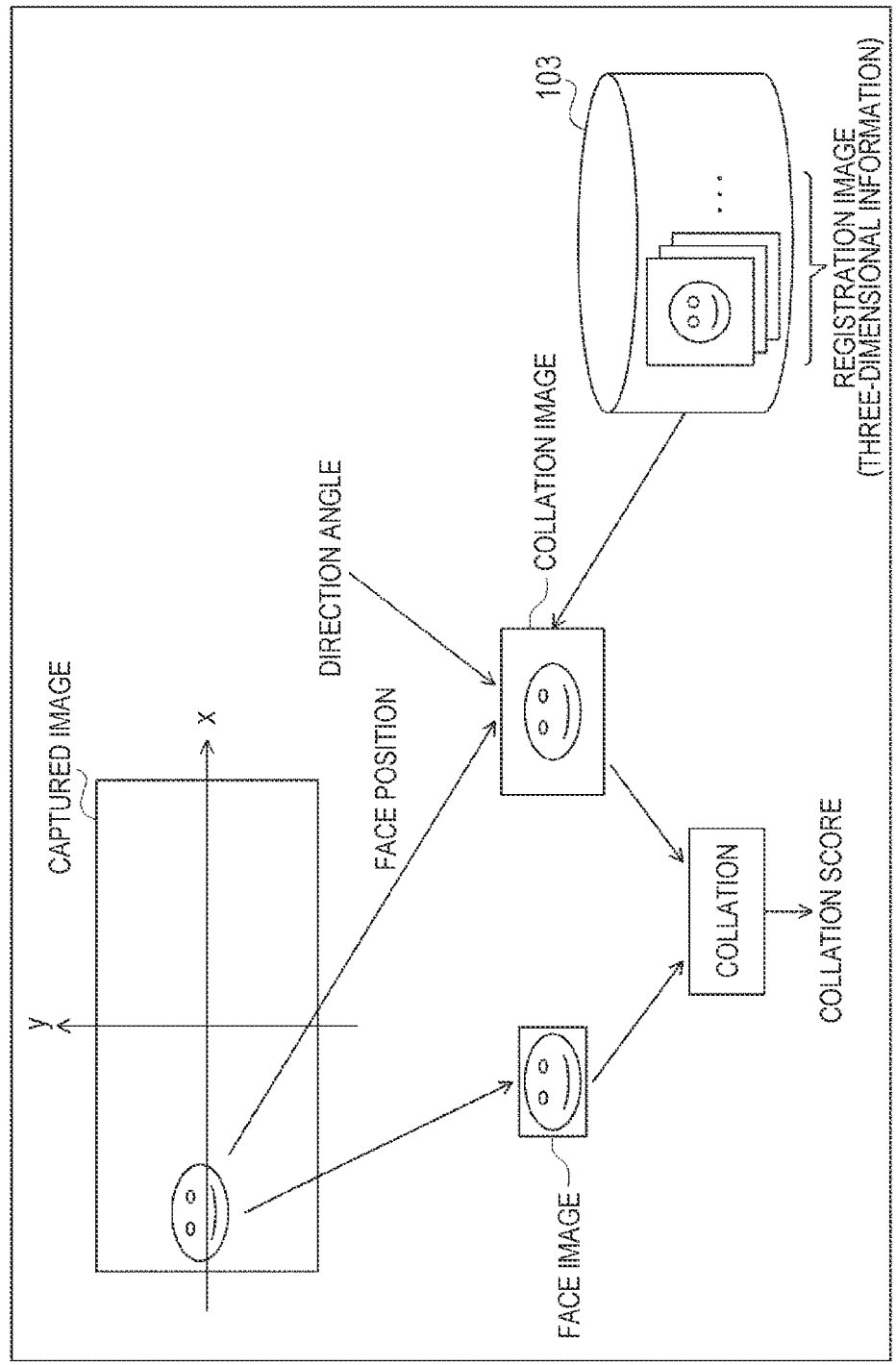
FIG. 11 is a diagram schematically illustrating an example of a collation between a face image and a collation image.

FIG. 11 is a diagram schematically illustrating an example of a collation between the face image and the collation image.

In FIG. 11, the collation image collated with the face image is an image (for example, the registration image mapped to a 3D model using three-dimensional information) obtained by processing the registration image read from the registration image database 103, and is an image indicated by the direction angle according to the programmed sequence, in addition to including the area corresponding to the face position of the face area detected from the captured image.

Here, an instruction on the direction angle is given in the process of step S17 each time the processes of steps S17 to S20 are repeated.

That is, for example, when the instruction method corresponding to all scanning is used, in the process of step S17, for the horizontal swing angle (yaw angle) and the vertical swing angle (pitch angle) of the face, an instruction on the direction angle for scanning at regular intervals such as one step is given.

Specifically, when performing the scanning with the horizontal swing angle (yaw angle) of the face set to 61 steps from −30° to +30° and the vertical swing angle (pitch angle) set to 26 steps from −15° to +10°, each time the process of step S17 is repeated, 1586 (=61×26) types of information regarding the yaw angle and the pitch angle are sequentially given in instruction as the direction angle. As a result, in the process of step S18, the collation images corresponding to the designated direction angles (yaw angle and pitch angle) are sequentially generated.

Then, in the processes of steps S19 and S20, for example, the collation image generated for each of 1586 types of direction angles and the face image cut out from the captured image can be collated, and thus, for example, (direction angle of) a collation image with a maximum authentication score can be selected.

As a method of calculating the authentication score, a known technique such as applying various image processes to the face image and the collation image can be used, for example. This image processing includes, for example, processes such as contour extraction, feature point detection, convolution integration, spectrum analysis, and pattern matching. Further, the image processing is not limited to one processing, and a plurality of processes may be combined.

Further, here, for example, when the face image and the collation image are input to an input layer by using a neural network such as a deep neural network (DNN), processing according to learning may be performed in an intermediate layer to output the authentication score from an output layer. In this case, the authentication score output from this neural network can be used, for example, to scan the direction angle of the collation image with the maximum authentication score.

Note that in this example, since 1586 types of information are designated as the direction angle, the processing may be heavy, but for example, depending on the performance of the information processing apparatus 10A, the purpose of the face authentication, or the like, when processing is performed within the minimum number (for example, 100×100 pixels) of pixels required for the face authentication, even low-performance equipment can perform the collation processing.

Further, the instruction method is not limited to the above-described instruction method corresponding to all scanning, and another instruction method may be used. Here, as another instruction method, a search method executed in the order of S1 to S5 below is illustrated.

(Flow of Search Method)

S1: Store information on statistics of the direction angle of the face previously authenticated S2: When executing the face authentication process, start the scanning with the direction angle with the highest possibility as a starting point on the basis of the stored statistical information.

S3: After starting the scanning, perform the search by roughly swinging the direction angle vertically and horizontally in the direction in which the authentication score increases S4: After identifying the candidate in which the authentication score becomes a mountain, specify an optimum point by finely scanning the direction angle.

S5: When it is determined that the authentication score is greater than or equal to the threshold value, the authentication result is regarded to be "successful" and the direction angle at that time is added to the statistical information.

Note that when the subject 911 is imaged in the center of the angle of view with the wide-angle camera 101, the wide-angle distortion does not occur, so the difference in the wide-angle distortion cannot be detected between the face image including the real face and the face image including the face of the face photograph.

Figure 9:
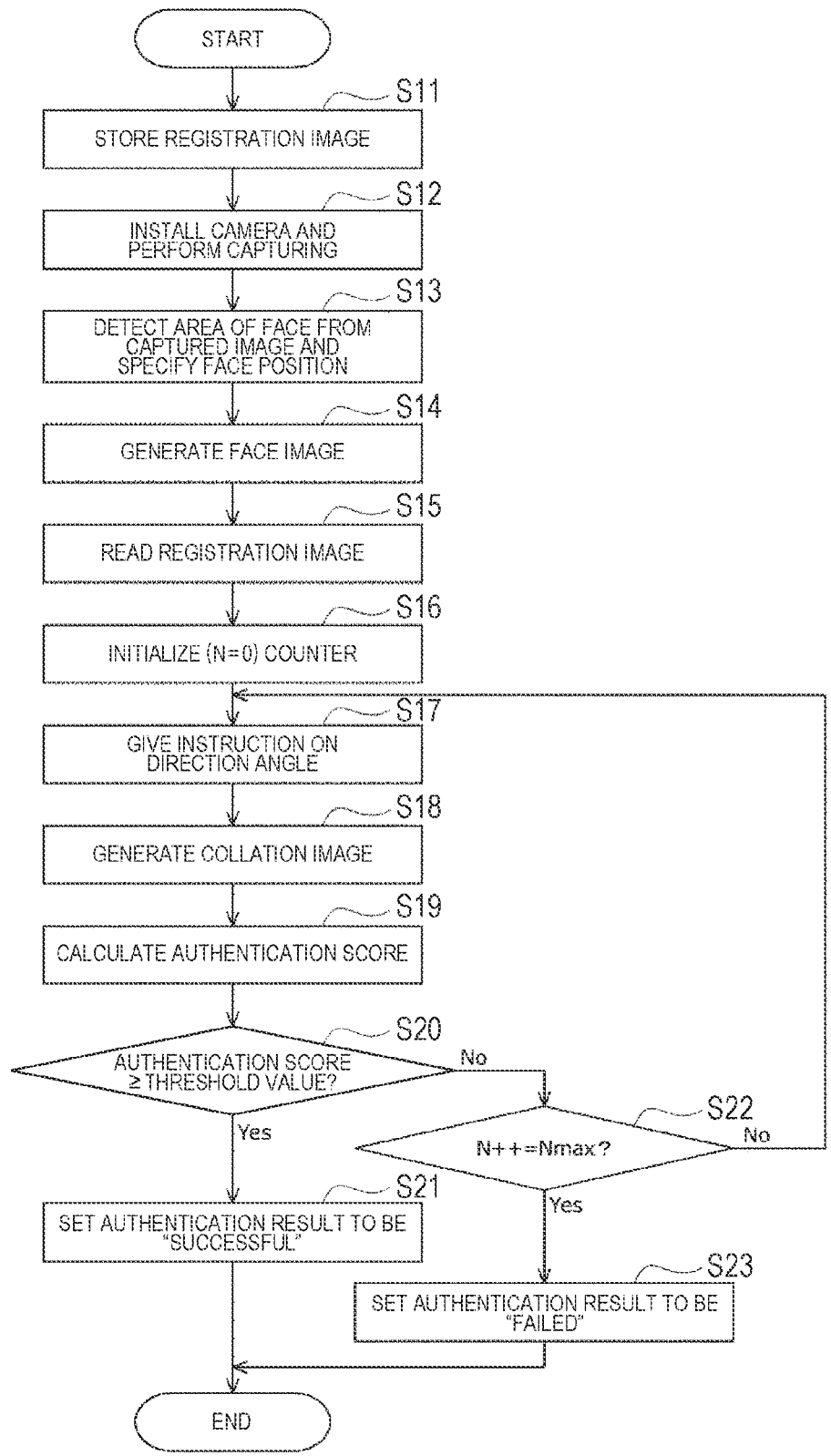
FIG. 9 is a flowchart describing a flow of a first example of face authentication process.

Returning to the description in FIG. 9, when it is determined that the incremented counter value N has reached the maximum value without the recalculated authentication score exceeding the threshold value ("No" in S20 and "Yes" in S22"), the process proceeds to step S23. In step S23, the face authentication unit 105 sets the authentication result to "failed".

In step S21 or S23, when the authentication result obtained by the face authentication process of the subject 911 (face of the authenticated person) is determined to be "successful" or "failed", the authentication result is supplied to the authentication result output unit 106 together with the authentication score, and in the authentication result output unit 106, the information corresponding to the authentication result and the authentication score is output, and the process ends.

The flow of the face authentication process has been described above. In this face authentication process, in addition to the face position information regarding the position of the subject 911 (face of the authenticated person) included in the captured image, the processing is executed by adding the direction angle information on the direction of the subject 911 at that position. In other words, in this face authentication process, it can be said that the distortion of the subject 911 is specified on the basis of the position information indicating the position of the subject 911 included in the captured image and the direction information indicating the direction of the subject 911, and the shape of the subject 911 is identified on the basis of the specified distortion of the subject 911.

Here, when the subject 911 is imaged under any circumstances, since the wide-angle distortion occurs in the captured image due to the combined effect of the face position information and the direction angle information, in general, it is difficult to separate the face position information and the direction angle information from the captured image alone, even under the characteristics of the specific wide-angle lens. On the other hand, in the face authentication process described above, the face position information is obtained from the coordinates and size of the image 912 located in the captured image, while in the collation image, the direction angle is scanned to determine the point where the degree of matching is maximized, and thus, the direction angle information is obtained.

Then, in the face authentication process described above, the difference in the wide-angle distortion that occurs between the three-dimensional face and the face projected on the plane is detected on the basis of the face position information and the direction angle information obtained in this way, so it is determined (identified) whether it is a three-dimensional face (real face) or a face projected on a plane (face of the face photograph), and the spoofing using a face photograph (fake face image) is prevented. In other words, in the case where the face photograph is used, since it has a different distortion from the real face, when the collation is performed assuming wide-angle distortion of real face, the degree of matching in the collation becomes low, and as a result, it becomes possible to identify the face photograph.

2. Second Embodiment

However, a method of distinguishing a real face from a face of a face photograph by movement of a face of an authenticated person, such as blinking or opening/closing of a mouth, is assumed, but by combining such a method with the present technology, more robust spoofing prevention can be realized. Therefore, the configuration and processing flow when the operation instruction to the authenticated person is combined with the face authentication process described above will be described below.

(Configuration of Information Processing Apparatus)

Figure 12:
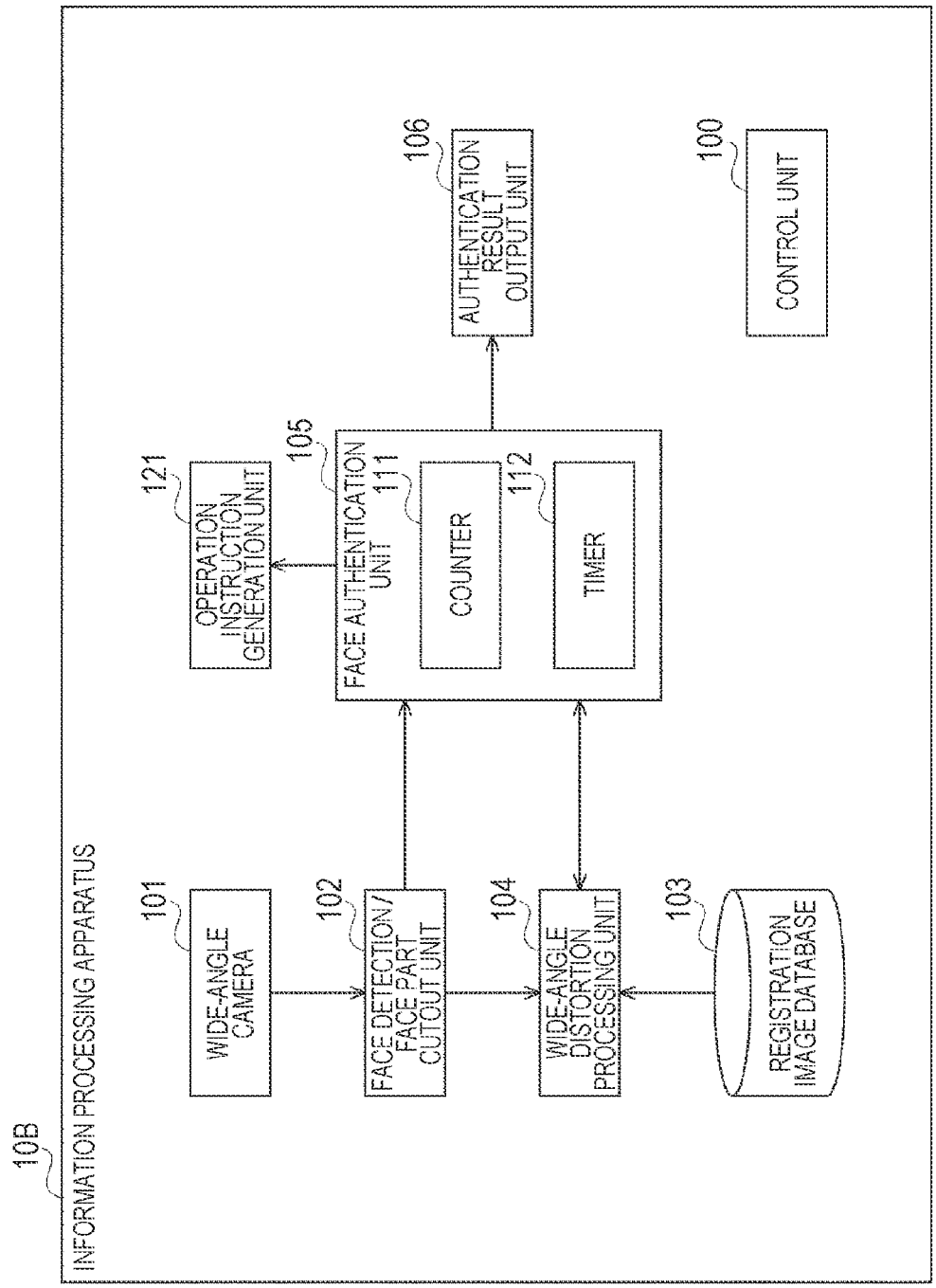
FIG. 12 is a block diagram illustrating a second example of the configuration of the information processing apparatus to which the present technology is applied.

FIG. 12 illustrates a second example of a configuration of an information processing apparatus to which the present technology is applied.

In FIG. 12, an information processing apparatus 10B is different from the information processing apparatus 10A (FIG. 8) in that an operation instruction generation unit 121 is added.

The operation instruction generation unit 121 performs a predetermined operation instruction on the authenticated person on the basis of an operation instruction generation command supplied from the face authentication unit 105.

The face authentication unit 105 supplies the operation instruction generation command to the operation instruction generation unit 121 in accordance with the control from the control unit 100. Further, the face authentication unit 105 detects the presence or absence of a change in response to a predetermined operation instruction as a change in the face image by collating face images having a different image capturing time.

Note that the face authentication unit 105 includes a timer 112 in addition to a counter 111. The timer 112 clocks the time according to the control from the control unit 100.

(Flow of Face Authentication Process)

Figure 13:
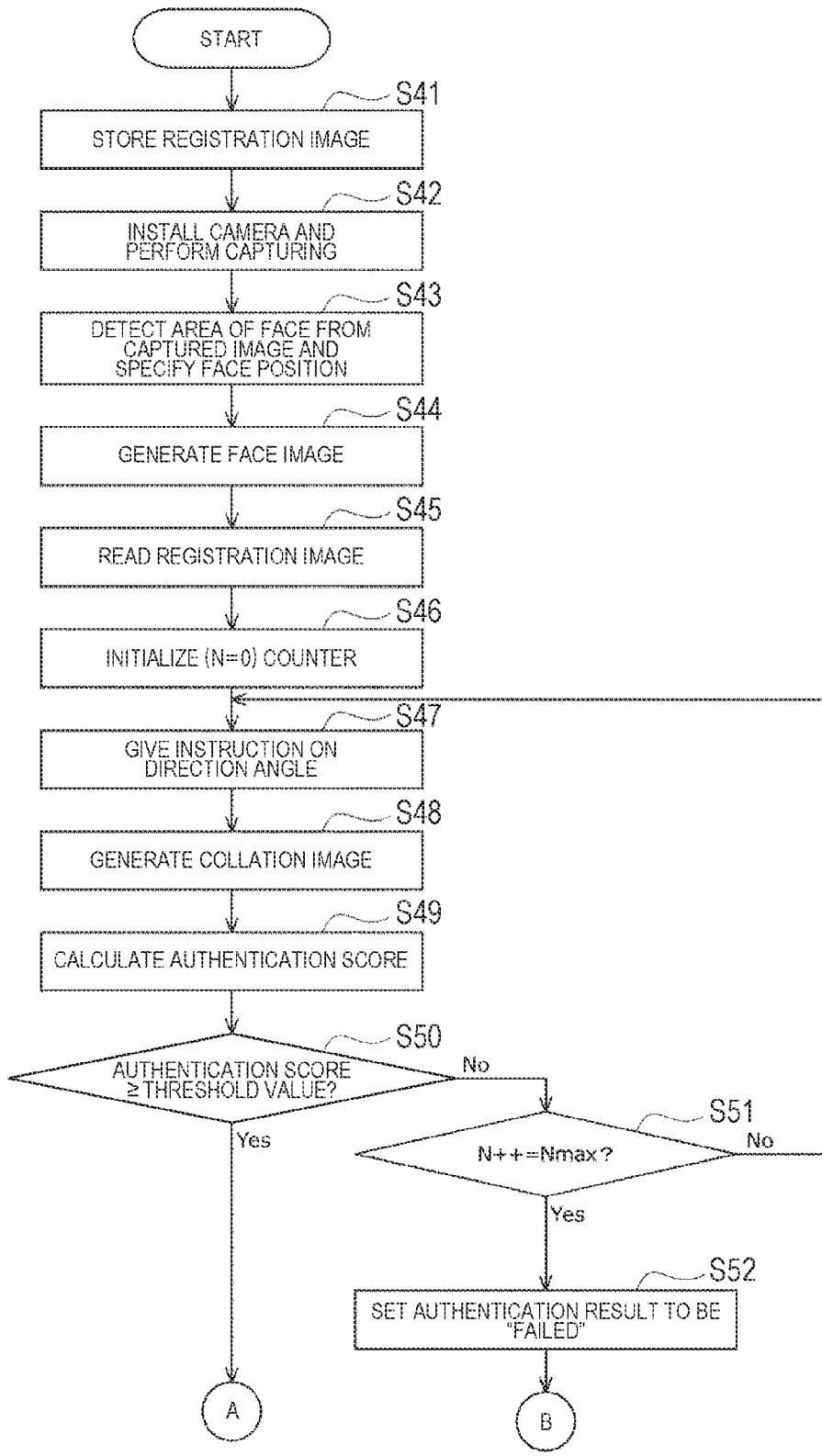
FIG. 13 is a flowchart describing a flow of a second example of the face authentication process.
Figure 14:
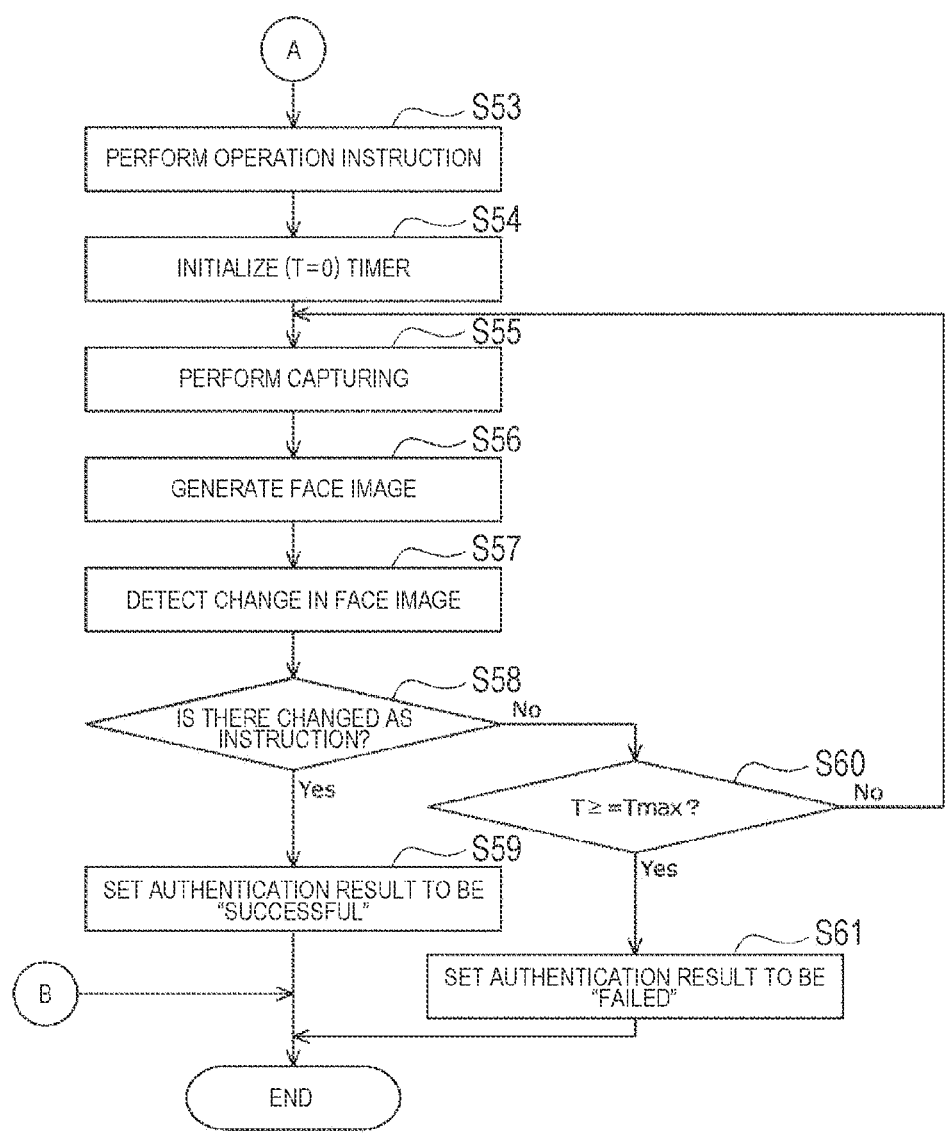
FIG. 14 is a flowchart describing the flow of the second example of the face authentication process.

Next, the flow of the face authentication process executed by the information processing apparatus 10B in FIG. 12 will be described with reference to the flowcharts in FIGS. 13 and 14.

In steps S41 to S50, a face image is generated from the captured image, a collation image corresponding to the designated direction angle is generated, and the generated face image and collation image are collated in the similar manner as in steps S11 to S20 in FIG. 9, and thus, the authentication score is calculated.

Here, when it is determined in the determination process of step S50 that the authentication score is less than the threshold value, the processes of steps S47 to S50 are repeated, and collation images corresponding to the changed direction angles are sequentially generated, and the authentication score with the face image is calculated sequentially.

Then, when the recalculated authentication score is sequentially compared with the threshold value, it is determined that the score is less than the threshold value, and it is determined that the incremented counter value N has reached the maximum value ("No" in S50, and "Yes" in S51), the authentication result is "failed" (S52). On the other hand, when the recalculated authentication score is determined to be greater than or equal to the threshold value ("Yes" in S50), the authentication result is considered to be likely to be "successful" and the process proceeds to step S53 in FIG. 14.

In step S53, the operation instruction generation unit 121 performs the instruction of the operations such as the blinking or the opening/closing of the mouth on the authenticated person by a display of information, an output of audio, or the like, on the basis of the operation instruction generation command notification of which is provided from the face authentication unit 105 At this time, in the face authentication unit 105, the timer 112 is initialized and is reset to T=0 (S54). Then, the timer value T is incremented according to the passage of time thereafter.

In step S55, the wide-angle camera 101 continues to image a subject 911. By this image capturing, a captured image including the subject 911 that has performed an operation according to a predetermined operation instruction (for example, blinking or opening/closing of the mouth) can be obtained.

In step S56, the face detection/face part cutout unit 102 cuts out the face area from the captured image and performs predetermined image processing to generate the face image.

In step S57, the face authentication unit 105 collates the face image (previous face image) transmitted earlier in time with the face image (later face image) transmitted after that, and detects the presence or absence of a change in response to a predetermined operation instruction (for example, blanking or opening/closing of the mouth) as the change in the face image. Here, note that as the previous face image and the later face image, the face image generated in the process of step S44 and the face image generated in the process of step S56 can be used, respectively.

In step S58, the face authentication unit 105 determines whether or not there is the change as the predetermined operation instruction on the basis of the result of detecting the change in the face image.

When it is determined in the determination process of step S58 that there is no change as the predetermined operation instruction, the process proceeds to step S60. In step S60, the face authentication unit 105 determines whether or not a timer value T indicated by the timer 122, which is incremented with the passage of time, has reached a time limit (Tmax).

In step S60, when it is determined that the timer value T has not reached the time limit, the process returns to step S55, and the processes of steps S55 to S58 are repeated.

That is, by repeating the processes of steps S55 to S58, the image capturing of the subject 911 is continued, the face images are sequentially generated in chronological order, the previous face image and the later face image are collated, and the process of determining whether or not there is a change as the predetermined operation instruction is repeated.

Note that as the previous face image to be collated and the later face image to be collated, a face image generated in the Nth step S56 process and a face image generated in the N+1th step S56 process can be used. However, the face images used for collation are not limited to one image at a time, but may be a unit of a plurality of images, and may not necessarily be continuously generated in time.

Then, when it is determined in the determination process of step S58 that there is no change as the predetermined operation instruction, the process proceeds to step S59. In step S59, the face authentication unit 105 sets the authentication result to "successful".

In addition, when it is determined that the timer value T has reached the time limit without detecting the change as the operation instruction by the collation between previous and later face images ("No" in S58 and "Yes" in S60), the process proceeds to step S61. In step S61, the face authentication unit 105 sets the authentication result to "failed".

When the authentication result is "successful" or "failed" in step S52, S59, or S61, the authentication result is supplied to the authentication result output unit 106 together with the authentication score, and in the authentication result output unit 106, the information according to the authentication result and authentication score is output, and the process ends.

The flow of the face authentication process has been described above. In this face authentication process, on the basis of the face position information and direction angle information of the subject included in the captured image, the difference in the wide-angle distortion that occurs between the real face and the face of the face photograph is detected, and when the process of determining whether the subject is the real face or the face of the face photograph is performed, the operation instruction is performed on the authenticated person, and by combining the process of determining whether or not the operation is performed according to the instruction, more robust spoofing prevention can be realized.

3. Third Embodiment

The first and second embodiments described above shows a method of searching for the optimum point by performing the scanning according to the direction angle information by focusing on the fact that the distortion of the subject 911 included in the captured image depends on both of the position information (face position information) on the area where the subject 911 is located in the captured image and the direction information (direction angle information) on the direction of the subject 911.

Meanwhile, in recent years, research on machine learning such as a neural network (NN) has been actively conducted, but for example, the direction information can be learned using deep learning, which is one of algorithms of the neural network, which can be applied to the present technology. Therefore, the configuration when the neural network is used is shown below.

(Configuration of NN)

Figure 15:
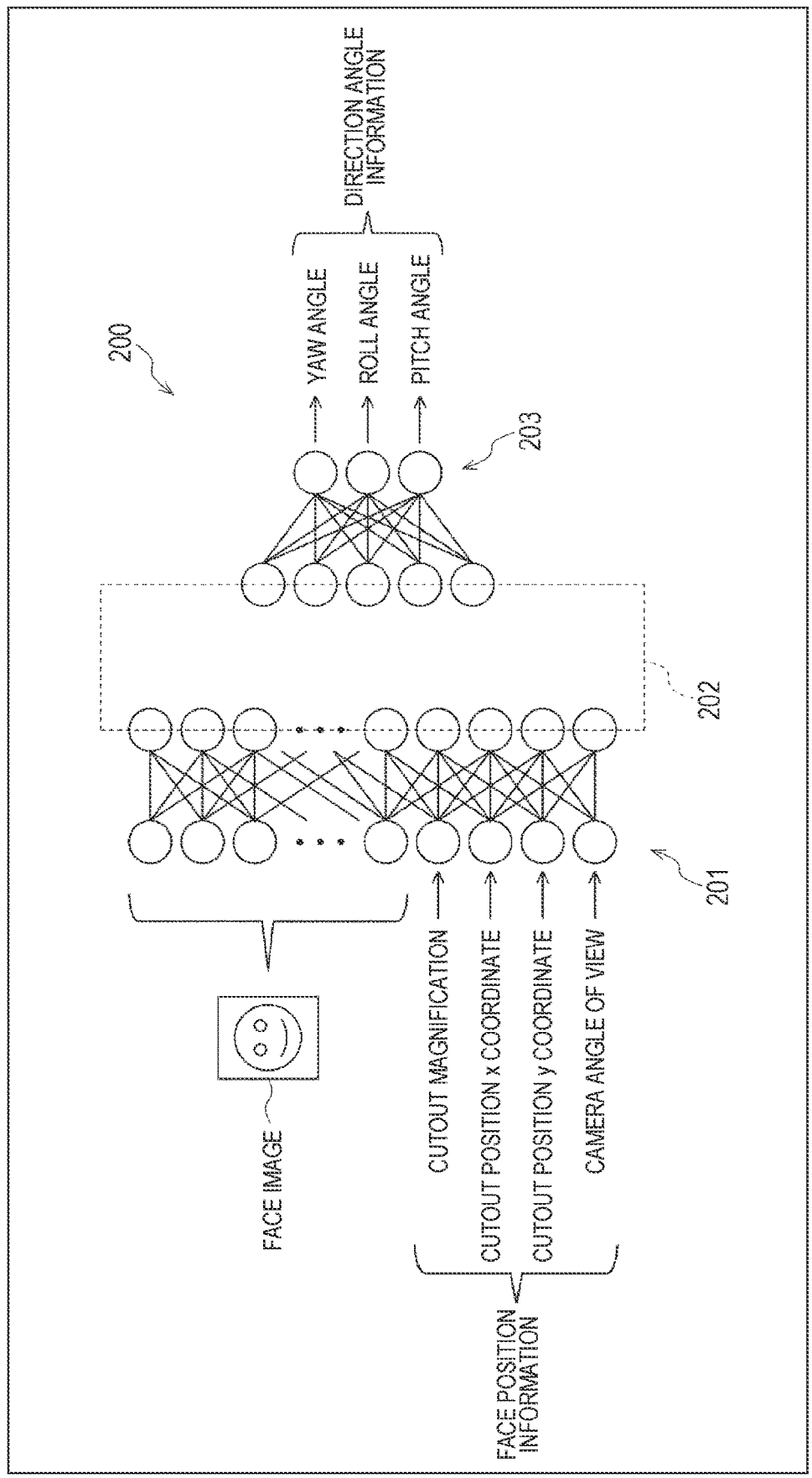
FIG. 15 is a diagram illustrating a first example of a configuration of a neural network to which the present technology is applied.

FIG. 15 illustrates a first example of a configuration of the neural network to which the present technology is applied.

In FIG. 15, a neural network 200 includes an input layer 201, an intermediate layer 202, and an output layer 203, and each layer has a structure in which a plurality of nodes is connected by edges.

In FIG. 15, white circles (○) in the figure represent nodes, and straight lines connecting each circle represent the edges. Further, the intermediate layer 202 represented by a dotted line frame in the figure can have a plurality of layers, and in particular, one having a deep intermediate layer (hidden layer) is called deep learning. Here, each layer has a function called an activation function, and the edges can have weights. Then, values of each node are calculated from a value of a node of the layer before connecting to the node, that is, a value of a node of a previous layer, a value of a weight of the connection edge, and the activation function of the layer.

Further, in the neural network 200, in the learning process, task data is given to the input layer 201 and answer data is given to the output layer 203, and in the intermediate layer 202, a calculation formula of each node (neuron) inside the intermediate layer 202, the connection of the edges between the nodes, or the like is adjusted so that the task and the answer form a correlation. In this learning, for example, an algorithm such as backpropagation can be used.

In the neural network 200, when a face image and face position information are input to the input layer 201, processing according to learning is executed in the intermediate layer 202, and direction angle information is output from the output layer 203. That is, in the learning process of the neural network 200, the direction angle information is included in parameters (learning parameters) used in the learning.

Here, the face position information can include, for example, information such as a cutout magnification when the face area included in the captured image is cut out and the size is adjusted, and x and y coordinates of a cutout position, or a camera angle of view of the captured image. Further, the direction angle information can include, for example, at least one angle among a yaw angle, a roll angle, and a pitch angle.

(Configuration of Information Processing Apparatus)

Figure 16:
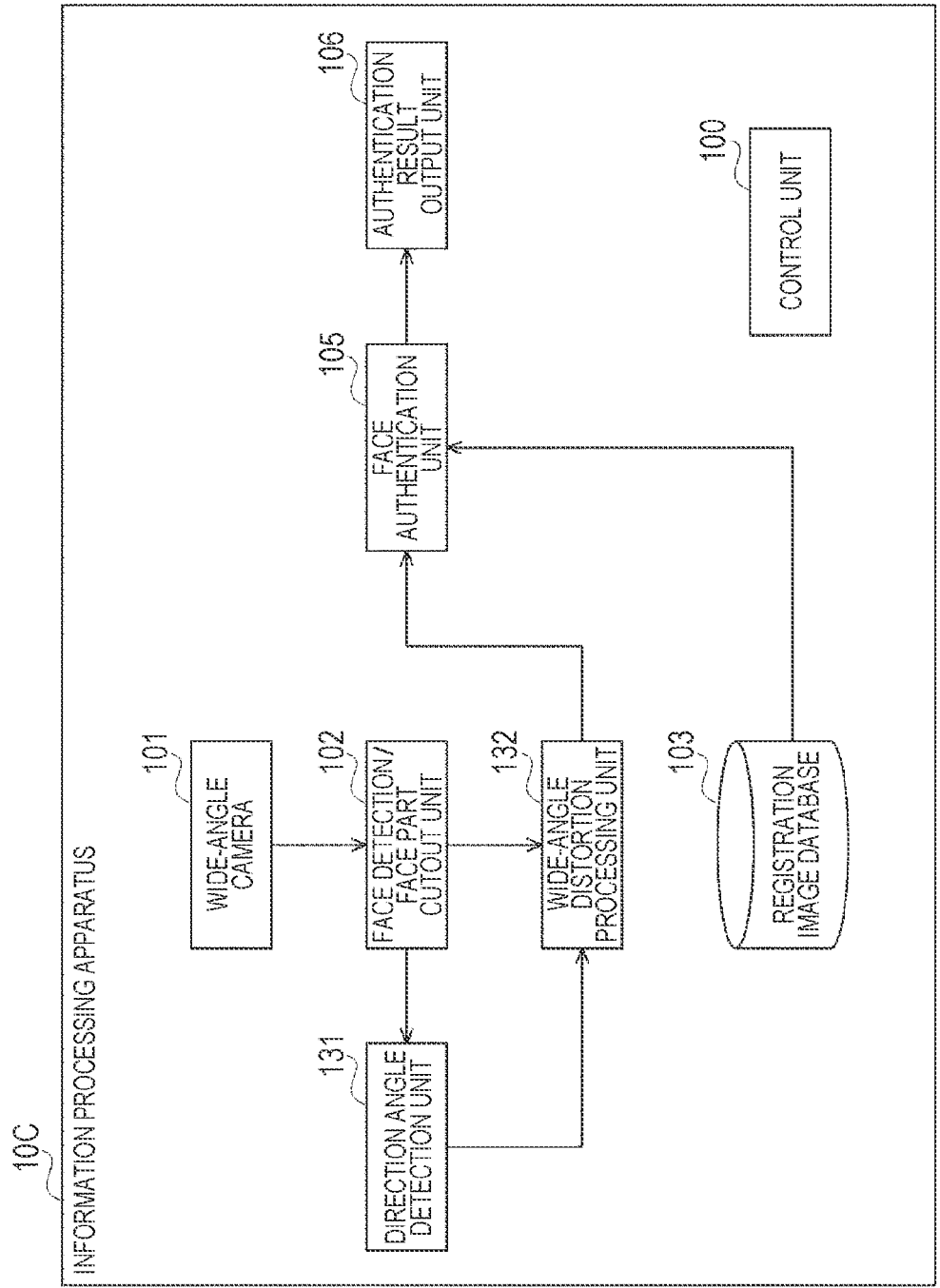
FIG. 16 is a block diagram illustrating a third example of the configuration of the information processing apparatus to which the present technology is applied.

FIG. 16 illustrates a third example of a configuration of an information processing apparatus to which the present technology is applied.

In FIG. 16, an information processing apparatus 10C is different from the information processing apparatus 10A (FIG. 8) in that a direction angle detection unit 131 is added and instead of the wide-angle distortion processing unit 104, a wide-angle distortion correction unit 132 is provided.

The face image and the face position information are supplied to the direction angle detection unit 131 from the face detection/face part cutout unit 102. The direction angle detection unit 131 includes the neural network 200 (FIG. 15), or is configured to be able to use the neural network 200 (FIG. 15) provided by a server connected to the network.

The direction angle detection unit 131 uses the neural network 200 to input the face image and the face position information to the input layer 201, and acquires the direction angle information output from the output layer 203 to detect the direction angle of the subject 911 included in the captured image. The direction angle detection unit 131 supplies the direction angle information to the wide-angle distortion correction unit 132.

The wide-angle distortion correction unit 132 is supplied with the face image and the face position information from the face detection/face part cutout unit 102 and the direction angle information from the direction angle detection unit 131.

The wide-angle distortion correction unit 132 corrects the wide-angle distortion of the face image on the basis of the direction angle information, and supplies the corrected face image (hereinafter referred to as the correction face image) to the face authentication unit 105.

The face authentication unit 105 is supplied with a correction face image from the wide-angle distortion correction unit 132 and a registration image from the registration image database 103. The face authentication unit 105 calculates an authentication score by collating the correction face image and the registration image.

The face authentication unit 105 performs the face authentication to determine whether or not the subject 911 is a legitimate authenticated person on the basis of the calculated authentication score. The face authentication unit 105 supplies the calculated authentication score and the authentication result to the authentication result output unit 106.
(Flow of Face Authentication Process)

Next, the flow of the face authentication process executed by the information processing apparatus 10C in FIG. 16 will be described with reference to the flowchart in FIG. 17.

In step S71, the registration image database 103 stores (data of) the registration image according to the control from the control unit 100. However, here, it is not necessary to hold the data of the three-dimensional information as in the first and second embodiments described above.

In step S72, the wide-angle camera 101 is installed so that the subject 911 (face of the authenticated person) can be imaged at an angle at which the wide-angle distortion can be used, and images the subject 911. Here, for example, as illustrated in FIG. 10 described above, by installing the wide-angle camera 101 at a predetermined angle with respect to the front of the subject 911, the image capturing is performed so that at least part of the face of the authenticated person is off the center of the camera angle of view.

In step S73, the face detection/face part cutout unit 102 detects the face area from the captured image captured by the wide-angle camera 101 and specifies the position (face position) according to the area.

In step S74, the face detection/face part cutout unit 102 cuts out the face area from the captured image and performs a cutting-out process to standardize the size and brightness of the cutout face area, thereby generating the face image.

In step S75, the direction angle detection unit 131 uses the neural network 200 of FIG. 15 to input the face image and the face position information generated by the face detection/face part cutout unit 102 to the input layer 201 and acquire the direction angle information output from the output layer 203, thereby detecting the direction angle of the subject 911.

In step S76, the wide-angle distortion correction unit 132 corrects the face image generated by the face detection/face part cutout unit 102 on the basis of the direction angle detected by the direction angle detection unit 131. In this correction, the wide-angle distortion of the face image is corrected.

In step S77, the face authentication unit 105 reads the registration image to be collated from the registration image database 103.

In step S78, the face authentication unit 105 collates the correction face image corrected by the wide-angle distortion correction unit 132 and the registration image read from the registration image database 103 to calculate the authentication score.

In step S79, the face authentication unit 105 determines whether or not the calculated authentication score is greater than or equal to a predetermined threshold value.

When it is determined in the determination process of step S79 that the authentication score is greater than or equal to the threshold value, the process proceeds to step S80. In step S80, the face authentication unit 105 sets the authentication result to be "successful".

Meanwhile, when it is determined in the determination process of step S79 that the authentication score is less than or equal to the threshold value, the process proceeds to step S81. In step S81, the face authentication unit 105 sets the authentication result to "failed".

FIG. 18 schematically illustrates an example of the collation between the correction face image and the registration image.

In FIG. 18, the correction face image collated with the registration image is generated by correcting the wide-angle distortion for the face image according to the face area detected from the captured image, on the basis of the direction angle indicating the direction angle of the subject 911.

Here, the direction angle is obtained by using the neural network 200 in which the process of step S75 is executed, the face image and the face position information are input to the input layer 201, and the direction angle information is output from the output layer 203. This direction angle information includes, for example, a yaw angle and a pitch angle.

As described above, in the third embodiment, as in the first and second embodiments described above, it is not necessary to scan the direction angle of the subject 911, and instead of performing the distortion processing on the pre-registered registration image, the face image obtained from the captured image is corrected on the basis of the direction angle obtained by using the neural network and used for collation.

The authentication performed by collating the correction face image and the registration image is performed by, for example, the following principle.

Figure 19B:
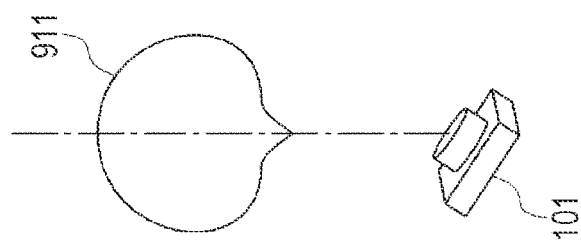
FIGS. 19A and 19B are diagrams schematically illustrating an example of capturing an image of a face of a face photograph and a real face.
Figure 19A:
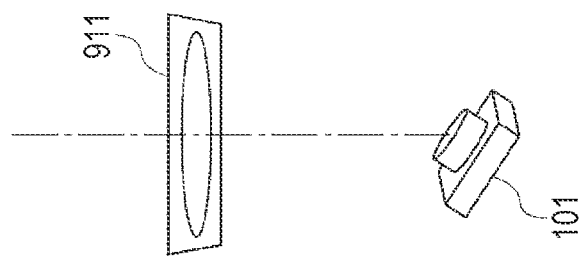

That is, as illustrated in FIGS. 19A and 19B, assuming that the subject 911 imaged by the wide-angle camera 101 is the face of the face photograph and the real face, in the correction for the face image when the real face is imaged, it is possible to appropriately correct the wide-angle distortion on the basis of the direction angle (FIG. 19B). Meanwhile, in the correction for the face image when the face of the face photograph is imaged, since the face photograph is not three-dimensional and the information on the correct direction angle cannot be obtained, when the correct correction is performed, the face image will be rather distorted (FIG. 19A).

In other words, in FIGS. 19A and 19B, since the wide-angle camera 101 is installed at an angle with respect to the front of the subject 911 (the subject 911 directly faces the camera), the image 912 is formed in the peripheral portion of the angle of view, and in the face image when imaging the real face and the face image when imaging the face of the face photograph, the wide-angle distortion occurs in both the face images.

For example, when comparing the actual face image, the face image including the real face has a different distortion depending on the part of the face (for example, it feels a little chubby), but since in the face image including the face of the face photograph, the face is distorted evenly and diagonally (for example, it feels neat), it is not possible to obtain the information on the correct direction angle, and when the correct correction is performed, the face image will be distorted.

Specifically, when the subject 911 (face of the authenticated person) is the real face, since the collation using the correction face image whose wide-angle distortion is appropriately corrected and the registration image is performed, the degree of matching (authentication score) in the collation becomes high. Meanwhile, when the subject 911 is the face of the face photograph, it is not possible to obtain the information on the correct direction angle, and when the correct correction is applied to the face image, since the face image is rather distorted, the degree of matching (authentication score) in the collation becomes low when such a correction face image is collated with the registration image.

Here, by determining the degree of matching in such collation, it is determined whether the face of the authenticated person is the real face (or the face of the face photograph), that is, the authentication result is "successful" (or "failed").

Note that when the subject 911 is imaged in the center of the angle of view with the wide-angle camera 101, the wide-angle distortion does not occur, so the difference in the wide-angle distortion cannot be detected between the face image including the real face and the face image including the face of the face photograph.

Figure 17:
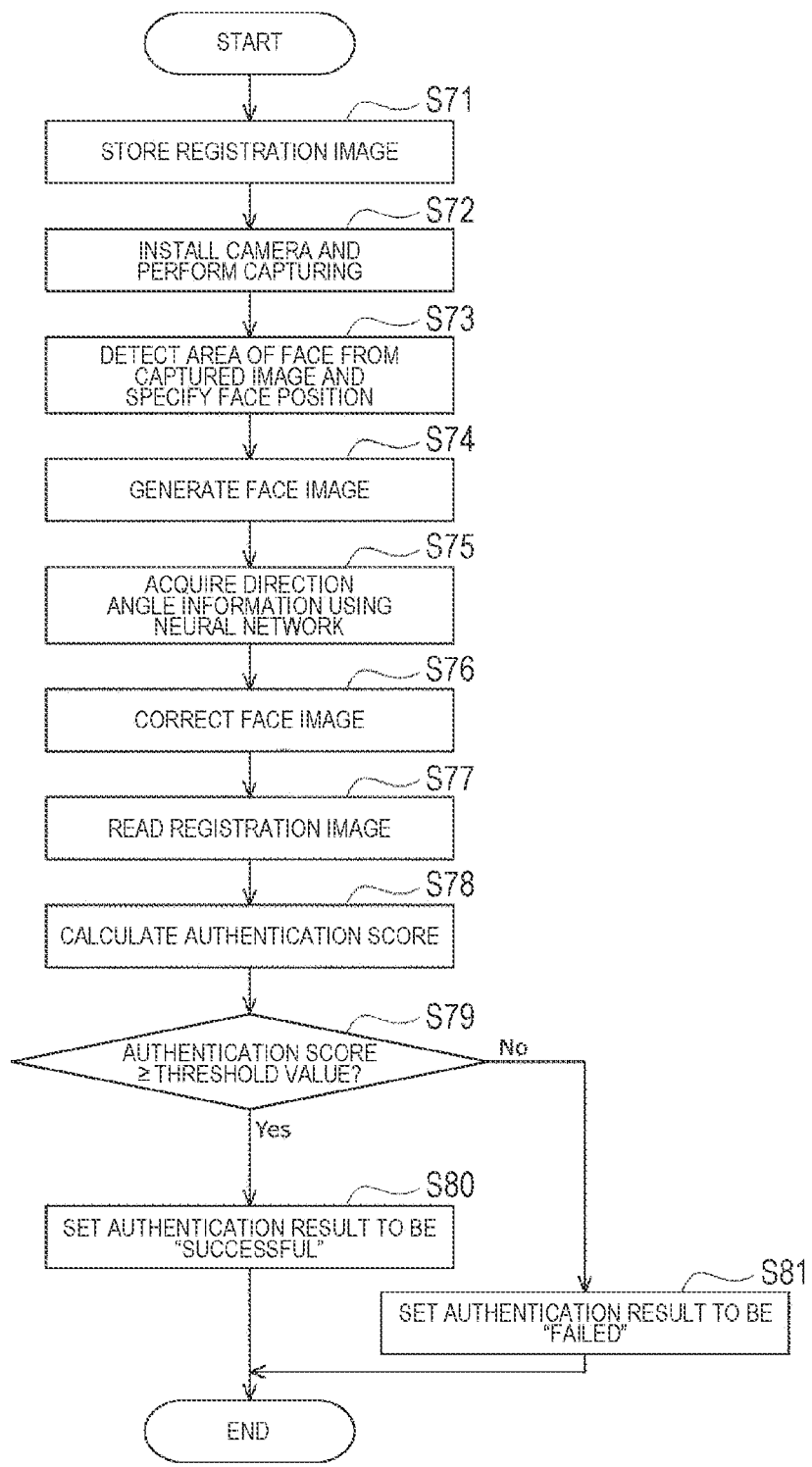
FIG. 17 is a flowchart describing a flow of a third example of the face authentication process.

Returning to the description in FIG. 17, when the authentication result is "successful" or "failed" in step S80 or S81, the authentication result is supplied to the authentication result output unit 106 together with the authentication score, and in the authentication result output unit 106, the information according to the authentication result and authentication score is output, and the process ends.

The flow of the face authentication process has been described above. In this face authentication process, on the basis of the face position information and the direction angle information of the subject included in the captured image, the difference in the wide-angle distortion that occurs between the real face and the face of the face photograph is detected, and when the process of determining whether the subject is the real face or the face of the face photograph is performed, the direction angle information is acquired using the neural network.

Therefore, in the first and second embodiments described above, it was necessary to perform the scanning in order to obtain the direction angle information, but in the third embodiment, since the information indicating the direction angle can be uniquely detected by using the neural network, the face authentication can be realized without repeating trials.

In addition, when the collation of the image is performed, instead of generating the collation image by performing the distortion processing on the registration image, since the correction face image with the corrected face image is used, in the registration image database 103, it is not necessary to have three-dimensional information in addition to the registration image, which is preferable in terms of personal information protection.

(Other Configurations Using Neural Network)

In the above description, in the information processing apparatus 10C (FIG. 16), the case where the direction angle detection unit 131 acquires the direction angle information by using the neural network 200 is illustrated, but for example, a high-performance pattern matching technology or the like is used, and other configurations may be adopted.

FIG. 20 illustrates an example of another configuration of the information processing apparatus using the neural network.

In FIG. 20, the information processing apparatus 10D is different from the information processing apparatus 10C (FIG. 16) in that direction angle detection unit 131 and the wide-angle distortion correction unit 132 are removed, and instead of the face authentication unit 105, the face authentication unit 133 is provided.

That is, the face authentication unit 133 corresponds to the one in which the direction angle detection unit 131, the wide-angle distortion correction unit 132, and the face authentication unit 105 illustrated in FIG. 16 are integrated.

Then, assuming that the neural network is also used for the face authentication in the face authentication unit 133, the neural network of the face authentication may be integrated with the neural network 200 (FIG. 15) that inputs the above-described face image and face position information and outputs the direction angle information.

As a result, in the integrated neural network (hereinafter referred to as the integrated neural network), when the collation of the image is performed, it is also possible to directly match the face image with the registration image without converting the face image into the correction face image once.

The face authentication unit 133 is supplied with the face image and the face position information from the face detection/face part cutout unit 102 and the registration image from the registration image database 103. The face authentication unit 133 includes the integrated neural network or is configured to be able to use the integrated neural network provided by a server connected to the network.

The face authentication unit 133 acquires the authentication score and the authentication result output from the output layer by inputting the face image, the face position information, and the registration image to the input layer by using the integrated neural network, and supplies the acquired authentication score and authentication result to the authentication result output unit 106.

Note that in the integrated neural network, the direction angle information is included as a learning parameter in the learning process. As a result, in the integrated neural network, when the face image, the face position information, and the registration image are input to the input layer, the processing according to learning is performed in the intermediate layer, and the authentication score and the authentication result including the direction angle information can be output from the output layer.

4. Fourth Embodiment

In the third embodiment described above, the configuration is shown in which the direction angle information, that is, the direction of the subject 911 is obtained by using the neural network 200. Meanwhile, when the neural network is used, it is possible to estimate whether or not the subject 911 is two-dimensional (or three-dimensional). Therefore, another configuration when the neural network is used is shown below.

(Configuration of NN)

FIG. 21 illustrates a second example of a configuration of the neural network to which the present technology is applied.

In FIG. 21, a neural network 300 includes an input layer 301, an intermediate layer 302, and an output layer 303, and each layer has a structure in which a plurality of nodes is connected by edges.

In the neural network 300, in the learning process, task data is given to the input layer 301, and at the same time, answer data is given to the output layer 303, and by adjusting the calculation formula of each node of the content, the connection of edges between the nodes in the intermediate layer 302, or the like so that the task and the answer form a correlation, the learning about a tendency of distortion of the face image is performed.

That is, in the neural network 300, by learning whether or not the tendency of the distortion of the face image is consistent with the face position, when the face image and the face position information are input to the input layer 301, in the intermediate layer 302, it is determined whether the input face image is a tendency of distortion of a two-dimensional person (or whether the input face image is a distortion tendency of the face of the three-dimensional person), and plane probability information indicating the probability of being in the plane is output from the output layer 303.

(Configuration of Information Processing Apparatus)

Figure 22:
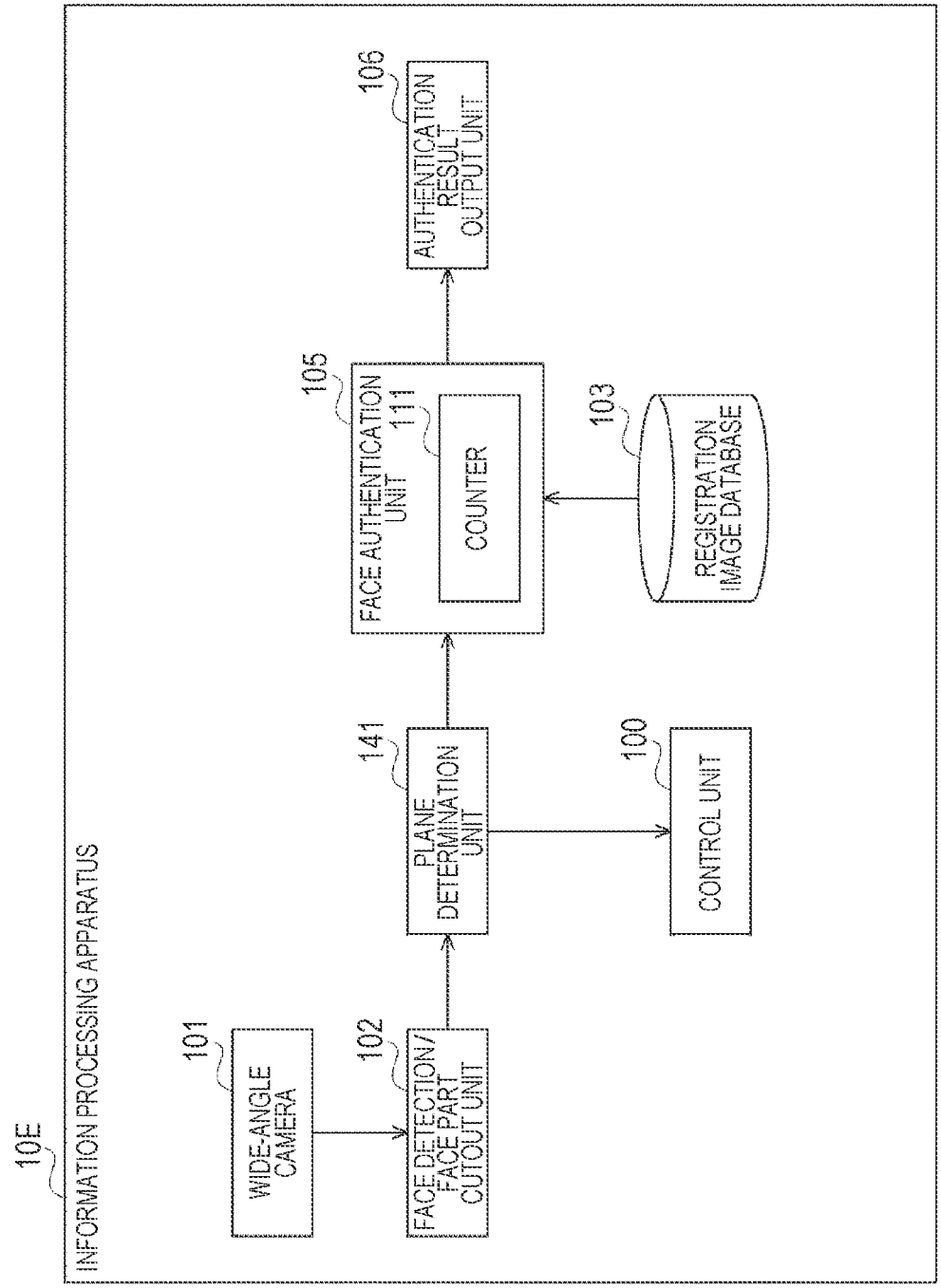
FIG. 22 is a block diagram illustrating a fourth example of the configuration of the information processing apparatus to which the present technology is applied.

FIG. 22 illustrates a fourth example of a configuration of an information processing apparatus to which the present technology is applied.

In FIG. 22, an information processing apparatus 10E is different from the information processing apparatus 10A (FIG. 8) in that a plane determination unit 141 is provided instead of the wide-angle distortion processing unit 104.

The plane determination unit 141 is supplied with the face image and the face position information from the face detection/face part cutout unit 102. The plane determination unit 141 includes the neural network 300 (FIG. 21), or is configured to be able to use the neural network 300 (FIG. 21) provided by the server connected to the network.

The plane determination unit 141 uses the neural network 300 to input the face image and the face position information to the input layer 301, and acquires the plane probability information output from the output layer 303 to perform the plane determination of the input face image. The plane determination unit 141 supplies the result of the plane determination of the face image to the face authentication unit 105.

The face authentication unit 105 is supplied with the result of the plane determination of the face image from the plane determination unit 141 and the registration image from the registration image database 103. The face authentication unit 105 collates the face image determined to be a stereoscopic image in the plane determination by the plane determination unit 141 and the registration image sequentially read from the registration image database 103, thereby calculating the authentication score.

The face authentication unit 105 performs the face authentication to determine whether or not the subject 911 is a legitimate authenticated person on the basis of the calculated authentication score. The face authentication unit 105 supplies the calculated authentication score and the authentication result to the authentication result output unit 106.

(Flow of Face Authentication Process)

Next, the flow of the face authentication process executed by the information processing apparatus 10E in FIG. 22 will be described with reference to the flowchart in FIG. 23.

In step S101, the registration image database 103 stores (data of) the registration image according to the control from the control unit 100. Here, for example, the registration image data including the face image of the person who wants to be authenticated in advance for M people is stored.

In step S102, the wide-angle camera 101 is installed so that the subject 911 (face of the authenticated person) can be imaged at an angle at which the wide-angle distortion can be used, and images the subject 911.

In step S103, the face detection/face part cutout unit 102 detects the face area from the captured image captured by the wide-angle camera 101 and specifies the position (face position) according to the area.

In step S104, the face detection/face part cutout unit 102 cuts out the face area from the captured image and performs a cutting-out process to standardize the size and brightness of the cutout face area, thereby generating the face image.

In step S105, the plane determination unit 141 uses the neural network 300 of FIG. 21 to input the face image and the face position information generated by the face detection/face part cutout unit 102 to the input layer 301 and acquire the plane probability information output from the output layer 303, thereby performing the plane determination of the face image.

In step S106, the control unit 100 determines whether or not the face image is the stereoscopic image on the basis of the result of the plane determination by the plane determination unit 141.

When it is determined in the determination process of step S106 that the face image is not the stereoscopic image, the process returns to step S102, and the processes of steps S102 to S105 described above are repeated. That is, in this case, since the face image is the plane image, that is, the face photograph captured, the plane determination process is repeated until the face image is determined to be the stereoscopic image.

In addition, when the face image is determined to be the stereoscopic image in the determination process of step S106, since the face image is the image of the real face, the process proceeds to step S107, and since the face authentication unit 105 and the authentication result output unit 106 operate, the processes of steps S107 to S114 are executed.

That is, in the face authentication unit 105, the counter 111 is initialized and a counter value is reset to N=0 (S107). In addition, at this time, the authentication result output unit 106 is set to the initial state (S107).

Subsequently, the face authentication unit 105 collates the face image determined to be the stereoscopic image by the plane determination and a registration image i(N) read from the registration image database 103 (S108), and calculates an authentication score s(N) (S109). As a result, in the authentication result output unit 106, the authentication scores s(N) from the face authentication unit 105 are sorted in order of score (S110) and displayed together with the counter value of the counter 111.

Then, the face authentication unit 105 increments the counter value N, and determines whether or not the counter value N has reached the number M of registered people M of the registration image (S111). When it is determined in the determination process of step S111 that the incremented counter value N has not reached the number of registered people M, the process returns to step S108, and the processes of steps S108 to S110 are repeated.

That is, since face images for M people are registered as registration images in the registration image database 103 (S101), every time the face image determined to be the stereoscopic image by the plane determination (S106) is collated with a registration image (face image) of a person (S108), the counter value N is incremented (S111), and by repeating the collation with the registration image of any person, or the like (S108 to S110) until the counter value N reaches the number of registered people M ("Yes" in S111), the collation with the registration images for M people is performed.

When it is determined in the determination process of step S111 that the incremented counter value N has reached the number of registered people M, the process proceeds to step S112.

In step S112, the face authentication unit 105 selects the highest authentication score s(max) among the authentication scores s(N) obtained by collating the face image determined to be the stereoscopic image with the registration images for M people. For example, in the authentication result output unit 106, candidates for people to be authenticated are displayed in order of score on the basis of the output from the face authentication unit 105, so the face authentication unit 105 may select the highest authentication score s(max).

In step S113, the face authentication unit 105 determines whether or not the selected highest authentication score s(max) is greater than or equal to a predetermined threshold value.

When it is determined in the determination process of step S113 that the authentication score s(max) is greater than or equal to the threshold value, the process proceeds to step S114. In step S114, the face authentication unit 105 sets the authentication result to be "successful". Then, the authentication result is supplied to the authentication result output unit 106 together with the authentication score s(max), and in the authentication result output unit 106, the information corresponding to the authentication result and the authentication score is output, and the process ends.

When it is determined in the determination process of step S113 that the authentication score s(max) is less than the threshold value, the process returns to step S102, and the above-described process is repeated.

The flow of the face authentication process has been described above. In this face authentication process, the plane probability information indicating whether the input face image has the tendency of the distortion of the two-dimensional person (or tendency of distortion of a face of a three-dimensional person) using a neural network is obtained, and on the basis of the probability of being a plane (or the probability of being a solid), it is possible to determine whether the subject is the real face or the face of the face photograph.

5. Fifth Embodiment

In the fourth embodiment described above, the plane determination process has been described as an essential process, but the plane determination process may be an arbitrary process. Then, a configuration having a function (on/off function) for switching whether or not to execute the plane determination process when using the neural network 300 is shown below.

(Configuration of NN)

Figure 24:
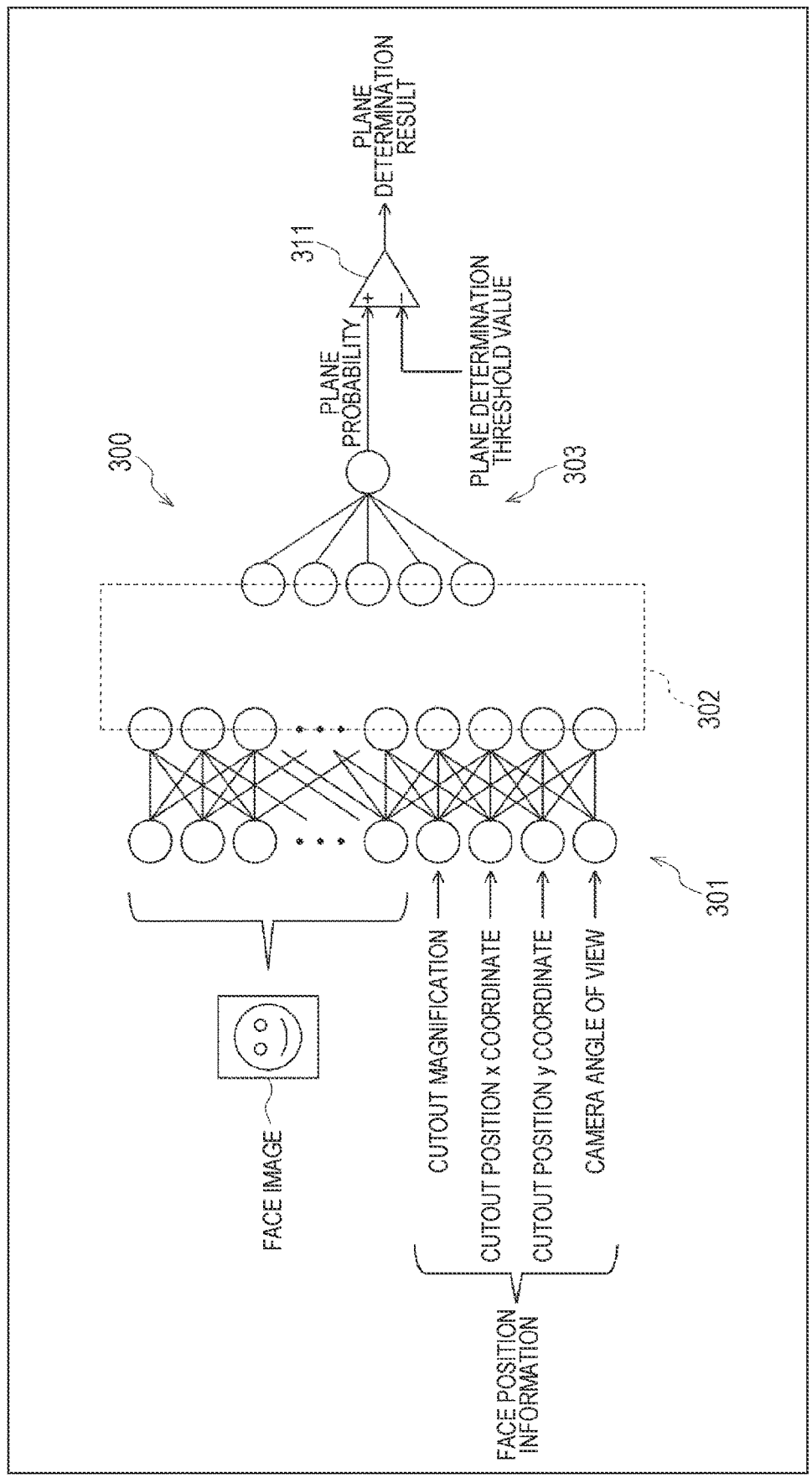
FIG. 24 is a diagram illustrating a third example of the configuration of the neural network to which the present technology is applied.

FIG. 24 illustrates a third example of a configuration of the neural network to which the present technology is applied.

In FIG. 24, a neural network 300 is configured in the similar manner to the above-described neural network 300 (FIG. 21).

That is, in the neural network 300, when the face image and the face position information are input to the input layer 301, in the intermediate layer 302, it is determined whether the input face image has a tendency of distortion of a two-dimensional person (or a tendency of distortion of a face of a three-dimensional person), and the plane probability information indicating the probability of being the plane is output from the output layer 303 and input to the comparator 311.

In a comparator 311, the plane probability information is input to one input terminal and a plane determination threshold value is input to the other input terminal. The comparator 311 compares a plane probability input thereto with the plane determination threshold value, and outputs the comparison result as the plane determination result.

Here, the plane probability is, for example, a value indicating the probability in the range of 0% to 100%, and the higher the value, the higher the probability that the face image is the plane image. Further, the plane determination threshold value is a threshold value for determining whether or not the face image is a plane, and is a fixed value or a variable value.

(Configuration of Information Processing Apparatus)

Figure 25:
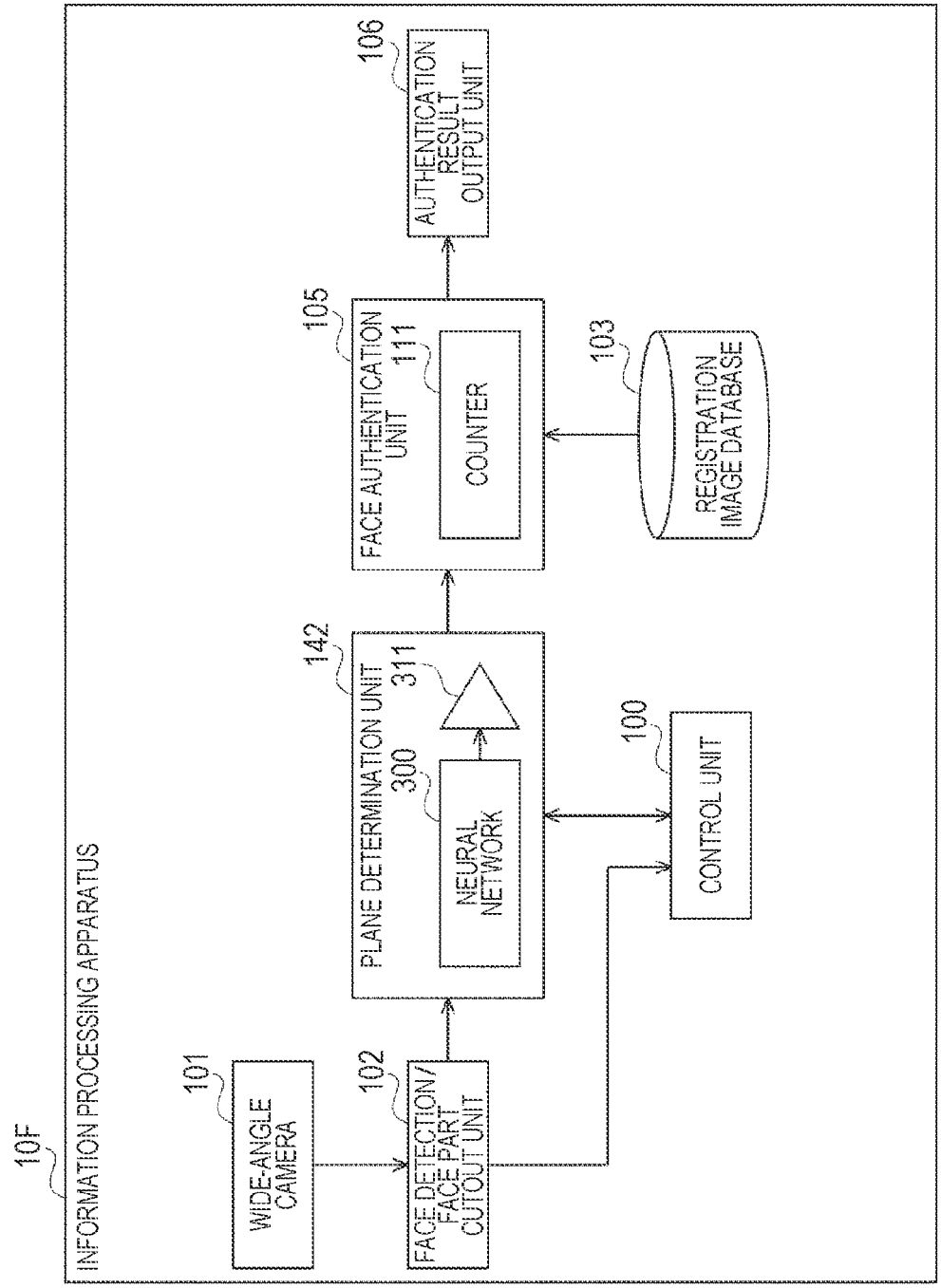
FIG. 25 is a block diagram illustrating a fifth example of the configuration of the information processing apparatus to which the present technology is applied.

FIG. 25 illustrates a fifth example of a configuration of an information processing apparatus to which the present technology is applied.

In FIG. 25, an information processing apparatus 10F is different from the information processing apparatus 10E (FIG. 22) in that a plane determination unit 142 is provided instead of the plane determination unit 141.

Face position information is supplied to the control unit 100 from a face detection/face part cutout unit 102. The control unit 100 generates a plane determination threshold value on the basis of the face position information and supplies the generated plane determination threshold value to the plane determination unit 142.

The plane determination unit 142 is supplied with the face image and the face position information from the face detection/face part cutout unit 102 and the plane determination threshold value from the control unit 100.

The plane determination unit 142 includes the neural network 300 (FIG. 24) and the comparator 311. Note that the neural network 300 (FIG. 24) is included in the plane determination unit 142, and may be provided by a server connected to the network.

The plane determination unit 142 uses the neural network 300 to input the face image and the face position information to the input layer 301, and acquires the plane probability information output from the output layer 303. Further, in the plane determination unit 142, the comparator 311 compares the plane probability indicated by the plane probability information with the plane determination threshold value to perform the plane determination of the input face image. The plane determination unit 142 supplies the result of the plane determination of the face image to the face authentication unit 105.

(Flow of Face Authentication Process)

Figure 26:
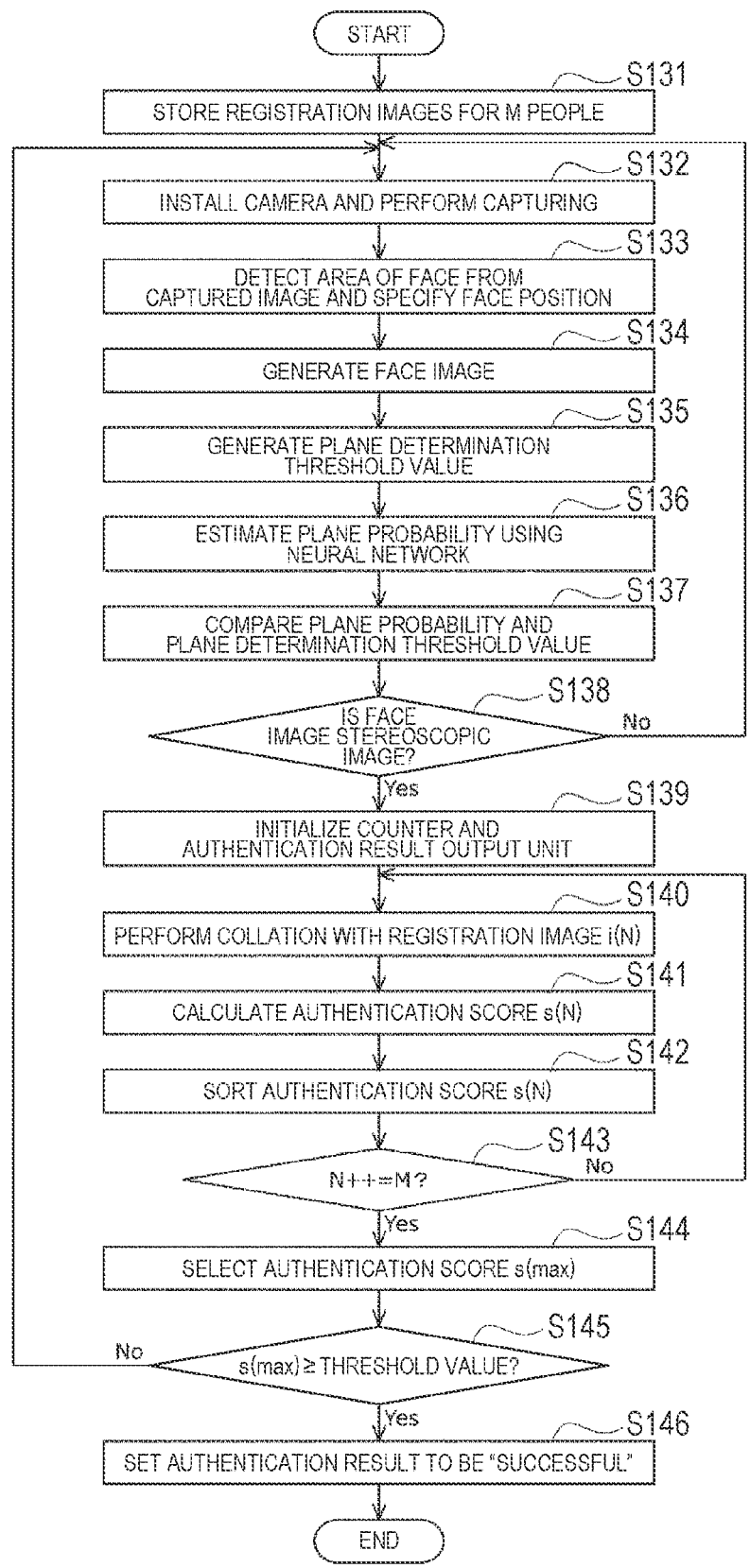
FIG. 26 is a flowchart describing a flow of a fifth example of the face authentication process.

Next, the flow of the face authentication process executed by the information processing apparatus 10F in FIG. 25 will be described with reference to the flowchart in FIG. 26.

Figure 23:
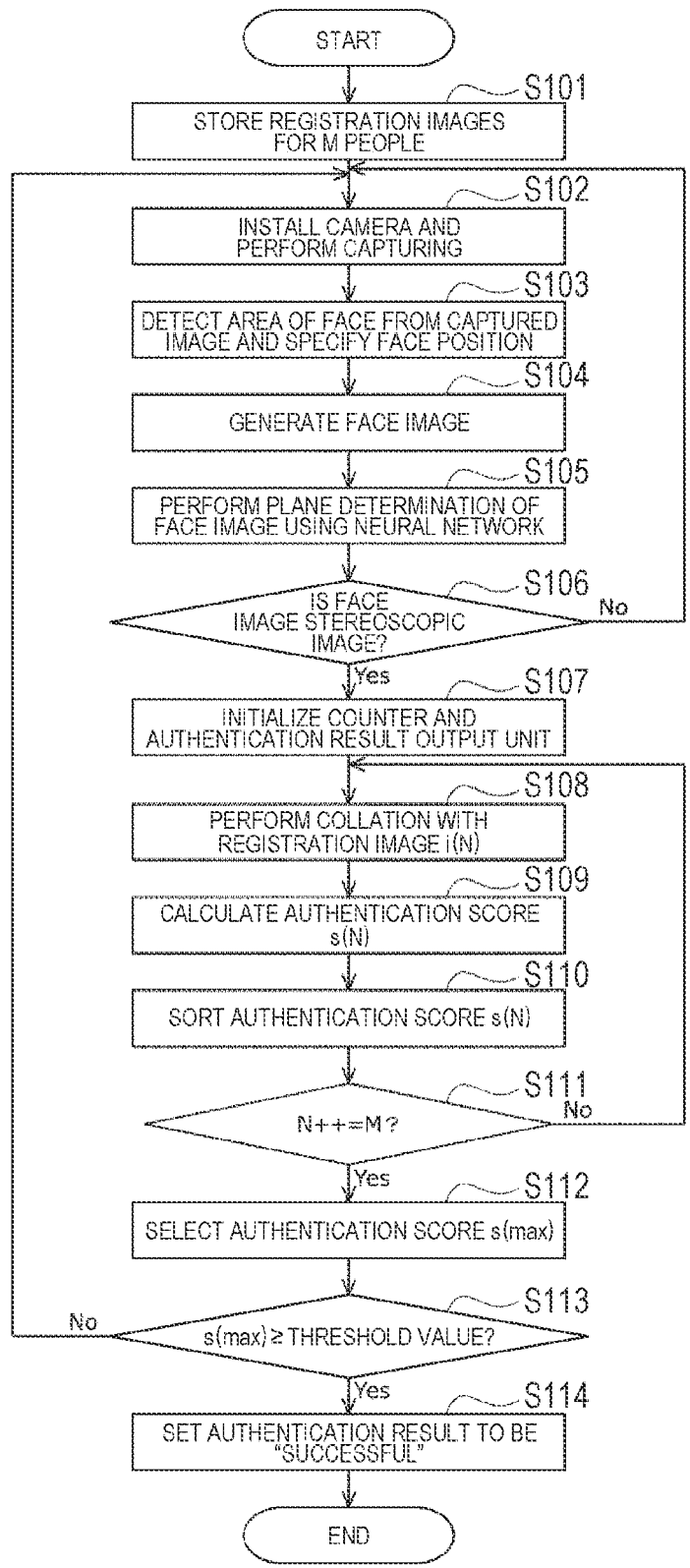
FIG. 23 is a flowchart describing a flow of a fourth example of the face authentication process.

In steps S131 to S134, the face image and the face position information are generated from the captured image after the registration images of the number for M people are stored, as in steps S101 to S104 in FIG. 23.

In step S135, the control unit 100 generates the plane determination threshold value on the basis of the face position information. Note that the plane determination threshold value may be a fixed value or may be changed as a value (variable value) according to the face position information.

In step S136, the plane determination unit 142 uses the neural network 300 of FIG. 24 to input the face image and the face position information generated by the face detection/face part cutout unit 102 to the input layer 301 and acquire the plane probability information output from the output layer 303, thereby estimating the plane probability of the face image.

In step S137, the plane determination unit 142 performs the plane determination of the face image by comparing the plane probability of the face image estimated by the comparator 311 with the plane determination threshold value.

In step S138, the control unit 100 determines whether or not the face image is the stereoscopic image on the basis of the result of the plane determination by the plane determination unit 142.

Here, in the process of step S137, the plane determination threshold value is compared with the plane probability, but for example, when applying this technique, the effect is different between the peripheral portion and the central portion of the angle of view, so in the process of step S135, it is preferable to change the plane determination threshold value according to a deflection angle from the center (center of gravity position) of the captured image.

In addition, in the information processing apparatus 10F, for example, when operating in a first priority mode that prioritizes the elimination of spoofing, it may be easy to determine that the face image is the plane image ("No" of S138, that is, "NG") by lowering the plane determination threshold value in the central part of the angle of view in the process of step S135. On the other hand, for example, when operating in a second priority mode that prioritizes authentication of the person, it may be easy to determine that the face image is the stereoscopic image ("Yes" of S138, that is, "OK") by increasing the plane determination threshold value in the central part of the angle of view in the process of step S135.

Further, when the plane determination threshold value is fixed at the upper limit in the process of step S135, it is possible to always determine that the face image is the stereoscopic image ("Yes" in S138, that is, "OK") and turn off the function of the plane determination. Alternatively, in the determination process of step S138, the result of the plane determination itself is always fixed at the face image being the stereoscopic image ("Yes" in S138, that is, "OK"), and the neural network 300 may be stopped.

When it is determined in the determination process of step S138 that the face image is not the stereoscopic image, the process returns to step S132, and the processes of steps S132 to S138 described above are repeated. That is, in this case, since the face image is the plane image, that is, the face image captured, the plane determination process is repeated until the face image is determined to be the stereoscopic image.

In addition, when it is determined in the determination process of step S138 that the face image is the stereoscopic image, the face image is the real face imaged, so the process proceeds to step S139.

In steps S139 to S146, the similar processes as in steps S107 to S114 of FIG. 23 are executed. That is, the face image determined to be the stereoscopic image by the plane determination is collated with a registration image i(N) read from the registration image database 103, and the authentication score s(N) is calculated.

Here, until the counter value N reaches the number of registered people M ("Yes" in S143), by repeating the collation with the registration image of any person, or the like (S140 to S142), the collation with the registration images for M people is performed. Then, the highest authentication score s(max) is selected from among the authentication scores s(N) obtained by collating the face image determined to be the stereoscopic image with the registration images for M people (S145).

In the determination process of step S145, it is determined whether the selected highest authentication score s(max) is greater than or equal to the threshold value, and when it is determined that the authentication score s(max) is greater than or equal to the threshold value, the authentication result is "successful" (S146). Meanwhile, when it is determined in the determination process of step S145 that the authentication score s(max) is less than the threshold value, the process returns to step S132, and the above-described process is repeated.

The flow of the face authentication process has been described above. In this face authentication process, the plane probability (probability indicating whether the input face image is a tendency of distortion of a two-dimensional person, or the like) obtained by using a neural network is compared with the plane determination threshold vale, and on the basis of the comparison result, it can be determined whether the subject is the real face or the face of the face photograph.

In addition, in this face authentication process, for example, the plane determination threshold value is fixed at the upper limit in the process of step S135, or the plane determination process is always determined to be the stereoscopic image in the determination process of step S138, so it is possible to invalidate (off) the plane determination process, but with such an on/off function of the plane determination process, for example, the following effects can be obtained.

That is, first, when presenting the face authentication system to which the present technology is applied to a customer, it is possible to demonstrate authentication using an image including an arbitrary face (face photograph). Secondly, even if the face to be authenticated is available only as an image, the face can be authenticated using the image. Thirdly, in the endurance test in the environment such as a high load or a long time performed by the face authentication system, it is possible to perform a test using an image including an arbitrary face (the test can be automated).

Here, note that as the fifth embodiment, the case where the plane determination function, which was an indispensable function in the fourth embodiment, is configured as an arbitrary function is shown, but a function (on/off function) for switching whether or not to execute the spoofing prevention function shown in the first to third embodiments described above as an arbitrary function may be provided.

That is, for example, in the first embodiment, the difference in the wide-angle distortion that occurs between the three-dimensional face and the face projected on the plane is detected on the basis of the face position information and the direction angle information, so it is identified whether it is a three-dimensional face (real face) or a face projected on a plane (face of the face photograph), and the spoofing using the face photograph (fake face image) is prevented, but a function for enabling or disabling this identification function can be provided. Note that when this identification function is invalid, the face authentication process is performed without identifying between the three-dimensional face (real face) and the face projected on the plane (face of the face photograph), and for example, even when the face photograph is used, the authentication result can be "successful".

In other words, in the information processing apparatus 10A to 10F, when executing face authentication process, the operation can be performed in either the valid mode (first mode) in which the identification process for identifying the shape of the subject (three-dimensional face or two-dimensional face) is valid, or the invalid mode (second mode) in which the identification process is invalid.

The first to fifth embodiments have been described above. Note that the correspondence to the wide-angle distortion can be roughly divided into the following two. That is, the first is a technology of capturing the center of the captured image as much as possible by tracking a subject and driving a camera angle, or by using a plurality of cameras in order to avoid the wide-angle distortion, and the second is a technology of correcting a captured image using a correction coefficient set in advance according to characteristics of a lens in order to correct the wide-angle distortion of the captured image.

Both technologies treat the wide-angle distortion as a disturbance and try to eliminate the wide-angle distortion as much as possible. In particular, the above-described Patent Documents 1 and 2 disclose a technology for correcting and using a captured image. On the other hand, the present technology is a technology that applies the wide-angle distortion that occurs in the captured image, and is a core technology to which the wide-angle distortion should be actively applied, and therefore, its correspondence is significantly different from the prior arts including Patent Documents 1 and 2.

6. Modified Example

Application Example

Note that the embodiment of the present technology is not limited to the above-described first to fifth embodiments, and various changes can be made without departing from the gist of the present technology. Therefore, application examples will be illustrated below in (a1) to (a7).

(a1) the Number of Trials of Direction Angle

In the first and second embodiments described above, when the face direction of the authenticated person is detected, scanning is performed while changing the value of the direction angle to illustrate the case of finding the optimum direction angle, but the number of trials of the direction angle is not limited to a plurality of times. For example, if the direction of the face of the authenticated person can be predicted due to the installation environment of the wide-angle camera 101 or other reasons, the number of trials of the direction angle is set to one time, and the face direction of the authenticated person may be determined on the basis of the result of the trial.

(a2) Operation of Wide-Angle Camera

In the wide-angle camera 101, the direction in which the wide-angle distortion occurs depends on an azimuth angle with respect to the center of the captured image. Using this principle, for example, as illustrated on the right side of FIG. 27, the wide-angle camera 101 is installed at an angle with respect to the subject 911, the tilt direction is concealed, and then the wide-angle camera 101 is swung in the direction of arrow R in the figure with respect to subject 911. Note that the operation of swinging the wide-angle camera 101 may be realized, for example, by providing a predetermined mechanism or drive unit (actuator).

Figure 27:
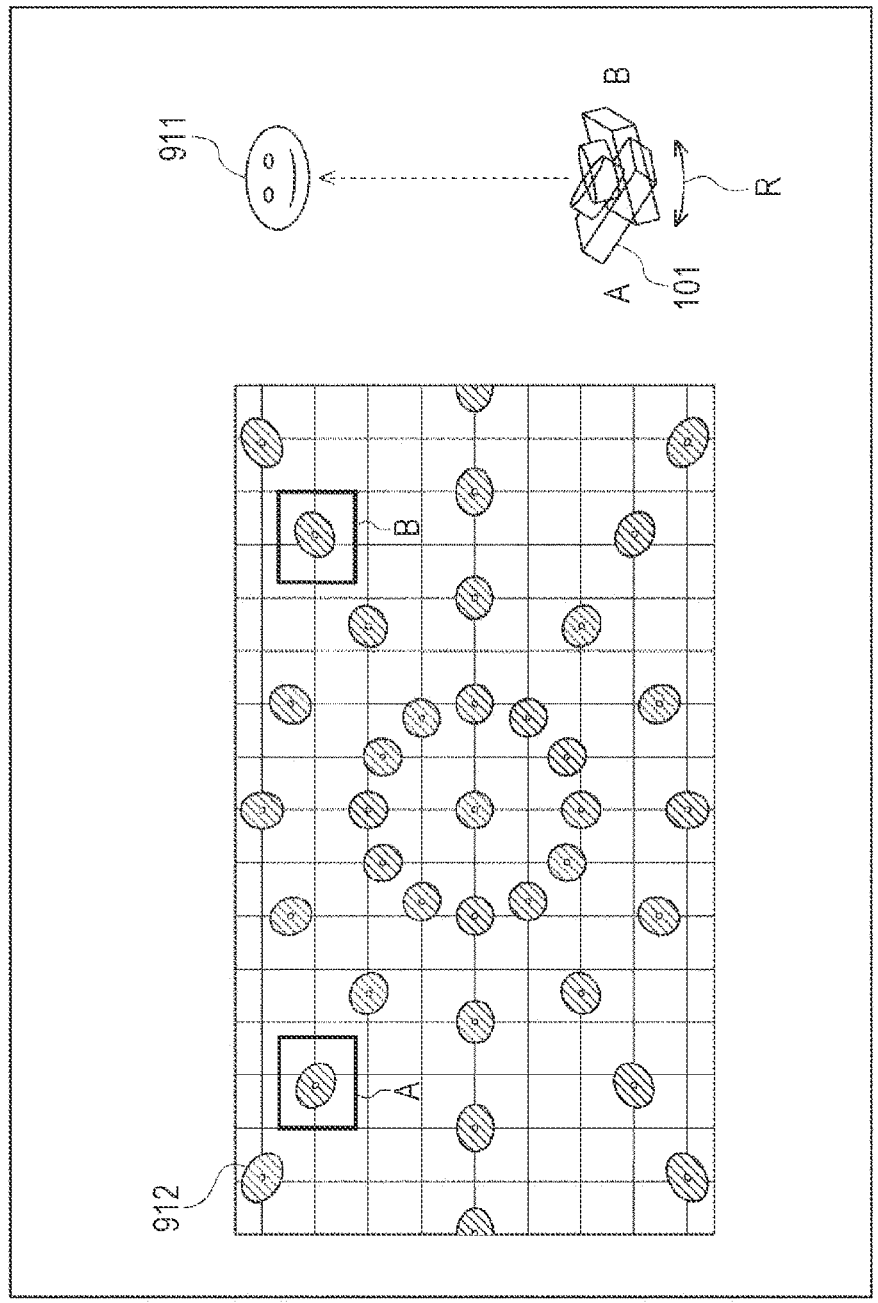
FIG. 27 is a diagram describing an example of an operation of the wide-angle camera as an application example of the present technology.

By swinging the wide-angle camera 101 with respect to the subject 911 in this way, a position (image forming position) of an image 912 on a light receiving surface of an image sensor moves as represented by an ellipse (circle) on a grid in FIG. 27. For example, when the wide-angle camera 101 is swung to the left, the image forming position is the position of the image 912 in frame A on the grid, while when the wide-angle camera 101 is in state B swung to the right, the image forming position is the position of the image 912 in frame B on the grid.

Here, it is assumed that a face photograph with a wide-angle distortion is presented as a subject 911. At this time, by swinging the wide-angle camera 101 with respect to the subject 911, it is possible to detect the moving image forming position, and in addition, since the wide-angle distortion depends on the image forming position, it is possible to identify the face of the face photograph by the difference between the direction of the wide-angle distortion of the face of the face photograph and the direction of the wide-angle distortion of the real face. As a result, spoofing can be prevented.

(a3) Focal Depth of Lens

In the wide-angle camera 101, if there is a margin in a focal depth of a lens, the similar effect to that of the above-described embodiment can be obtained by tilting only the image sensor instead of the entire wide-angle camera 101.

(a4) Concealment of Image Capturing Direction

The present technology focuses on the use of the wide-angle distortion, but since the real face is a three-dimensional object, for example, in order to change a shape of an image depending on a face direction, such as a profile or a face down, face authentication process may be performed after concealing the image capturing direction by installing a dummy camera or the like. At this time, since the face image is significantly deformed, in particular, as illustrated in the first and second embodiments described above, it is effective to use a method of collating a collation image obtained by mapping a registration image to a three-dimensional model using three-dimensional information with a face image.

(a5) Application Examples Other than Face Authentication

In the first to fifth embodiments described above, the case where the present technology is applied to the face authentication has been described, but the present technology can be applied to three-dimensional objects other than the face.

For example, when a robot arm handles a three-dimensional object that is confused with a flat object, the present technology can be applied to identify whether the object is the three-dimensional object. In particular, a camera attached to a movable part such as a robot arm is required to be as light as possible, but when the present technology that can identify a three-dimensional object with one wide-angle camera 101 is applied, the camera can be easily mounted on the movable part.

(a6) Example of Camera or Lens Replacement

In the first to fifth embodiments described above, the case where the resolution for the camera angle of view is given has been described, but a camera model such as the wide-angle camera 101 may be replaced with another model according to applications. Alternatively, a lens such as a wide-angle lens may be replaced with a lens suitable for the intended use.

Figure 28:
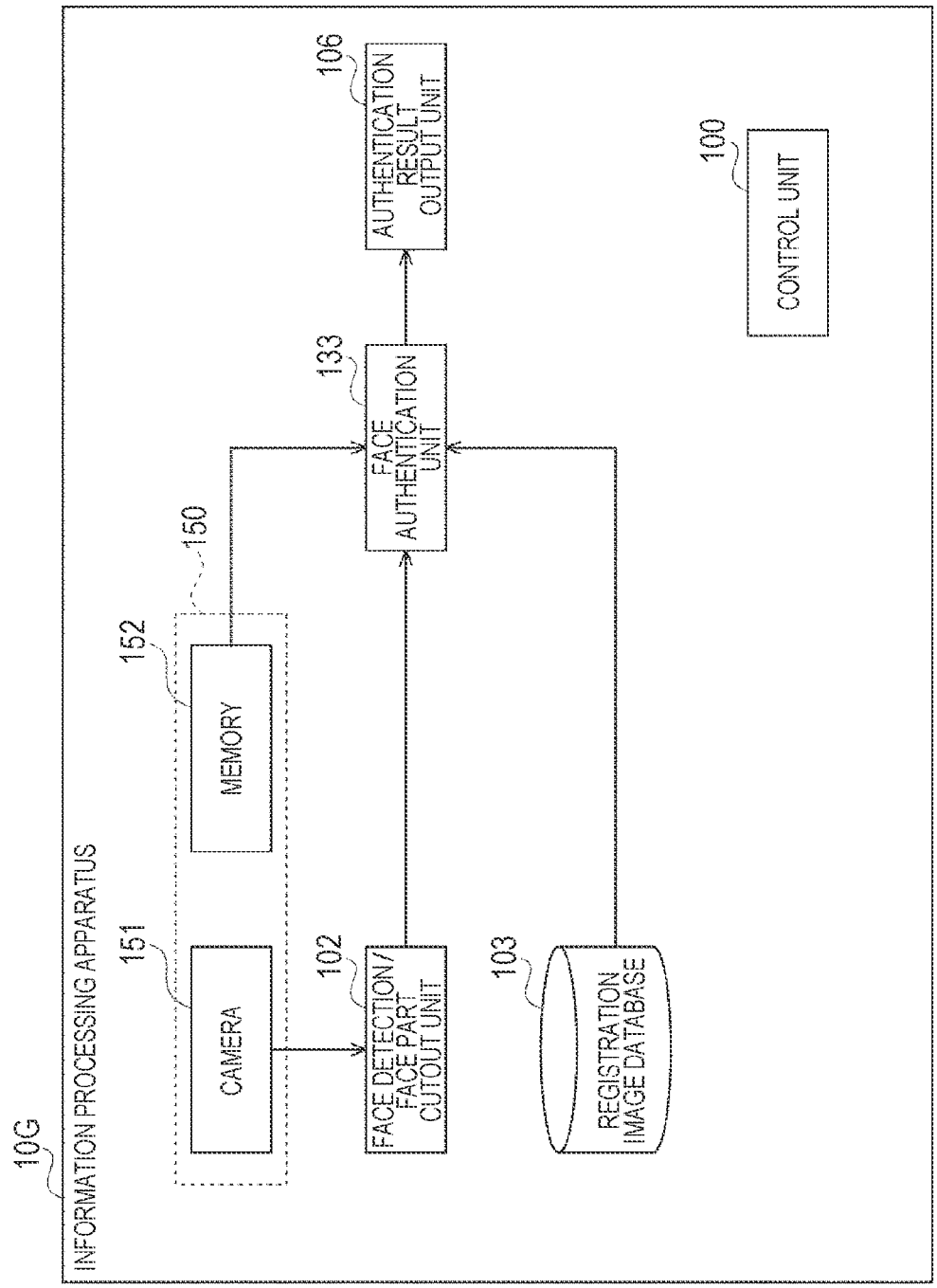
FIG. 28 is a block diagram illustrating an example of another configuration of the information processing apparatus to which the present technology is applied.

FIG. 28 illustrates an example of the configuration of an information processing apparatus with interchangeable cameras and lenses.

In FIG. 28, an information processing apparatus 10G constitutes a replaceable camera unit 150 including a camera 151 and a memory 152 as compared with the information processing apparatus 10D (FIG. 20).

The memory 152 is a storage device such as a semiconductor memory that is built in the replaceable camera unit 150 or is detachably mounted. The memory 152 holds lens characteristic information regarding the characteristics of the lens used in the camera 151. When the lens is replaced by the camera 151, the face authentication unit 133 can read the lens characteristic information from the memory 152 and perform face authentication process using the lens characteristic information.

Here, the lens attached to the camera 151 is not limited to a wide-angle lens, and may be, for example, a fisheye lens, a standard lens, or the like, and lens characteristic information regarding the characteristics of those lenses is held in the memory 152. Further, when the camera 151 itself is replaced, the memory 152 holds the lens characteristic information regarding the lens attached to the camera 151.

Note that in FIG. 28, the configuration corresponding to the information processing apparatus 10D illustrated in the third embodiment is illustrated as the information processing apparatus 10G, and similarly, the information processing apparatus 10 (10A to 10C, 10E, and 10F) shown in the first, second, fourth, and fifth embodiments described above may be provided with a memory 152 so that the camera and lens can be exchanged.

(a7) Configuration that Absorbs Difference in Characteristics of Lens

In the first to fifth embodiments described above, as the wide-angle lens used in the wide-angle camera 101, an ideal lens in which the optical path passing through the center of the lens can be regarded as traveling straight is shown. However, the actual lens may have a slight deviation between the incident angle and the emitted angle due to design restrictions. In addition, there are lenses such as fisheye lenses that are bent while maintaining a certain relationship with the incident angle.

Even for such a lens, when the characteristics of the lens are known, similarly to the above-described (a6), the lens characteristic information is held in the memory 152 (FIG. 28) and by performing the face authentication process using the lens characteristic information, it is possible to absorb the difference in the characteristics of the lens and more accurately perform the face authentication.

(Image Capturing Method of Promoting Occurrence of Wide-Angle Distortion)

In a general face authentication system, it is preferable to install a camera so that an image of a face of an authenticated person is captured in a central portion of an angle of view, and to take a face image with less distortion. On the other hand, in the face authentication to which the present technology is applied, in order to prevent spoofing, it is preferable to capture the face image by installing a camera so that the image of the face of the authenticated person is captured in a peripheral portion of the angle of view, avoiding the central part of the angle of view. Therefore, examples of installation of the wide-angle camera 101 will be illustrated in (b1) to (b3) below.

(b1) when Installing at Entrance/Exit Gate

When installing a camera at an entrance/exit gate where an unspecified number of people pass, it is preferable to install the camera in the front of the face of the authenticated person in a general face authentication system, but the installation method is restricted because the camera obstructs the passage. In addition, when passers-by find out that they are being imaged, there is a risk of causing discomfort to passers-by.

Meanwhile, in the present technology, it is preferable that the face of the authenticated person is not imaged in the front. For example, the wide-angle camera 101 is installed on a ceiling, a wall, or the like, and as a result, the installation method is less likely to obstruct the passage. Alternatively, when installing the wide-angle camera 101, for example, by placing a foliage plant in the front of the wide-angle camera 101, an environment may be created in which the image of the face of the authenticated person is easily captured in the peripheral portion of the angle of view.

(b2) when Using for Personal Authentication

For example, when applying the present technology to face authentication in a specific place such as an electronic procedure booth of a financial institution, by installing the wide-angle camera 101 at an angle with respect to the authenticated person, even if the authenticated person faces the wide-angle camera 101, the wide-angle camera 101 can create a situation where the image of the face of the authenticated person is easily captured in the peripheral portion of the angle of view In that case, for example, a dummy lens or the like is installed in the front of the wide-angle camera 101 to hide the installation angle of the wide-angle camera 101, and furthermore, spoofing may be prevented by equipping a mechanism that randomly changes the angle of the wide-angle camera 101 by driving a motor. When such an installation method is adopted, if spoofing is to be realized, it is necessary to bring in a full-scale head stereoscopic image having an opening/closing mechanism such as blinking or mouth, so spoofing is very difficult.

(b3) when Used to Unlock an Information Terminal

When applying the present technology to unlock information terminals such as smartphones, since the distance between the wide-angle camera 101 and the face of the authenticated person is short, the wide-angle camera 101 captures the image of the face of the authenticated person, including the peripheral portion of the angle of view, and in particular, the wide-angle distortion can be generated without tilting the information terminal.

However, when intending to exert the effect of the present technology more effectively, for example, by encouraging the authenticated person to blow off the lock screen of the information terminal or roll the ball displayed on the lock screen into a specific hole, a user interface may be implemented so that the operation of tilting the information terminal is performed naturally.

(How to Distinguish Products)

Next, (c1) to (c5) exemplify how to distinguish products to which the present technology is applied.

(c1) Appearance Feature of Product

For example, when a using lens is small, it is highly likely to use a wide-angle lens, and in addition, when a camera is tilted with respect to a subject, it is highly likely to actively apply a wide-angle distortion, and in such a case, there is a possibility that the product is a product to which the present technology is applied.

In addition, even if the camera is constituted by a single camera and is not equipped with other cameras or sensors such as a distance sensor, there is a possibility that the product is a product to which the present technology that can identify three-dimensional objects with one wide-angle camera 101 is applied.

(c2) Features of Product Specifications

For example, when the product specifications clearly state that false authentication due to face images such as still images and moving images can be prevented, there is a possibility that the product is a product to which the present technology is applied. In addition, for example, when the angle of view of the camera to be used is specified, or when there is a function to set the specifications of the angle of view of the camera, there is a possibility that the product is a product to which the present technology is applied.

(c3) Features of Performance

For example, as features of products to which the present technology is applied, it is possible to prevent erroneous authentication due to face images such as still images and moving images with high probability. In addition, products to which the present technology is applied can perform face authentication even if they are separated by a predetermined distance such as several meters, thereby preventing erroneous authentication by face images such as photographs or moving images.

Note that in products to which the present technology is applied, by making the subject (face of the authenticated person) appear in the peripheral portion of the angle of view, it is possible to more accurately perform the face authentication, and when the subject (face of the authenticated person) is imaged in the center of the angle of view, the accuracy is reduced but the face authentication can be performed as compared with the case where the peripheral portion of the angle of view is imaged.

(c4) Features of Image Registration

In the registration image database 103, for example, the front image data of the face of the authenticated person is stored as the registration image. Further, in the registration image database 103, for example, three-dimensional data of a face or a parameter capable of estimating a three-dimensional shape is stored as three-dimensional information. Furthermore, for example, various pieces of information such as a code for classifying the shape of the head can be registered.

From the information registered in the registration image database 103, it is possible to distinguish whether or not the product is a product to which the present technology is applied.

(c5) Software Feature

For example, as an interface of an application programming interface (API) called from a software module that executes the face authentication process by the face authentication unit 105, when there is a mechanism to pass information indicating the position of the face in the captured image, that is, the face position information, the product may be a product to which the present technology is applied.

Further, for example, in the third to fifth embodiments described above, when training parameters reflecting the face position information and the direction angle information are included as the training data of (deep learning of) the neural network, there is a possibility that the product is a product to which the present technology is applied.

Example of Spoofing Prevention by Other Methods

Next, (d1) to (d5) exemplify other methods for preventing spoofing. However, the methods shown in (d1) to (d5) may be combined with the face authentication to which the present technology is applied.

(d1) Method by Light Source Control

For example, a device having a display such as a tablet terminal is equipped with a self-luminous light or a backlight and emits light by itself, and displays an image on the display. Therefore, in the real face, a shadow changes according to the change of the light source, whereas in the display image (face of the face photograph) displayed on the display, the pattern in which the shadow follows the change of the light source is different.

By controlling the light source and taking a picture using this principle, it is possible to distinguish between the real face and the face of the display image displayed on the display. For example, when the light is turned off at the moment of confirmation image capturing, an illuminance sensor mounted on the device with the display will be delayed for a moment and a screen will be shot while it is bright, so it is possible to distinguish between the real face and the face of the displayed image.

(d2) Method Using Other Sensors

For example, a distance image sensor such as a time of flight (ToF) method may be used to recognize the three-dimensional shape of the subject and distinguish between the real face and the face of the face photograph.

(d3) Method by Wavelength of Light

For example, by irradiating a subject with light having a spectrum configuration different from that of natural light, reflection or transmission peculiar to a living body may be utilized. Specifically, since infrared light has a property of partially transmitting a thin portion of meat such as an ear, it can be used.

(d4) how to Use Red-Eye Phenomenon

For example, it is known that when an eyeball of a person facing a camera is irradiated with a flash to perform image capturing, a red-eye phenomenon occurs in which eyes appear red. Since this red-eye phenomenon does not occur in the face of the face photograph, it can be used.

(d5) how to Use Opening and Closing of Iris

It may be used after confirming that a size of a pupil is appropriate for brightness at the time of image capturing. For example, when the iris is closed and the pupil appears small even though the authentication location is dark, since the size of the pupil is not appropriate for the brightness at the time of image capturing, so it can be determined that it is the face of the face photograph, that is, spoofing instead of a real face.

However, the configuration of the information processing apparatus 10 (10A to 10F) illustrated in the first to fifth embodiments described above is an example, and various configurations can be adopted. Therefore, next, other configurations of the information processing apparatus 10 will be described with reference to FIG. 29 and FIG. 30.

(Configuration of Information Processing System)

Figure 29:
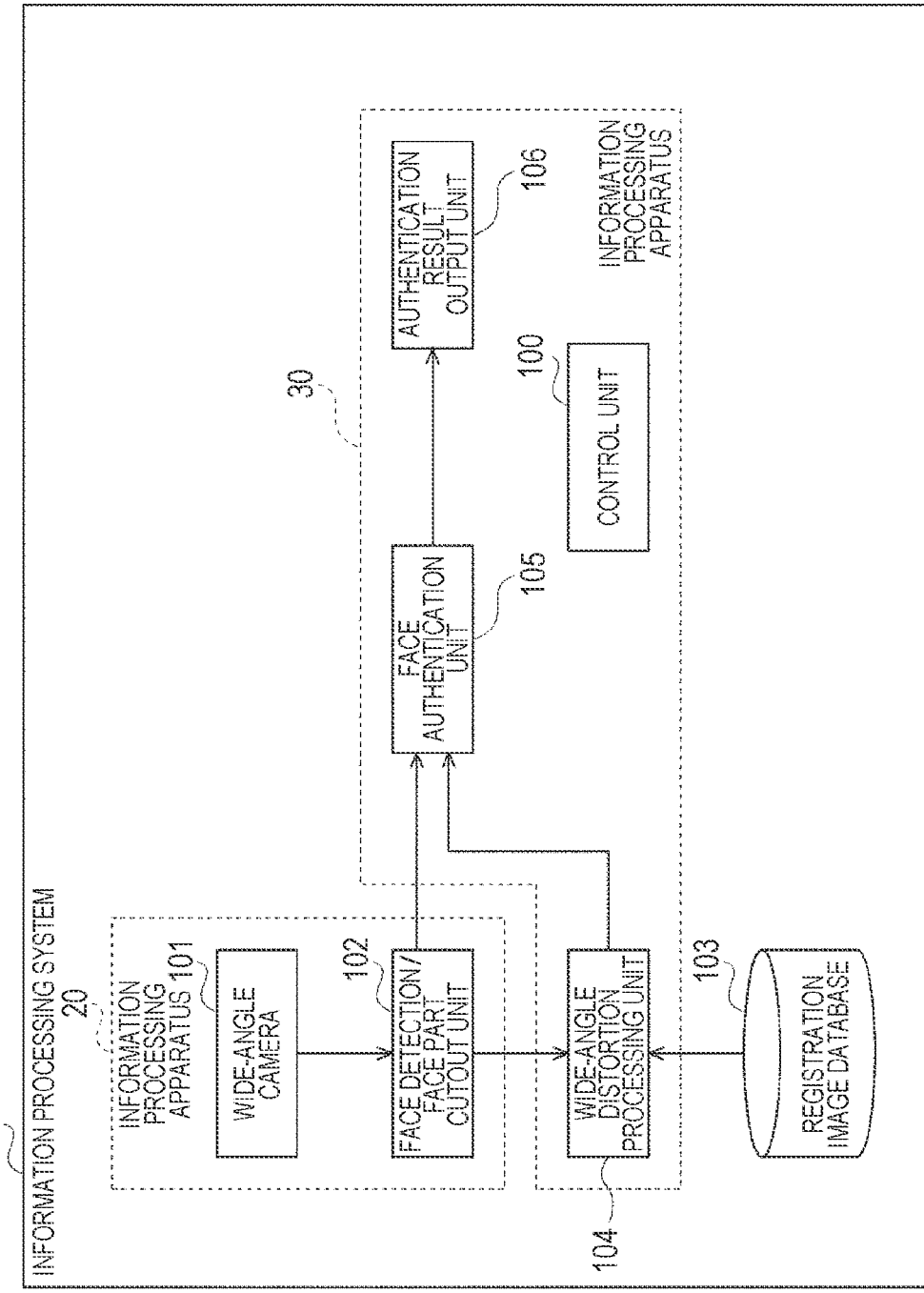
FIG. 29 is a block diagram illustrating an example of a configuration of an information processing system to which the present technology is applied.

FIG. 29 illustrates an example of a configuration of an information processing system to which the present technology is applied.

In FIG. 29, an information processing system 1 is configured as a face authentication system including an information processing apparatus 20, an information processing apparatus 30, and a registration image database 103. Note that in the configuration of FIG. 29, the same reference numerals are given to parts corresponding to the components of FIG. 8 and the like, and the description thereof will be omitted as appropriate.

The information processing apparatus 20 includes, for example, an electronic device having a camera function, such as an information terminal such as a smartphone or a tablet terminal, or an image capturing device such as a surveillance camera. The information processing apparatus 20 includes a wide-angle camera 101 and a face detection/face part cutout unit 102. Note that although not shown, the information processing apparatus 20 includes a communication module that performs communication in accordance with a predetermined communication method.

In the information processing apparatus 20, the captured image captured by the wide-angle camera 101 is processed by the face detection/face part cutout unit 102, and the face image and the face position information are generated. The information processing apparatus 20 transmits the generated face image and face position information to the information processing apparatus 30 via a network.

The information processing apparatus 30 is constituted by electronic devices having an information processing function, such as a personal computer, a workstation, and a server. The information processing apparatus 30 includes a control unit 100, a wide-angle distortion processing unit 104, a face authentication unit 105, and an authentication result output unit 106. Note that although not shown, the information processing apparatus 30 includes a communication module that performs communication in accordance with a predetermined communication method.

In the information processing apparatus 30, a face image and face position information transmitted via a network are received from the information processing apparatus 20. In the wide-angle distortion processing unit 104, the registration image read from the registration image database 103 is processed on the basis of the face position information and the direction angle information, and a collation image is generated. Further, in the face authentication unit 105, face authentication process is performed by collating the face image and the collation image and calculating the authentication score. Then, in the authentication result output unit 106, the authentication score and the authentication result obtained by the face authentication process are output.

Note that the registration image database 103 may be stored in a dedicated database (DB) server (including a server built on a cloud), or may be stored inside the information processing apparatus 30. In addition, the communication performed between the information processing apparatus 20 and the information processing apparatus 30 includes, for example, wireless local area network (LAN), wireless communication such as cellular communication (for example, LTE-Advanced or 5G), or wired communication such as wired LAN, or the like.

In addition, the configuration of the information processing system 1 in FIG. 29 is an example. For example, the information processing apparatus 30 may include a face detection/face part cutout unit 102, or the information processing apparatus 20 may include an authentication result output unit 106.

(Configuration of Information Processing Apparatus)

Figure 30:
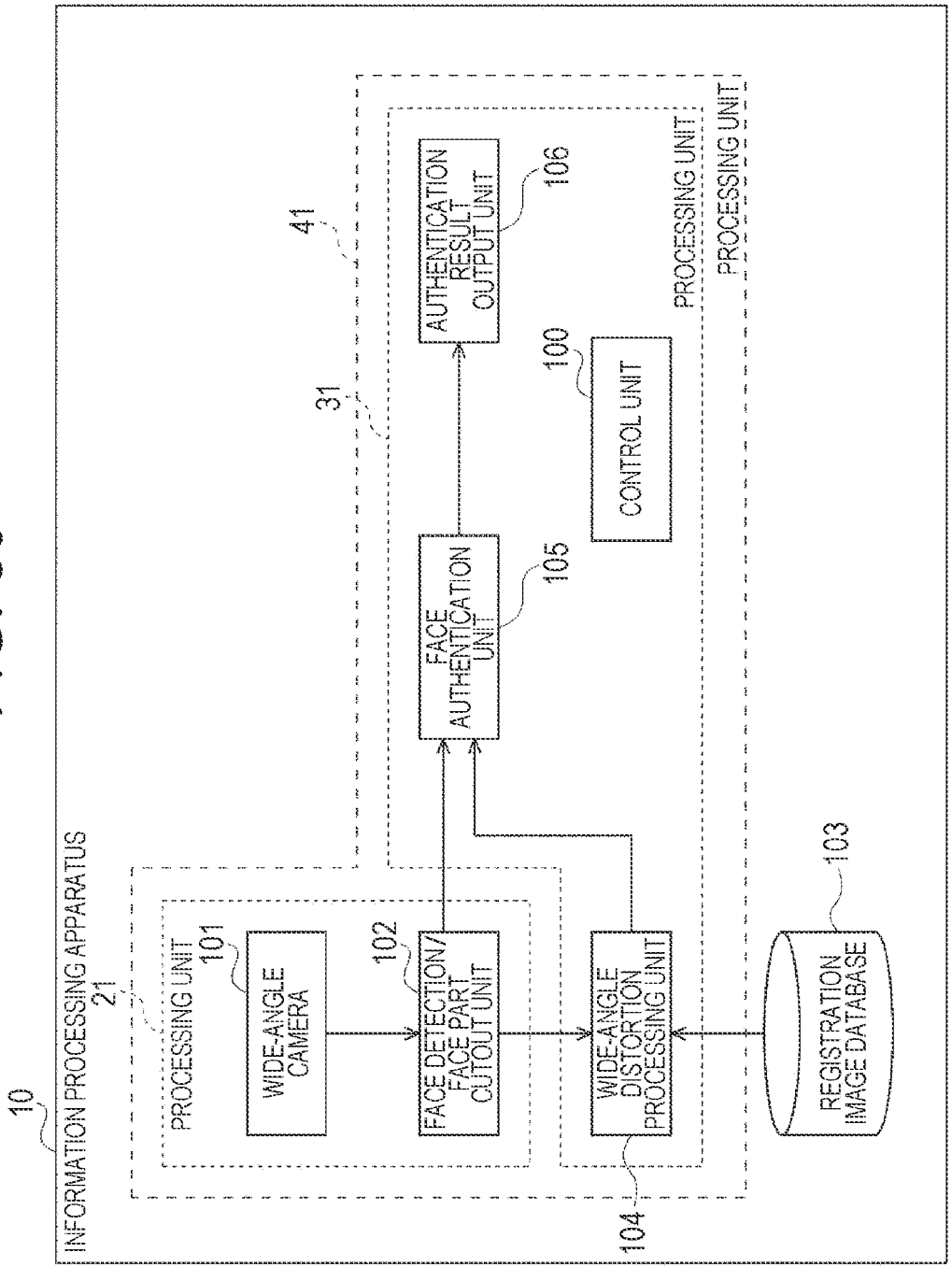
FIG. 30 is a block diagram illustrating an example of a configuration of the information processing apparatus to which the present technology is applied.

FIG. 30 illustrates an example of a configuration of an information processing apparatus to which the present technology is applied.

In FIG. 30, the information processing apparatus 10 includes a processing unit 21, a processing unit 31, and a registration image database 103. Note that in the configuration of FIG. 30, the same reference numerals are given to parts corresponding to the components of FIG. 8 and the like, and the description thereof will be omitted as appropriate.

The processing unit 21 includes, for example, a camera module, a signal processing circuit, or the like. The processing unit 21 includes a wide-angle camera 101 and a face detection/face part cutout unit 102.

In the processing unit 21, the captured image captured by the wide-angle camera 101 is processed by the face detection/face part cutout unit 102, and the face image and the face position information are generated. The processing unit 21 outputs the generated face image and face position information to the processing unit 31.

The processing unit 31 is constituted by, for example, a processor such as a CPU or a graphics processing unit (GPU), and a circuit such as an FPGA. The processing unit 31 includes a control unit 100, a wide-angle distortion processing unit 104, a face authentication unit 105, and an authentication result output unit 106.

The processing unit 31 receives the face image and the face position information from the processing unit 21. In the wide-angle distortion processing unit 104, the registration image read from the registration image database 103 is processed on the basis of the face position information and the direction angle information, and a collation image is generated. Further, in the face authentication unit 105, face authentication process is performed by collating the face image and the collation image and calculating the authentication score. Then, in the authentication result output unit 106, the authentication score and the authentication result obtained by the face authentication process are output.

Note that the registration image database 103 may be stored in the information processing apparatus 10, or may be stored inside the dedicated DB server (including a server built on a cloud).

Further, the configuration of the information processing apparatus 10 in FIG. 30 is an example, and for example, the processing unit 21 and the processing unit 31 may be integrated and configured as the processing unit 41. In this case, the processing unit 41 includes the control unit 100, the wide-angle camera 101, the face detection/face part cutout unit 102, the wide-angle distortion processing unit 104, the face authentication unit 105, and the authentication result output unit 106. Further, for example, the processing unit 31 may include the face detection/face part cutout unit 102, or the processing unit 21 may include the authentication result output unit 106.

7. Configuration of Computer

Figure 31:
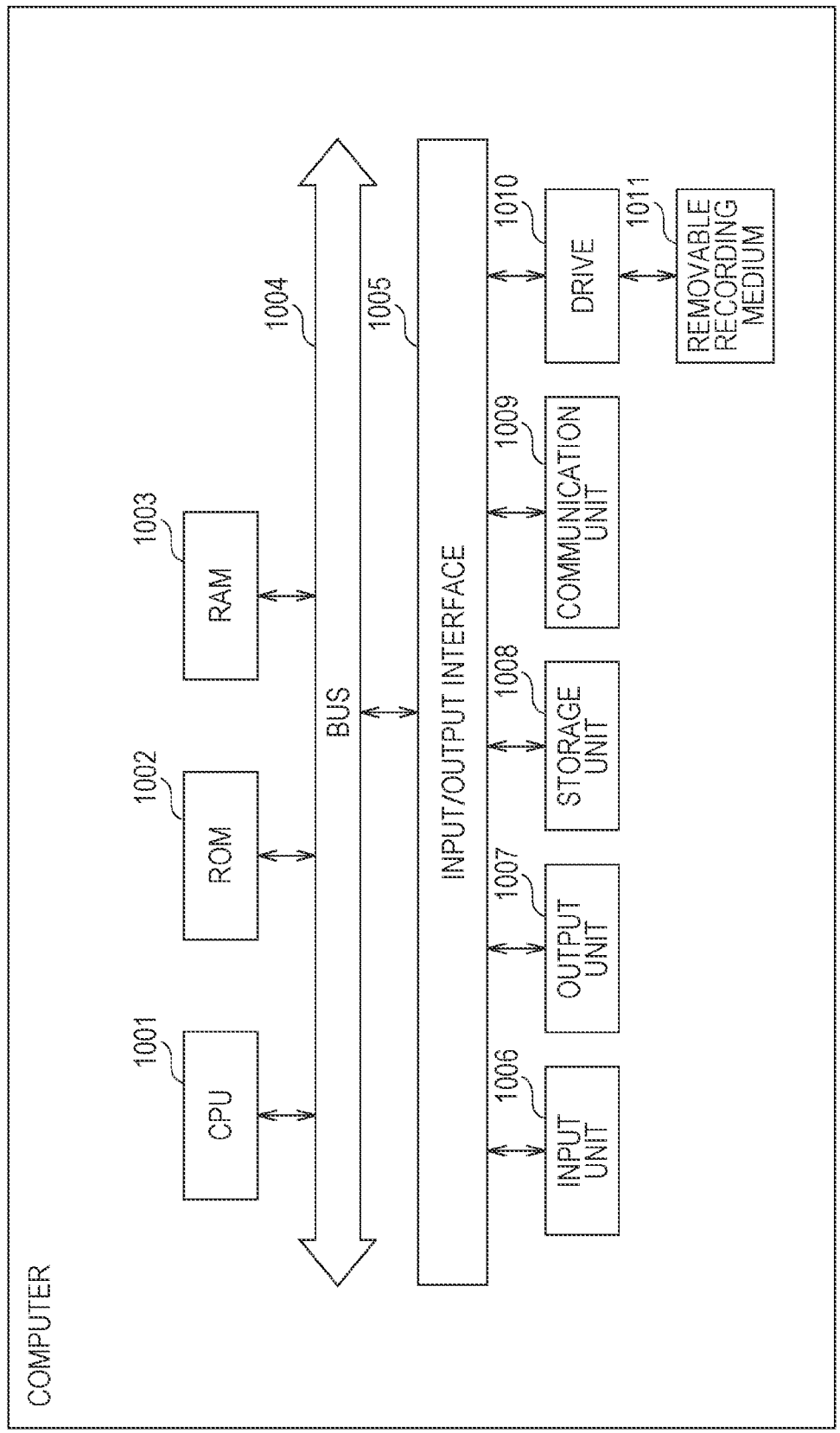
FIG. 31 is a block diagram illustrating an example of a configuration of a computer.

A series of processes described above (for example, face authentication process illustrated in FIG. 9 and the like) can be executed by hardware or software. When a series of processing is performed by software, programs constituting the software are installed on computers of each device. FIG. 31 is a block diagram illustrating a configuration example of hardware of a computer that executes the above-described series of processes by programs.

In the computer, a central processing unit (CPU) 1001, a read only memory (ROM) 1002, and a random access memory (RAM) 1003 are connected to each other by a bus 1004. An input/output interface 1005 is further connected to the bus 1004. An input unit 1006, an output unit 1007, a recording unit 1008, a communication unit 1009, and a drive 1010 are connected to the input/output interface 1005.

The input unit 1006 includes a microphone, a keyboard, a mouse, and the like. The output unit 1007 includes a speaker, a display, and the like. The recording unit 1008 includes a hard disk, a non-volatile memory, and the like. The communication unit 1009 is constituted by a network interface and the like. The drive 1010 drives a removable recording medium 1011 such as a magnetic disk, an optical disk, a magneto-optical disk, or a semiconductor memory.

In the computer configured as described above, the CPU 1001 loads and executes the program recorded in the ROM 1002 and the recording unit 1008 into the RAM 1003 via the input/output interface 1005 and the bus 1004, thereby executing the above-described series of processes.

The program executed by the computer (CPU 1001) can be recorded and provided on the removable recording medium 1011 as a package medium or the like, for example. In addition, the program can also be provided via a wired or wireless transmission medium such as a local area network, the Internet, or digital satellite broadcasting.

In the computer, the program can be installed in the recording unit 1008 via the input/output interface 1005 by mounting the removable recording medium 1011 in the drive 1010. Further, the program can be received by the communication unit 1009 and installed in the recording unit 1008 via the wired or wireless transmission medium. In addition, the program can be installed in advance in the ROM 1002 or the recording unit 1008.

Here, in the present specification, the processing performed by the computer according to the program does not necessarily have to be performed in a time sequence according to the order described as the flowchart. That is, the processing performed by the computer according to the program also includes processing (for example, parallel processing or processing by an object) executed in parallel or individually. Further, the program may be processed by one computer (processor) or may also be distributed and processed by a plurality of computers.

In addition, each step of the process can be executed by one device or shared and executed by a plurality of devices. Furthermore, when one step includes a plurality of processes, the plurality of processes included in the one step can be executed by one device or shared and executed by a plurality of devices.

8. Application Example to Moving Object

The present technology according to the present disclosure can be applied to various products. For example, the technology according to the present disclosure is realized as a device mounted on any kind of moving bodies such as an automobile, an electric vehicle, a hybrid electric vehicle, a motorcycle, a bicycle, a personal mobility, an airplane, a drone, a ship, and a robot.

Figure 32:
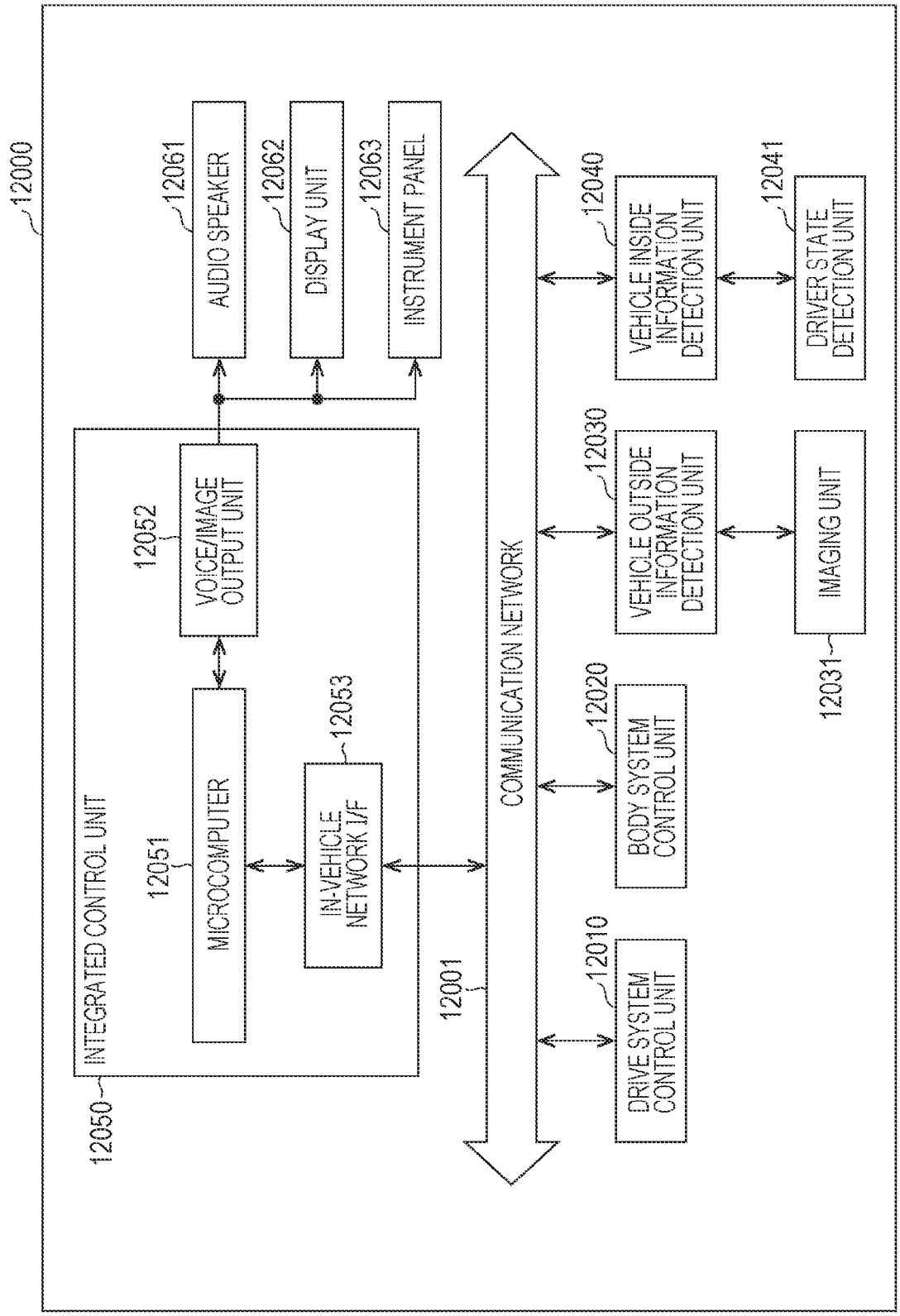
FIG. 32 is a block diagram illustrating an example of the schematic configuration of a vehicle control system.

FIG. 32 is a block diagram illustrating a schematic configuration example of a vehicle control system that is an example of a mobile body control system to which the technology according to the present disclosure can be applied.

A vehicle control system 12000 includes a plurality of electronic control units connected via a communication network 12001. In the example illustrated in FIG. 32, the vehicle control system 12000 includes a drive system control unit 12010, a body system control unit 12020, a vehicle outside information detection unit 12030, a vehicle inside information detection unit 12040, and an integrated control unit 12050. Further, as a functional configuration of the integrated control unit 12050, a microcomputer 12051, an audio image output unit 12052, and an in-vehicle network I/F (interface) 12053 are illustrated.

The drive system control unit 12010 controls an operation of apparatuses related to a drive system of a vehicle according to various programs. For example, the drive system control unit 12010 is a drive force generation apparatus that generates a drive force of a vehicle such as an internal combustion engine or a drive motor, a drive force transmission mechanism that transmits the drive force to wheels, a steering mechanism that adjusts a steering angle of the vehicle, and a control apparatus such as a braking apparatus that generates a braking force of the vehicle.

The body system control unit 12020 controls an operation of various apparatuses mounted on a vehicle body according to various programs. For example, the body system control unit 12020 functions as a keyless entry system, a smart key system, a power window apparatus, or a control apparatus for various lamps such as a head lamp, a back lamp, a brake lamp, a winker, or a fog lamp. In this case, the body system control unit 12020 can be input with radio waves or signals of various switches that are transmitted from a portable device that substitutes a key. The body system control unit 12020 receives the input of these radio waves or signals and controls a door lock apparatus, a power window apparatus, a lamp, and the like of the vehicle.

The vehicle outside information detection unit 12030 detects information outside the vehicle equipped with the vehicle control system 12000. For example, an imaging unit 12031 is connected to the vehicle outside information detection unit 12030. The vehicle outside information detection unit 12030 causes the imaging unit 12031 to capture an image of the outside of the vehicle and receives the captured image. The vehicle outside information detection unit 12030 may perform object detection processing or distance detection processing of a person, a car, an obstacle, a sign, characters on a road surface, or the like on the basis of the received image.

The imaging unit 12031 is an optical sensor that receives light and outputs an electric signal according to a light receiving amount of the light. The imaging unit 12031 can output the electric signal as an image or as distance measurement information. In addition, the light received by the imaging unit 12031 may be visible light or invisible light such as infrared light.

The vehicle inside information detection unit 12040 detects information on an inside of the vehicle. The vehicle inside information detection unit 12040 is connected to, for example, a driver state detection unit 12041 that detects a driver state. The driver state detection unit 12041 includes, for example, a camera that captures a driver, and the vehicle inside information detection unit 12040 may calculate a degree of fatigue or concentration of the driver on the basis of the detection information input from the driver state detection unit 12041 or may determine whether or not the driver is asleep.

The microcomputer 12051 may calculate a control target value of the driving force generation apparatus, the steering mechanism, or the braking apparatus on the basis of the information on the inside and outside of the vehicle acquired by the vehicle outside information detection unit 12030 or the vehicle inside information detection unit 12040, and output a control command to the drive system control unit 12010. For example, the microcomputer 12051 can perform a cooperative control to realize functions of an advanced driver assistance system (ADAS) including collision avoidance or impact mitigation of a vehicle, follow-up traveling based on inter-vehicle distance, vehicle speed maintenance traveling, a collision warning of a vehicle, a lane departure warning of a vehicle, or the like Further, the microcomputer 12051 can perform a cooperative control to realize autonomous driving and the like that autonomously travels without depending on the operation of the driver by controlling the driving force generation apparatus, the steering mechanism, the braking apparatus, or the like on the basis of the information around the vehicle acquired by the vehicle outside information detection unit 12030 or the vehicle inside information detection unit 12040.

Further, the microcomputer 12051 can output a control command to the body system control unit 12020 on the basis of the information outside the vehicle acquired by the vehicle outside information detection unit 12030. For example, the microcomputer 12051 can control a head lamp according to a position of a preceding vehicle or an oncoming vehicle detected by the vehicle outside information detection unit 12030, and perform cooperative control to realize anti-glare such as switching a high beam to a low beam.

The audio image output unit 12052 transmits an output signal of at least one of a voice and an image to an output apparatus capable of visually or audibly notifying an occupant of the vehicle or the outside of the vehicle of information. In the example of FIG. 32, an audio speaker 12061, a display unit 12062, and an instrument panel 12063 are exemplified as output devices. The display unit 12062 may include at least one of an onboard display or a head-up display, for example.

Figure 33:
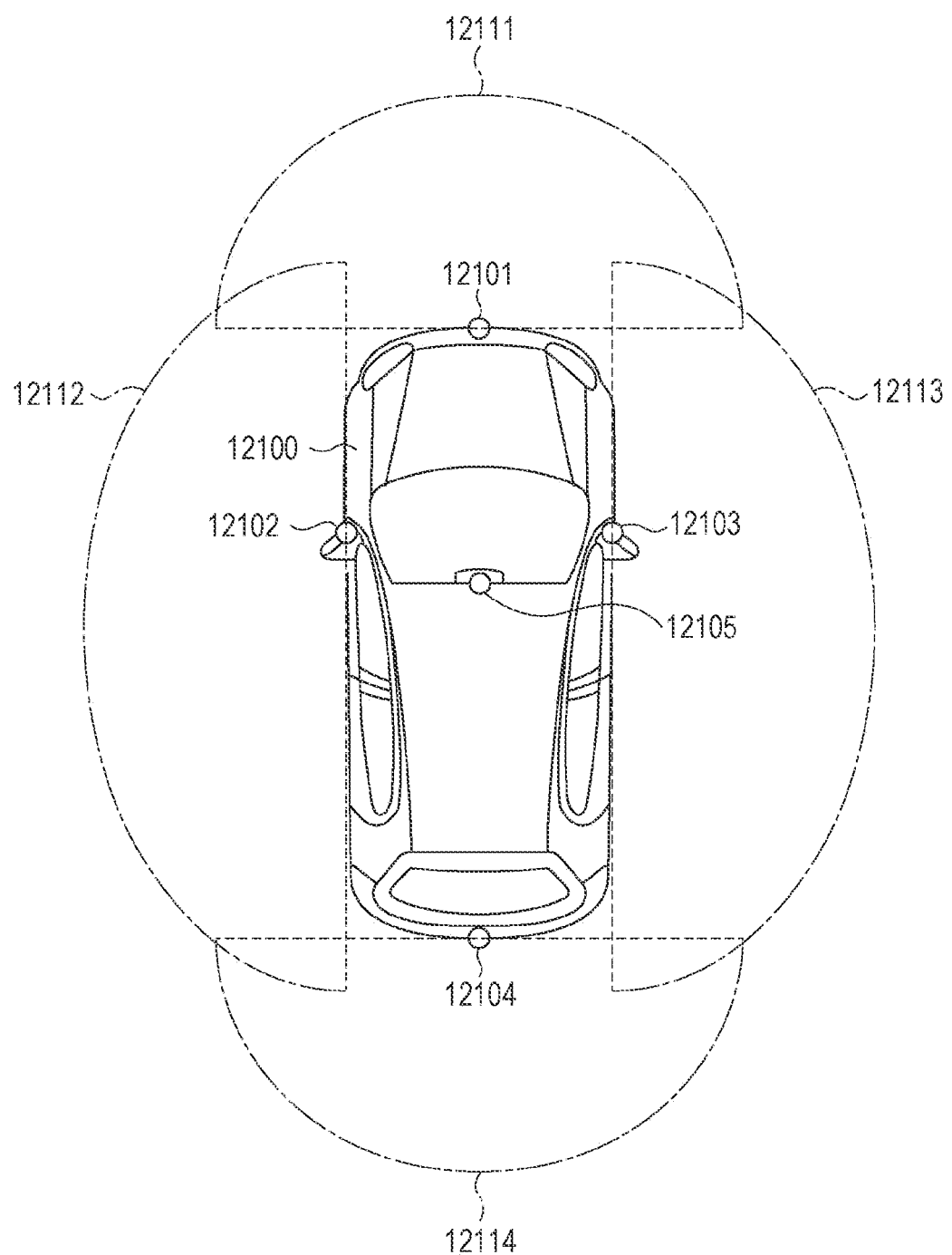
FIG. 33 is an explanatory diagram illustrating an example of installation positions of a vehicle outside information detection unit and an imaging unit.

FIG. 33 is a diagram illustrating an example of an installation position of the imaging unit 12031.

In FIG. 33, the vehicle 12100 has an imaging unit 12101, 12102, 12103, 12104, and 12105 as the imaging unit 12031.

The imaging units 12101, 12102, 12103, 12104, and 12105 are provided at locations such as a front nose, side mirrors, a rear bumper, and a back door of the vehicle 12100 and an upper part of a windshield inside the vehicle, for example. The imaging unit 12101 provided on the front nose and the imaging unit 12105 provided on the upper part of the windshield in the vehicle interior mainly acquire images in front of the vehicle 12100. The imaging units 12102 and 12103 provided on the side mirrors mainly acquire an image of the side of the vehicle 12100. The imaging units 12104 provided on the rear bump or the back door mainly acquire an image of the back of the vehicle 12100. The front images acquired by imaging units 12101 and 12105 are mainly used for detecting a preceding vehicle or a pedestrian, an obstacle, a traffic light, a traffic sign, a lane, or the like.

Note that FIG. 33 illustrates an example of an image capturing range of the imaging units 12101 to 12104. The imaging range 12111 indicates an imaging range of the imaging unit 12101 provided on a front nose, the imaging ranges 12112 and 12113 indicate imaging ranges of the imaging units 12102 and 12103 provided on side mirrors, respectively, and the imaging range 12114 indicates an imaging range of an imaging unit 12104 provided on a rear bumper or a back door. For example, by overlaying the image data captured by the imaging units 12101 to 12104, a bird's-eye view of the vehicle 12100 viewed from above can be obtained.

At least one of the imaging units 12101 to 12104 may have a function of acquiring distance information. For example, at least one of the imaging units 12101 to 12104 may be a stereo camera including the plurality of imaging devices or may be an imaging device having pixels for phase difference detection.

For example, the microcomputer 12051 can extract, in particular, a closest three-dimensional object on a traveling path of the vehicle 12100, that is, a three-dimensional object traveling at a predetermined speed (for example, 0 km/h or more) in a substantially same direction as the vehicle 12100 as a preceding vehicle by obtaining a distance to each three-dimensional object in the imaging ranges 12111 to 12114 and a temporal change (relative velocity with respect to the vehicle 12100) in the distance on the basis of the distance information obtained from the imaging units 12101 to 12104. Furthermore, the microcomputer 12051 can set an inter-vehicle distance to be secured in front of the preceding vehicle in advance, and can perform automatic brake control (including follow-up stop control) and automatic acceleration control (including follow-up start control). In this way, it is possible to perform cooperative control to realize autonomous driving or the like that autonomously travels without depending on an operation of a driver.

For example, the microcomputer 12051 can classify and extract three-dimensional object data regarding a three-dimensional object into two-wheeled vehicles, ordinary vehicles, large vehicles, pedestrians, and other three-dimensional objects such as telephone poles on the basis of the distance information obtained from the imaging units 12101 to 12104, and can be used for automatic avoidance of obstacles. For example, the microcomputer 12051 distinguishes obstacles around the vehicle 12100 into obstacles that the driver of the vehicle 12100 can see and obstacles that are difficult to see. Then, the microcomputer 12051 determines a collision risk which indicates the risk of collision with each obstacle, outputs a warning to a driver via an audio speaker 12061 or a display unit 12062 when there is a possibility of collision that the collision risk exceeds the set value, or performs forced deceleration and avoidance steering through the drive system control unit 12010, thereby performing driving assistance for the collision avoidance.

At least one of the imaging units 12101 to 12104 may be an infrared camera that detects infrared light. For example, the microcomputer 12051 can recognize a pedestrian by determining whether or not the pedestrian exists in the imaged images of the imaging units 12101 to 12104. The recognition of such a pedestrian is performed by, for example, a procedure of extracting the feature points in the imaged image of the imaging units 12101 to 12104 as the infrared camera, and a procedure of determining whether or not there is a pedestrian by performing pattern matching processing on a series of feature points indicating a contour of the object. The microcomputer 12051 determines that a pedestrian exists in the imaged images of the imaging units 12101 to 12104, and when the microcomputer 12051 recognizes a pedestrian, the voice/image output unit 12052 controls the display unit 12062 so that the recognized pedestrian is overlaid with a rectangular contour line for emphasis. Further, the voice/image output unit 12052 may cause the display unit 12062 to display an icon or the like indicating a pedestrian at a desired location.

Hereinabove, an example of the vehicle control system to which the technology according to the present disclosure is applied has been described. The technology according to the present disclosure can be applied to the vehicle inside information detection unit 12040 and the driver state detection unit 12041 among the configurations described above. Specifically, for example, the processing unit 21 in FIG. 30 can be applied to the driver state detection unit 12041, and the processing unit 31 in FIG. 30 can be applied to the vehicle inside information detection unit 12040. Since it is possible to more accurately authenticate an authenticated person such as a driver in the vehicle by applying the technology according to the present disclosure to the vehicle inside information detection unit 12040 and the driver state detection unit 12041, for example, it is possible to provide various functions according to the authenticated driver, such as providing an in-vehicle environment that suits a driver's taste.

In addition, the technology according to the present disclosure can be applied to the vehicle outside information detection unit 12030 and the imaging unit 12031 among the configurations described above. Specifically, for example, the processing unit 21 in FIG. 30 can be applied to the driver state detection unit 12031, and the processing unit 31 in FIG. 30 can be applied to the vehicle outside information detection unit 12030. By applying the technology according to the present disclosure to the vehicle outside information detection unit 12030 and imaging unit 12031, it is possible to more accurately authenticate authenticated persons such as a driver outside a vehicle and third parties (including malicious persons), so the security of the vehicle12100 can be improved.

For example, in recent years, keyless entry (smart entry) has become widespread and adopted in most vehicles, but by using this type of keyless entry, a driver can operate a remote controller (wireless remote controller) to lock and unlock a key wirelessly from a location away from the vehicle without using a mechanical key. Here, when locking or unlocking a key, there is one in which a function to respond with blinking hazard lamps or electronic sounds is built-in. This function is useful for finding a driver's own vehicle in a large parking lot such as a theme park, but when a wireless remote control is stolen or lost, there is a disadvantage in that it makes it easier for a third party (malicious person) to specify which vehicle's key. Even in such a situation, when the technology according to the present disclosure is applied, a third party (malicious person) outside the vehicle should be authenticated more accurately so as not to react to the operation of the wireless remote controller other than a registrant, so the security of the vehicle can be improved.

Note that the technology according to the present disclosure may have the following configuration.

(1)

An information processing apparatus, including:

a processing unit configured to specify a distortion of a subject on the basis of position information indicating a position of the subject included in a captured image and direction information indicating a direction of the subject, and identify a shape of the subject on the basis of the specified distortion of the subject.

(2)

The information processing apparatus according to the (1), in which the subject is included in a peripheral portion of the captured image.

(3)

The information processing apparatus according to the (2), in which the processing unit generates a subject image corresponding to an area of the subject included in the captured image, generates a collation image from a pre-registered registration image on the basis of the position information and the direction information, collates the generated subject image with the collation image, and determines whether the shape of the subject is three-dimensional or two-dimensional on the basis of a result of the collation.

(4)

The information processing apparatus according to the (3), in which the processing unit sequentially generates the registration image and the collation image according to three-dimensional information of the registration image while sequentially changing a direction indicated by the direction information.

(5)

The information processing apparatus according to the (3) or (4), in which the processing unit sequentially collates the generated collation image with the subject image, and determines the shape of the subject on the basis of the result of the collation when the collation image suitable for the subject image is used.

(6)

The information processing apparatus according to any one of the (3) to (5), in which the processing unit detects the operation of the subject included in the captured image, and determines that the subject is three-dimensional when the detected operation of the subject is a predetermined operation.

(7)

The information processing apparatus according to the (6), in which the processing unit instructs the subject to perform the predetermined operation, detects the operation of the subject included in the captured image, and determines that the subject is three-dimensional when the detected operation of the subject is a predetermined operation according to the instruction.

(8)

The information processing apparatus according to the (2), in which the processing unit generates a subject image corresponding to an area of the subject included in the captured image, corrects the generated subject image on the basis of the direction information, collates the corrected subject image with a pre-registered registration image, and determines whether the shape of the subject is three-dimensional or two-dimensional on the basis of a result of the collation.

(9)

The information processing apparatus according to the (8), in which the direction information is obtained by using a neural network that inputs the subject image and the position information to an input layer, and outputs the direction information from an output layer.

(10)

The information processing apparatus according to the (9), in which in learning of the neural network, the direction information is included in a learning parameter.

(11)

The information processing apparatus according to the (2), in which the processing unit generates a subject image corresponding to an area of the subject included in the captured image, and acquires a result of determining the shape of the subject by using a neural network that inputs the position information, the generated subject image and position information, and a pre-registered registration image to an input layer and outputs the result of determining the shape of the subject from an output layer.

(12)
The information processing apparatus according to the (11), in which
in learning of the neural network, the direction information is included in a learning parameter.

(13)
The information processing apparatus according to any one of the (1) to (12), in which
the information processing apparatus has a first mode in which an identification process for identifying the shape of the subject is valid, and a second mode in which the identification process is invalid.

(14)
The information processing apparatus according to any one of the (1) to (13), in which
the subject includes a human face, and
the processing unit determines whether or not the human face included in the captured image is a real face.

(15)
The information processing apparatus according to any one of the (1) to (14), in which
the captured image includes an image captured by a camera having a wide-angle lens, and
the distortion of the subject includes a distortion of an image corresponding to the wide-angle lens

(16)
An information processing method, including:
specifying, by an information processing apparatus, a distortion of a subject on the basis of position information indicating a position of the subject included in a captured image and direction information indicating a direction of the subject, and
identifying a shape of the subject on the basis of the specified distortion of the subject.

(17)
An information processing system, including:
an information processing apparatus configured to
specify a distortion of a subject on the basis of position information indicating a position of the subject included in a captured image and direction information indicating a direction of the subject, and
identify a shape of the subject on the basis of the specified distortion of the subject

(18)
The information processing system according to the (17), further including:
an image capturing apparatus configured to capture an image of the subject and generate the captured image,
in which the subject is included in a peripheral portion of an angle of view of the image capturing apparatus.

(19)
The information processing system according to the (18), further including:
a database in which a registration image is registered in advance,
in which the information processing apparatus
generates a subject image corresponding to an area of the subject included in the captured image,
generates a collation image from the registration image read from the database on the basis of the position information and the direction information,
collates the generated subject image with the collation image, and
determines whether the shape of the subject is three-dimensional or two-dimensional on the basis of a result of the collation.

(20)
The information processing system according to the (18), further including:
a database in which a registration image is registered in advance,
in which the information processing apparatus
generates a subject image corresponding to an area of the subject included in the captured image,
corrects the generated subject image on the basis of the direction information,
collates the corrected subject image and the registration image read from the database, and
determines whether the shape of the subject is three-dimensional or two-dimensional on the basis of a result of the collation.

REFERENCE SIGNS LIST

1 Information processing system
10, 10A to 10G Information processing apparatus
20, 30 Information processing apparatus
21, 31, 41 Processing unit
100 Control unit
101 Wide-angle camera
102 Face detection/face part cutout unit
103 Registration image database
104 Wide-angle distortion processing unit
105 Face authentication unit
106 Authentication result output unit
111 Counter
112 Timer
121 Operation instruction generation unit
131 Direction angle detection unit
132 Wide-angle distortion correction unit
133 Face authentication unit
141, 142 Plane determination unit
150 Replaceable camera unit
151 Camera
152 Memory
200, 300 Neural network
201, 301 Input layer
202, 302 Intermediate layer
203, 303 Output layer
311 Comparator
1001 CPU

The invention claimed is:
1. An information processing apparatus, comprising:
an image capturing apparatus configured to capture an image associated with a subject; and
a processing unit configured to:
determine image information based on a plurality of registration images, wherein the plurality of registration images is associated with the subject;
instruct the subject to perform an operation;
detect the operation of the subject, wherein the detected operation of the subject corresponds to a movement of a human face of the subject;
specify a distortion of the subject based on position information and direction information, wherein
the position information indicates a position of the subject included in the captured image,
the direction information indicates a direction of the subject, and
the subject is included in a peripheral portion of the captured image;
identify a shape of the subject based on the specified distortion of the subject and the detected operation of the subject;

collate the determined image information with the position information and the direction information;
generate a first collation image based on the collation;
determine an authentication score based on the generated first collation image; and
authenticate the subject based on the authentication score.

2. The information processing apparatus according to claim 1, wherein the processing unit is further configured to:
generate a subject image that corresponds to an area of the subject;
generate, based on the position information and the direction information, a second collation image from a specific registration image of the plurality of registration images;
collate the generated subject image with the second collation image; and
identify, based on a result of the collation, that the shape of the subject is one of a three-dimensional shape or a two-dimensional shape.

3. The information processing apparatus according to claim 2, wherein the processing unit is further configured to:
sequentially generate, based on three-dimensional information of the specific registration image, the second collation image and the specific registration image; and
sequentially change the direction of the subject.

4. The information processing apparatus according to claim 3, wherein the processing unit is further configured to:
sequentially collate the generated second collation image with the subject image; and
identify the shape of the subject based on the result of the collation and the second collation image.

5. The information processing apparatus according to claim 1, wherein the processing unit is further configured to determine that the subject is three-dimensional, based on the detected operation of the subject is the movement of the human face of the subject.

6. The information processing apparatus according to claim 1, wherein the processing unit is further configured to:
generate a subject image that corresponds to an area of the subject included in the captured image;
correct the generated subject image based on the direction information;
collate the corrected subject image with a specific registration image of the plurality of registration images; and
identify, based on a result of the collation, that the shape of the subject is one of a three-dimensional shape or a two-dimensional shape.

7. The information processing apparatus according to claim 6, wherein the direction information is obtained through a neural network that
inputs, to an input layer of the neural network, the subject image and the position information, and
outputs the direction information from an output layer of the neural network.

8. The information processing apparatus according to claim 7, wherein in learning of the neural network, the direction information is included in a learning parameter.

9. The information processing apparatus according to claim 1, wherein the processing unit is further configured to:
generate a subject image that corresponds to an area of the subject; and
acquire a result of the identification of the shape of the subject through a neural network, wherein the neural network
inputs, to an input layer of the neural network, the position information, the generated subject image, and a specific registration image of the plurality of registration images, and
outputs, from an output layer of the neural network, the result of the determination of the shape of the subject.

10. The information processing apparatus according to claim 9, wherein in learning of the neural network, the direction information is included in a learning parameter.

11. The information processing apparatus according to claim 1, wherein
the information processing apparatus is associated with a first mode and a second mode,
in the first mode an identification process is valid,
the identification process is associated with the identification of the shape of the subject, and
in the second mode the identification process is invalid.

12. The information processing apparatus according to claim 1, wherein
the processing unit is further configured to determine that the human face included in the captured image is a real face.

13. The information processing apparatus according to claim 1, wherein
the image capturing apparatus corresponds to a camera,
the camera includes a wide-angle lens,
the distortion of the subject includes a distortion of the captured image, and the captured image corresponds to the wide-angle lens.

14. An information processing method, comprising:
capturing, by the an image capturing apparatus, an image associated with a subject;
determining, by an information processing apparatus, image information based on a plurality of registration images, wherein the plurality of registration images is associated with the subject;
instructing, by the information processing apparatus, the subject to perform an operation;
detecting, by the information processing apparatus, the operation of the subject, wherein the detected operation of the subject corresponds to a movement of a human face of the subject;
specifying, by the information processing apparatus, a distortion of the subject based on position information and direction information, wherein
the position information indicates a position of the subject included in the captured image,
the direction information indicates a direction of the subject, and
the subject is included in a peripheral portion of the captured image;
identifying, by the information processing apparatus, a shape of the subject based on the specified distortion of the subject and the detected operation of the subject;
collating, by the information processing apparatus, the determined image information with the position information and the direction information;
generating, by the information processing apparatus, a first collation image based on the collation;
determining, by the information processing apparatus, an authentication score based on the generated first collation image; and
authenticating, by the information processing apparatus, the subject based on the authentication score.

15. An information processing system, comprising:
an image capturing apparatus configured to capture an image associated with a subject;
an information processing apparatus configured to:
- determine image information based on a plurality of registration images, wherein the plurality of registration images is associated with the subject:
- instruct the subject to perform an operation;
- detect the operation of the subject, wherein the detected operation of the subject corresponds to a movement of a human face of the subject;
- specify a distortion of the subject based on position information and direction information, wherein
  - the position information indicates a position of the subject included in the captured image,
  - the direction information indicates a direction of the subject, and
  - the subject is included in a peripheral portion of the captured image;
- identify a shape of the subject based on the specified distortion of the subject and the detected operation of the subject;
- collate the determined image information with the position information and the direction information;
- generate a first collation image based on the collation;
- determine an authentication score based on the generated first collation image; and
- authenticate the subject based on the authentication score.

16. The information processing system according to claim 15, further comprising;
a database configured to store the plurality of registration images, wherein the information processing apparatus is further configured to:
- generate a subject image that corresponds to an area of the subject, wherein the subject is included in the captured image;
- generate, based on the position information and the direction information, a second collation image from a specific registration image of the plurality of registration images;
- collate the generated subject image with the second collation image; and
- identify, based on a result of the collation, that the shape of the subject is one of a three-dimensional shape or a two-dimensional shape.

17. The information processing system according to claim 15, further comprising;
a database configured to store the plurality of registration images, wherein the information processing apparatus is further configured to:
- generate a subject image that corresponds to an area of the subject;
- correct the generated subject image based on the direction information;
- collate the corrected subject image and a specific registration image of the plurality of registration images; and
- identify, based on a result of the collation, that the shape of the subject is one of a three-dimensional shape or a two-dimensional shape.

18. The information processing apparatus according to claim 5, wherein the movement of the human face of the subject includes at least one of a blinking operation of an eye of the subject, an opening operation of a mouth of the subject, or a closing operation of the mouth of the subject.

* * * * *